United States Patent [19]
Dye

[11] Patent Number: 6,002,411
[45] Date of Patent: *Dec. 14, 1999

[54] INTEGRATED VIDEO AND MEMORY CONTROLLER WITH DATA PROCESSING AND GRAPHICAL PROCESSING CAPABILITIES

[75] Inventor: Thomas Anthony Dye, Austin, Tex.

[73] Assignee: Interactive Silicon, Inc., Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/340,667

[22] Filed: Nov. 16, 1994

[51] Int. Cl.$^6$ ..................................................... G06F 13/16
[52] U.S. Cl. .......................... 345/521; 345/202; 345/509
[58] Field of Search .................. 345/112–115, 118–120, 345/153, 155, 501–504, 507, 512, 520, 521, 526, 418, 522, 186, 509, 202; 395/501, 503, 504, 507, 512, 520, 521, 526; 711/1, 6, 100, 104, 105, 147, 148, 153, 170, 173

[56] References Cited

U.S. PATENT DOCUMENTS

| | | | |
|---|---|---|---|
| 4,542,376 | 9/1985 | Bass et al. | 345/340 |
| 4,679,038 | 7/1987 | Bantz et al. | 345/516 |

(List continued on next page.)

FOREIGN PATENT DOCUMENTS

| | | |
|---|---|---|
| 0 314 440 A2 | 5/1989 | European Pat. Off. . |
| 2 191 666 | 12/1987 | United Kingdom . |
| 2 245 129 | 12/1991 | United Kingdom . |

OTHER PUBLICATIONS

Watkins, John et al., "A Memory Controller with an Integrated Graphics Processor", Computer Design—'93, 1993, pp. 324–338, 1993.

XP–002088244 "Un circuit vidéo de mémorisation et de visualisation d'objets", Electonique Industrielle, Apr. (1985), No. 87, Paris, France, pp. 51–59.
International Search Report for PCT/US 98/13113 dated Jan. 12, 1999.

(List continued on next page.)

Primary Examiner—U. Chauhan
Attorney, Agent, or Firm—Conley, Rose & Tayon; Jeffrey C. Hood

[57] ABSTRACT

An integrated memory controller (IMC) which incorporates novel memory, graphics, and audio processing capabilities in a single logical unit. The IMC includes numerous significant advances which provide greatly increased performance over prior art systems. The integrated memory controller (IMC) includes one or more symmetric memory ports for connecting to system memory. The IMC also includes video outputs, preferably RGB (red, green, blue) outputs as well as horizontal and vertical synchronization signal outputs, to directly drive the video display monitor. The IMC transfers data between the system bus and system memory and also transfers data between the system memory and the video display output, thereby eliminating the need for a separate graphics subsystem. The IMC also improves overall system performance and response using main system memory for graphical information and storage. The IMC system level architecture reduces data bandwidth requirements for graphical display data since the host CPU is not required to move data between main memory and the graphics subsystem as in conventional computers, but rather the graphical data resides in the same subsystem as the main memory. Therefore the host CPU or DMA master is not limited by the available bus bandwidth. The IMC includes compression and decompression engines for compressing and decompressing data within the system. The IMC also includes a novel pointer-based display list architecture which includes windows workspace areas spaces which define the format of the data and the data type to read or written.

26 Claims, 34 Drawing Sheets

U.S. PATENT DOCUMENTS

| | | | |
|---|---|---|---|
| 4,868,557 | 9/1989 | Perlman | 345/508 |
| 4,945,499 | 7/1990 | Asari et al. | 395/522 |
| 4,967,375 | 10/1990 | Pelham et al. | 395/515 |
| 5,043,714 | 8/1991 | Perlman | 345/196 |
| 5,097,411 | 3/1992 | Doyle et al. | 395/522 |
| 5,113,180 | 5/1992 | Gupta et al. | 345/515 |
| 5,142,615 | 8/1992 | Levesque et al. | 345/431 |
| 5,175,813 | 12/1992 | Golding et al. | 345/340 |
| 5,258,750 | 11/1993 | Malcolm, Jr. et al. | 345/115 |
| 5,265,218 | 11/1993 | Testa et al. | 395/280 |
| 5,315,696 | 5/1994 | Case et al. | 395/133 |
| 5,321,805 | 6/1994 | Hayman et al. | 395/502 |
| 5,369,617 | 11/1994 | Munson | 365/219 |
| 5,388,207 | 2/1995 | Chia et al. | 345/513 |
| 5,392,407 | 2/1995 | Heil et al. | 395/293 |
| 5,412,776 | 5/1995 | Bloomfield et al. | 345/346 |
| 5,432,900 | 7/1995 | Rhodes et al. | 395/807 |
| 5,467,087 | 11/1995 | Chu | 341/51 |
| 5,502,462 | 3/1996 | Mical et al. | 345/185 |
| 5,506,604 | 4/1996 | Nally et al. | 345/153 |
| 5,522,025 | 5/1996 | Rosenstein | 345/344 |
| 5,528,764 | 6/1996 | Heil | 395/293 |
| 5,559,954 | 9/1996 | Sakoda et al. | 345/507 |
| 5,563,595 | 10/1996 | Strohacker | 341/106 |
| 5,590,287 | 12/1996 | Zeller et al. | 395/307 |
| 5,596,345 | 1/1997 | Goodfellow | 345/340 |
| 5,596,693 | 1/1997 | Needle et al. | 345/474 |
| 5,606,428 | 2/1997 | Hanselman | 358/404 |
| 5,608,864 | 3/1997 | Bindlish et al. | 395/507 |
| 5,617,529 | 4/1997 | Dao | 345/515 |
| 5,659,715 | 8/1997 | Wu et al. | 345/185 |
| 5,666,521 | 9/1997 | Marisetty | 345/525 |
| 5,668,997 | 9/1997 | Lynch-Freshner et al. | 395/683 |
| 5,706,034 | 1/1998 | Katsura et al. | 345/508 |
| 5,719,598 | 2/1998 | Latham | 345/419 |
| 5,734,387 | 3/1998 | Patrick et al. | 345/441 |
| 5,761,698 | 6/1998 | Combs | 711/100 |
| 5,812,817 | 9/1998 | Hovis et al. | 395/497.04 |
| 5,828,877 | 10/1998 | Pearce et al. | 395/670 |

OTHER PUBLICATIONS

"Buffer Mechanism For PEL Positioning of Multiple Video Images, Including Overlapping, on a Raster–Scan CRT," IBM Technical Disclosure Bulletin, vol. 29, No. 11, Apr. 1987, pp. 4714–4717.

Normal or compressed data transfer, No modification by IMC

Memory to memory decompression

Memory decompression to CPU or Disk

Decompression from Disk or CPU to memory

Decompression of disk to CPU

Memory to memory Compression

Compression from memory to CPU or Disk

Compression from CPU or disk to memory

Compression of CPU data to Disk or I/O subsystem

INTEGRATED VIDEO AND MEMORY CONTROLLER WITH DATA PROCESSING AND GRAPHICAL PROCESSING CAPABILITIES

FIELD OF THE INVENTION

The present invention relates to computer system architectures, and more particularly to an integrated memory and graphics controller which includes improved data processing and graphical processing capabilities.

DESCRIPTION OF THE RELATED ART

Since their introduction in 1981, the architecture of personal computer systems has remained substantially unchanged. The current state of the art in computer system architectures includes a central processing unit (CPU) which couples to a memory controller interface that in turn couples to system memory. The computer system also includes a separate graphical interface for coupling to the video display. In addition, the computer system includes input/output (I/O) control logic for various I/O devices, including a keyboard, mouse, floppy drive, hard drive, etc.

In general, the operation of a modern computer architecture is as follows. Programs and data are read from a respective I/O device such as a floppy disk or hard drive by the operating system, and the programs and data are temporarily stored in system memory. Once a user program has been transferred into the system memory, the CPU begins execution of the program by reading code and data from the system memory through the memory controller. The application code and data are presumed to produce a specified result when manipulated by the system CPU. The code and data are processed by the CPU and data is provided to one or more of the various output devices. The computer system may include several output devices, including a video display, audio (speakers), printer, etc. In most systems, the video display is the primary output device.

Graphical output data generated by the CPU is written to a graphical interface device for presentation on the display monitor. The graphical interface device may simply be a video graphics array (VGA) card, or the system may include a dedicated video processor or video acceleration card including separate video RAM (VRAM). In a computer system including a separate, dedicated video processor, the video processor includes graphics capabilities to reduce the workload of the main CPU. Modem prior art personal computer systems typically include a local bus video system based on either the peripheral component interconnect (PCI) bus or the VESA (Video Electronics Standards Association) VL bus, or perhaps a proprietary local bus standard. These computer systems place the video subsystem on a local bus near the CPU to provide increased performance over systems which use older expansions buses, such as the AT or Industry Standard Architecture (ISA) bus or the EISA (extended Industry Standard Architecture) bus.

Therefore, in summary, program code and data are first read from the hard disk to the system memory. The program code and data are then read by the CPU from system memory, the data is processed by the CPU, and graphical data is written to the video RAM in the graphical interface device for presentation on the display monitor. The CPU typically reads data from system memory across the system bus and then writes the processed data or graphical data back across the system bus to the I/O bus or local bus where the graphical interface device is situated. The graphical interface device in turn generates the appropriate video signals to drive the display monitor. It is noted that this operation requires the data to make two passes across the system bus and/or the I/O subsystem bus. In addition, the program which manipulates the data must also be transferred across the system bus from the main memory. Further, two separate memory subsystems are required, the system memory and the dedicated video memory, and video data is constantly being transferred from the system memory to the video memory frame buffer. FIG. 1 illustrates the data transfer paths in a typical computer system using prior art technology.

Computer systems are being called upon to perform larger and more complex tasks that require increased computing power. In addition, modem software applications require computer systems with increased graphics capabilities. Modem software applications typically include graphical user interfaces (GUIs) which place increased burdens on the graphics capabilities of the computer system. Further, the increased prevalence of multimedia applications also demands computer systems with more powerful graphics capabilities. Therefore, a new computer system and method is desired which provides increased system performance and in particular, increased video and/or graphics performance, than that possible using prior art computer system architectures.

SUMMARY OF THE INVENTION

The present invention comprises an integrated memory controller (IMC) which includes advanced memory, graphics, and audio processing capabilities preferably comprised in a single logical unit. The IMC includes numerous significant advances which provide greatly increased performance over prior art systems. The memory controller (IMC) of the present invention preferably sits on the main CPU bus or a high speed system peripheral bus such as the PCI bus. The IMC includes one or more symmetric memory ports for connecting to system memory. The IMC also includes video outputs, preferably RGB (red, green, blue) outputs as well as horizontal and vertical synchronization signal outputs, to directly drive the video display monitor. The IMC also preferably includes an audio interface for digital audio delivery to an external stereo digital-to-analog converter (DAC).

The IMC transfers data between the system bus and system memory and also transfers data between the system memory and the video display output. Therefore, the IMC architecture of the present invention eliminates the need for a separate graphics subsystem. The IMC also improves overall system performance and response using main system memory for graphical information and storage. The IMC system level architecture reduces data bandwidth requirements for graphical display since the host CPU is not required to move data between main memory and the graphics subsystem as in conventional computers, but rather the graphical data resides in the same subsystem as the main memory. Therefore, for graphical output, the host CPU or DMA master is not limited by the available bus bandwidth, thus improving overall system throughput.

The integrated memory controller of the preferred embodiment includes a bus interface unit which couples through FIFO buffers to an execution engine. The execution engine includes compression and decompression engines as well as a texture mapping engine according to the present invention. The execution engine in turn couples to a graphics engine which couples through FIFO buffers to one or more symmetrical memory control units. The graphics engine is similar in function to graphics processors in conventional computer systems and includes line and triangle rendering operations as well as span line interpolators. An instruction storage/decode block is coupled to the bus interface logic which stores instructions for the graphics engine and memory compression/decompression engines. A Window Assembler is coupled to the one or more memory control units. The Window Assembler in turn couples to a display storage buffer and then to a display memory shifter. The display memory shifter couples to separate digital to analog converters (DACs) which provide the RGB signals and the synchronization signal outputs to the display monitor. The window assembler includes a novel display list-based method of assembling pixel data on the screen during screen refresh, thereby improving system performance. In addition, a novel anti-aliasing method is applied to the video data as the data is transferred from system memory to the display screen. The internal graphics pipeline of the IMC is optimized for high end 2D and 3D graphical display operations, as well as audio operations, and all data is subject to operation within the execution engine and/or the graphics engine as it travels through the data path of the IMC.

In the preferred embodiment of the present invention, the execution engine of the IMC includes compression and decompression engines for compressing and decompressing data within the system. The IMC preferably uses a lossless data compression and decompression scheme. Data transfer to and from the integrated memory controller of the present invention can thus be in either two formats, these being compressed or normal (non-compressed). The execution engine also preferably includes microcode for specific decompression of particular data formats such as digital video and digital audio. Compressed data from system I/O peripherals such as the hard drive, floppy drive, or local area network (LAN) are decompressed in the IMC and stored into system memory or saved in the system memory in compressed format. Thus, data can be saved in either a normal or compressed format, retrieved from the system memory for CPU usage in a normal or compressed format, or transmitted and stored on a medium in a normal or compressed format. Internal memory mapping allows for format definition spaces which define the format of the data and the data type to be read or written. Graphics operations are achieved preferably by either a graphics high level drawing protocol, which can be either a compressed or normal data type, or by direct display of pixel information, also in a compressed or normal format. Software overrides may be placed in applications software in systems that desire to control data decompression at the software application level. In this manner, an additional protocol within the operating system software for data compression and decompression is not required.

The one or more memory control units of the IMC include a dual synchronous cross-bounds memory controller architecture according to the present invention. The IMC preferably includes two memory control units which preferably can address up to 256 Megabytes of system memory. Each memory control unit includes a complete address and data interface as well as internal collision logic for tracking operations to avoid data coherency problems. In a system including a plurality of memory control units, the units are coupled internally with a complete display list of memory operations to be performed. This display list is used for memory transfers as well as for screen refresh and DRAM refresh operations. The use of display lists for memory transfer, screen refresh, and DRAM refresh operations greatly reduces data traffic as compared to prior art computer architectures and thus provides significantly improved performance. Each of the one or more memory control units span the entire memory interface address space and are capable of reading any data within the system memory. The memory control interface of the present invention is independent of memory type but assumes either a high speed special DRAM, such as RAMBUS or SGRAM, or normal DRAM memory operated in an interleaved fashion.

The Window Assembler of the present invention performs pointer-based and display list-based video refresh operations which enable screen refresh data to be assembled on a per window basis, thereby greatly increasing the performance of the graphical display. The window assembler includes memory mapped I/O registers storing values which point to various buffers in system memory comprising video or graphics display information. The IMC includes an ID pointer register which points to a Windows ID list. The Windows ID list comprises a list of pointers for each of the windows or objects appearing on the display screen. Each respective pointer in the Windows ID list points to respective windows workspace memory areas corresponding to the window. The windows workspace areas specify data types, color depths, 3D depth values, alpha blending information, screen position, etc. for the respective window or object on the screen. Each windows workspace area also includes static and dynamic pointers which point to the location in system memory where the pixel data for the respective window or object is stored. Each windows workspace area also optionally includes a pointer to a color composition matrix for color indexing on a per object or per window basis, as well as slope information for rendering non-rectangular objects.

The Window Assembler utilizes the information in the Window Workspace buffer, as well as information received from the software driver regarding screen changes, to assemble a Display Refresh List in system memory. When a screen change occurs, such as a new window displayed on the screen, the Window Assembler uses the Display Refresh List to determine where in the linear or xy memory space the data resides as well as how many bits per pixel the window requires, how to map the color space, and the necessary xy rectangle extents and window priority. This information is used during the screen refresh to display the various windows or objects on the screen very quickly and efficiently. Thus, the video display can be updated with new video data without requiring any system bus data transfers, which were required in prior art computer system architectures.

The Window Assembler dynamically adjusts the Display Refresh List for movement of objects and changes in relative depth priority which appear on the display. Thus when an object or window is moved to a new position in the screen, or is popped or pushed relative to another window, the data comprising the object is not transferred to another location in memory, but rather only the display pointer address is changed in the Refresh List. This provides the effect of moving data from a source to a destination, i.e., a bit block transfer or bit blit, without ever moving the object in memory. This provides a tremendous performance increase over conventional bit blit operations commonly used in graphical subsystems.

The IMC of the present invention uses a virtual color depth technique which optimizes the use of system memory, i.e., uses only the amount of system memory required for each application and each window on the display. Low end applications may only require a minimum amount of memory, such as one bit per pixel, whereas high end applications may require more memory per pixel. In the IMC architecture, memory is used on a "per application basis" where only the memory that is actually required is used for each application or window. For example, a simple text application may only use a single bit per pixel while a complex 3D application may require as much as 128 bits per pixel. According to the present invention, both applications reside on the same display simultaneously and each uses only the memory required for its respective window size and pixel depth.

The present invention further includes a novel method for assembling 2D and 3D objects. According to the invention, the update of the Display Refresh List is performed continuously with slopes on the bounds of the object. Thus, execution of the Display Refresh List renders triangles of texture without moving the texture maps. Further, the present invention allows the Display List to be assembled on a per object basis using X and Y bounds, thus increasing efficiency.

The present invention also includes a novel screen refresh rate edge anti-aliasing and filtering method. As discussed above, data is read from the system memory according to the current Display Refresh List, which is continually updated as screen changes occur. As the data traverses the serial FIFO shift registers in the IMC, the edge anti-aliasing process occurs. The edge anti-aliasing method is enabled by attribute bits located in the window workplace flags in system memory for each window. Each window workspace includes an enable flag which indicates whether smoothing is desired. If the flag is set, filtering is performed using the edge anti-aliasing filter method of the present invention. The screen refresh display input data which is being provided to the display FIFO buffers is compared against predetermined threshold values which represent the delta change in intensity or color. If the method detects a large change, the method performs automatic blending and smoothing of the area around the abrupt change in intensity.

The present invention further includes a novel system and method which uses X, Y, Z compare registers and relative Z addressing to reduce the amount of Z-buffer memory required. The present invention compares the X, Y, Z space of a first object or window with the X, Y, Z space of a second object or window. If a collision occurs, then the Z comparator operates using a relative address to only the union of the X, Y, Z space (first object) and X, Y, Z space (second object).

The consolidation of memory control and graphical control combined with integrated data compression and decompression capabilities removes system bottle-necks and increases performance. This allows lower cost systems due to less data bus pins, smaller data storage requirements and the elimination of a separate graphics subsystem. Since the video display buffer is contained within the main system memory, graphical data is not required to be transferred across the system bus to the display output subsystem. This is a significant advance over the operation of current computer architectures and their associated graphic display subsystems.

Therefore, the present invention comprises an integrated memory and graphics controller which provides greatly increased performance over prior art designs. The integrated memory controller of the present invention does not merely integrate common video control and memory control features found in present computer systems, but rather provides a number of significant features and performance benefits over those available in the prior art.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Prior Art Computer System Architecture

Figure 1:
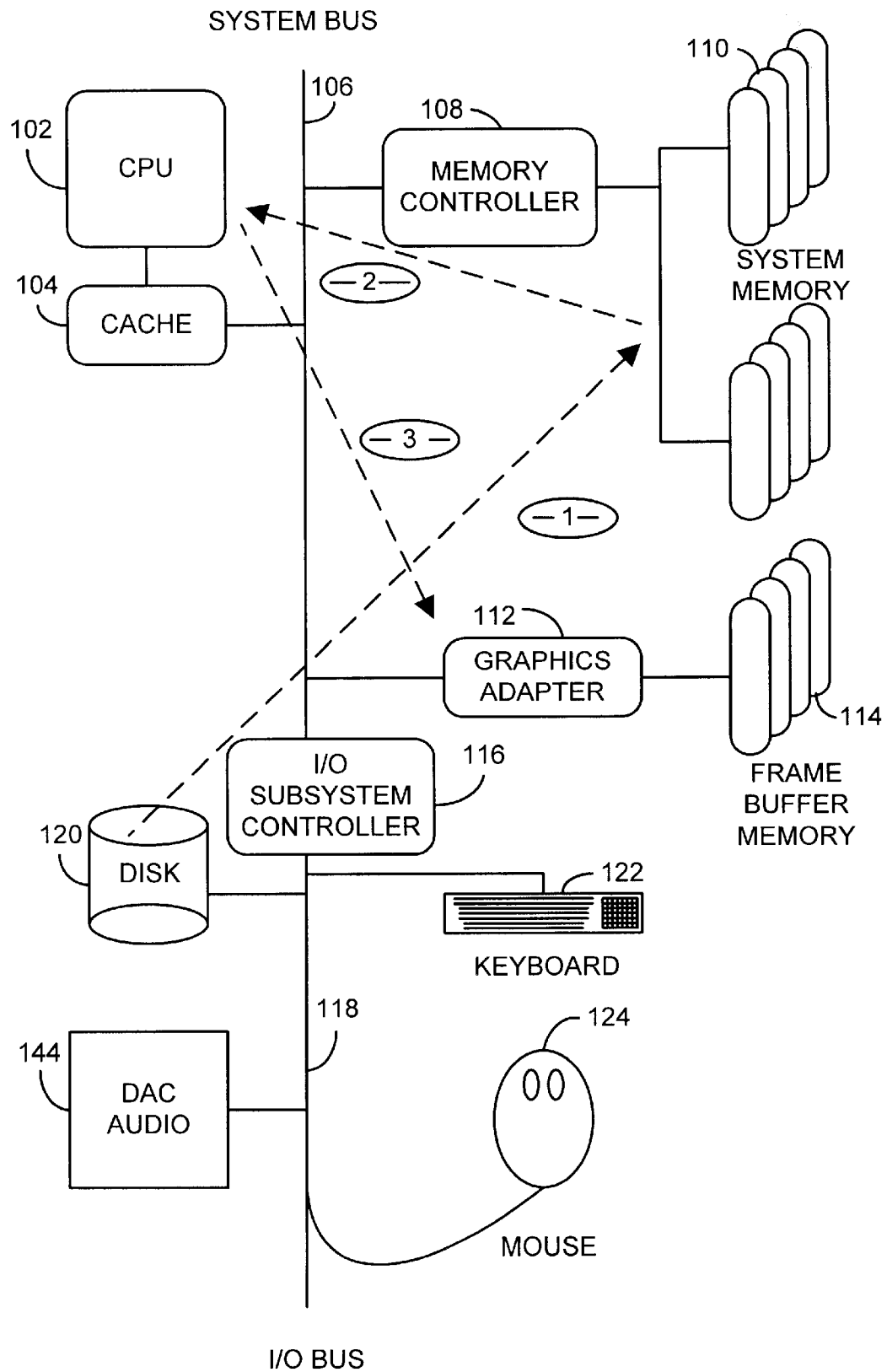
FIG. 1 is a prior art diagram illustrating data flow in a prior art computer system.

FIG. 1 illustrates a block diagram of a prior art computer system architecture. As shown, prior art computer architectures typically include a CPU 102 coupled to a cache system 104. The CPU 102 and cache system 104 are coupled to the system bus 106. A memory controller 108 is coupled to the system bus 106 and the memory controller 108 in turn couples to system memory 110. In FIG. 1, graphics adapter 112 is shown coupled to the system bus 106. However, it is noted that in modem computer systems the graphics adapter 112 is typically coupled to a separate local expansion bus such as the peripheral component interface (PCI) bus or the VESA VL bus. Prior art computer systems also typically include bridge logic coupled between the CPU 102 and the memory controller 108 wherein the bridge logic couples to the local expansion bus where the graphics adapter 112 is situated. For example, in systems which include a PCI bus, the system typically includes a host/PCI/cache bridge which integrates the cache logic 104, host interface logic, and PCI interface logic. The graphics adapter 112 couples to frame buffer memory 114 which stores the video data that is actually displayed on the display monitor. Modem prior art computer systems typically include between 1 to 4 Megabytes of video memory. An I/O subsystem controller 116 is shown coupled to the system bus 106. In computer systems which include a PCI bus, the I/O subsystem controller 116 typically is coupled to the PCI bus. The I/O subsystem controller 116 couples to an input/output (I/O) bus 118. Various peripheral I/O devices are generally coupled to the I/O bus 18, including a hard disk 120, keyboard 122, mouse 124, and audio digital-to-analog converter (DAC) 144.

Prior art computer system architectures generally operate as follows. First, programs and data are generally stored on the hard disk 120. At the direction of the CPU 102, the programs and data are transferred from the hard disk 120 through the I/O subsystem controller 116 to system memory 110 via the memory controller 108. The CPU 102 accesses programs and data stored in the system memory 110 through the memory controller 108 and the system bus 106. In processing the program code and data, the CPU 102 generates graphical data or graphical instructions that are then provided over the system bus 106 and generally the PCI bus (not shown) to the graphics adapter 112. The graphics adapter 112 receives graphical instructions or pixel data from the CPU 102 and generates pixel data that is stored in the frame buffer memory 114. The graphics adapter 112 generates the necessary video signals to drive the video display monitor (not shown) to display the pixel data that is stored in the frame buffer memory 114. When a window on the screen is updated or changed, the above process repeats whereby the CPU 102 reads data across the system bus 106 from the system memory 110 and then transfers data back across the system bus 106 and local expansion bus to the graphics adapter 112 and frame buffer memory 114.

Thus, the CPU 102 typically reads data from system memory 110 across the system bus 106 and then writes the processed data back across the system bus 106 and typically to a local expansion bus to the graphics adapter 112 for display output. This action requires that the data make two passes across the system bus 106. In addition, the program code which manipulates the data must also be read across the system bus 106 from system memory 110. Since the video pixel data that is displayed on the screen is stored in frame buffer memory 114 which is separate from the system memory 110, increased data traffic is required on the system bus 106, thereby reducing system performance. In addition, the requirement of two separate memory subsystems increases the cost of the system.

Computer Architecture of the Present Invention

Figure 2:
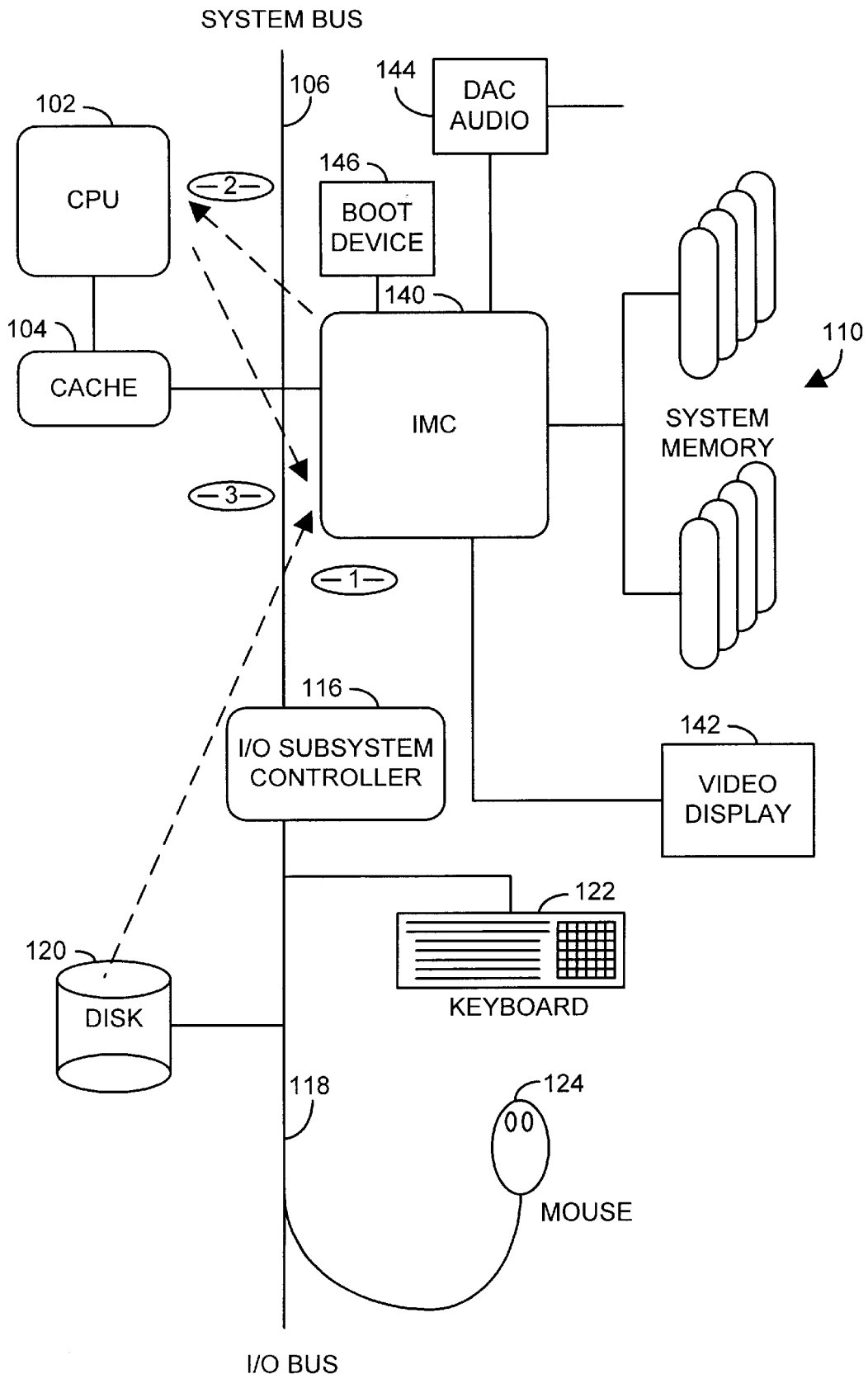
FIG. 2 is a block diagram illustrating data flow in a computer system including an integrated memory controller (IMC) according to the present invention.

Referring now to FIG. 2, a block diagram illustrating the computer architecture of a system incorporating the present invention is shown. Elements in FIG. 2 that are similar or identical to those in FIG. 1 include the same reference numerals for convenience. As shown, the computer system of the present invention includes a CPU 102 preferably coupled to a cache system 104. The CPU 102 may include a first level cache system and the cache 104 may comprise a second level cache. Alternatively, the cache system 104 may be a first level cache system or may be omitted as desired. The CPU 102 and cache system 104 are coupled to a system bus 106. The CPU 102 and cache system 104 are also directly coupled through the system bus 106 to an integrated memory controller (IMC) 140 according to the present invention. The integrated memory controller (IMC) 140 includes numerous novel system elements for greatly increasing the performance of the computer system. It is noted that the IMC 140 can be used as the controller for main system memory 110 or can be used to control other memory subsystems as desired. The IMC 140 may also be used as the graphics controller in computer systems using prior art architectures having separate memory and video subsystems.

The IMC 140 couples to system memory 110, wherein the system memory 110 comprises one or more banks of memory. In the preferred embodiment, the system memory 110 comprises two banks of memory, and the IMC 140 preferably includes two symmetric memory ports for coupling to the two banks in system memory 110. The IMC 140 of the present invention may couple to any of various types of memory, as desired. In the preferred embodiment, the IMC 140 couples to the system memory 110 through a RAMBUS implementation. For more information on the RAMBUS memory architecture, please see "RAMBUS Architectural Overview," version 2.0, published July 1993 by RAMBUS, Inc., and "Applying RAMBUS Technology to Desktop Computer Main Memory Subsystems," version 1.0, published March 1992 by RAMBUS, Inc., which are both hereby incorporated by reference. In an alternate embodiment, the system memory 110 comprises SGRAM or single in-line memory modules (SIMMs). As noted above, the IMC 140 of the present invention may couple to any of various types of memory, as desired.

The IMC 140 also generates appropriate video signals for driving video display monitor 142. The IMC 140 preferably generates red, green, blue (RGB) signals as well as vertical and horizontal synchronization signals for generating images on the video display 142. Therefore, the integrated memory controller 140 of the present invention integrates memory controller and video and graphics controller capabilities into a single logical unit. This greatly reduces bus traffic and increases system performance. In one embodiment, the IMC 140 also generates appropriate data signals that are provided to Audio DAC 144 for audio presentation. Alternatively, the IMC 140 integrates audio processing capabilities and provides audio signal outputs that are provided directly to speakers. A boot device 146 is also coupled to the IMC 140 to configure or boot the IMC 140, as described further below.

Figure 3:
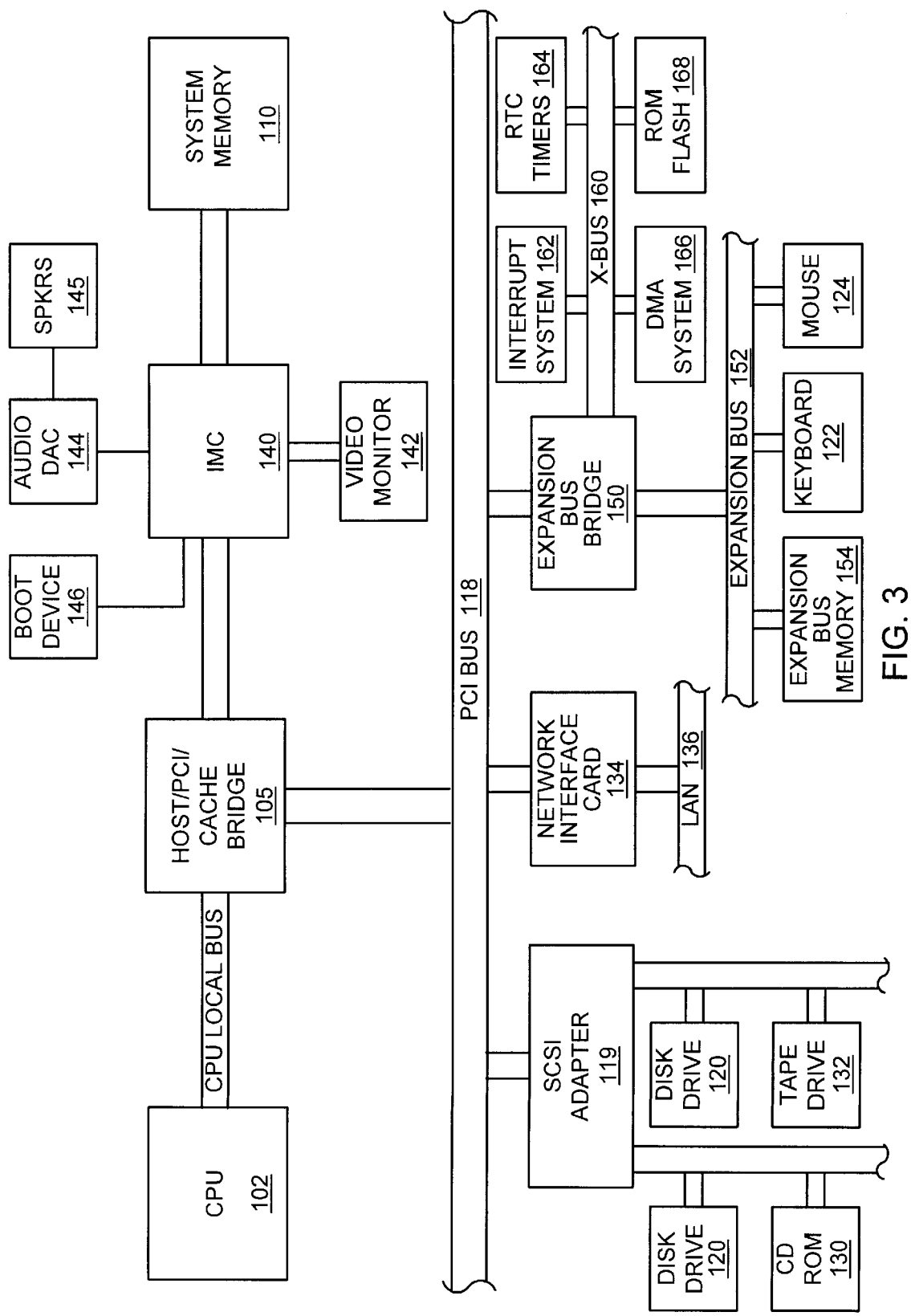
FIG. 3 illustrates a block diagram of a computer system including an IMC according to the present invention.

The IMC 140 of the present invention is preferably situated either on the main CPU bus or a high speed system peripheral bus. In the preferred embodiment, as shown in FIGS. 2 and 3, the IMC 140 is coupled directly to the system bus 106 or CPU bus, wherein the IMC 140 interfaces through a cache system 104 to the CPU 102. In an alternate embodiment, the IMC 140 is situated on the peripheral component interconnect (PCI) bus, which is a high speed peripheral local bus standard developed by Intel Corporation. For more information on the PCI bus, please see "PCI System Architecture" by Tom Shanley and Don Anderson, copyright 1993 by MindShare Inc., which is hereby incorporated by reference. Please also see PCI documentation available from Intel Corporation. In this embodiment, the cache 104 preferably comprises a PCI/cache bridge, and the system bus 106 is preferably a PCI bus. However, it is noted that the IMC 140 can sit on any various types of buses as desired.

An I/O subsystem controller 116 is coupled to the system bus 106. The I/O subsystem controller 116 in turn is coupled to an I/O bus 118. Various I/O devices are coupled to the I/O bus including a hard disk 120, keyboard 122, and mouse 124, as shown. In an embodiment including a PCI bus, the I/O subsystem Controller 116 is coupled to the PCI bus.

Typical computer programs require more system bus bandwidth for the transfer of application data than the transfer of program code executed by the CPU. Examples of application data include a bit mapped image, font tables for text output, information defined as constants, such as table or initialization information, etc. Graphical and/or video data, for example, is processed by the CPU 102 for display before the video data is written to the graphical output device. Therefore, in virtually all cases, the actual program code executed by the CPU 102 which manipulates the application data consumes considerably less system memory 110 for storage than the application data itself.

The IMC 140 includes a novel system architecture which helps to eliminate system bandwidth bottlenecks and removes extra operations required by the CPU 102 to move and manipulate application data. The IMC 140 includes data compression and decompression engines which allow application data to move about the system in a compressed format. The operation of the compression and decompression engines in the IMC 140 is discussed in greater detail below. The IMC 140 also includes a high level protocol for the graphical manipulation of graphical data or video data which greatly reduces the amount of bus traffic required for video operations and thus greatly increases system performance. This high level protocol includes a display list based video refresh system and method whereby the movement of objects on the video display screen 142 does not require movement of pixel data in the system memory 110, but rather only requires the manipulation of display address pointers in a Display Refresh List, thus greatly increasing the performance of pixel bit block transfers, animation, and manipulation of 2D and 3D objects.

It is noted that the term "graphical data" is commonly used to refer to data written to the parallel side of VRAM or the data stored to/from the frame buffer. The term graphical data is also used to refer to graphical objects or pixel data rendered to memory. The term video data is typically used to refer to data that is provided to the RAMDAC during refresh for monitor output. In the present disclosure, the term video data is used to mean both graphical data and video data.

FIG. 2 illustrates the data transfer path of data within a computer system including the IMC 140 according to the present invention. As mentioned above, in typical computer systems, the program code and data is initially stored on the hard disk drive 122. First, the IMC 140 reads program code and data stored on the disk 120 using a direct memory access (DMA) and burst control methods where the IMC 140 acts as a master on the system bus 106. The program code and data are read from the disk 120 by the IMC 140 and stored in the system memory 110. In an alternative embodiment, the program code and data are transferred from the disk 120 to the IMC 140 under CPU control. The data is transferred from the hard disk 120 to the system memory 110 preferably in a compressed format, and thus the data requires less disk storage and reduced system bus bandwidth. As the data is transferred from the disk 120 to the IMC 140, the data is preferably decompressed by the decompression engine within the IMC 140 and stored in the system memory bank 110. In general, disk I/O transfer rates are sufficiently slow to allow decompression and storage of the data as the compressed data is received from the disk 120.

The CPU 102 begins program execution by reading the recently decompressed program code from the system memory 110. Portions of the program code contain information necessary to write data and/or instructions back to the IMC 140 using a special graphical protocol to direct the IMC 140 to control the display output on the video display 142. In many cases, the graphical data is not required to leave the system memory 110 and is not required to move to another location in system memory 110, but rather the display list-based operation and high level graphical protocol of the IMC 140 of the present invention enables the CPU 102 to instruct the IMC 104 how window and other graphical data is presented on the screen. This provides a tremendous improvement over prior art systems.

The high level graphical protocol used by the IMC 140 of the present invention eliminates many of the CPU reads and writes of graphical information across the system bus 106 that are required in prior art systems. Instead, a computer system incorporating an IMC 140 according to the present invention includes a high level graphical protocol whereby the CPU 102 instructs the IMC 140 to manipulate the data stored in the system memory 110. For example, when text which appears in a window on the video screen is manipulated, the text is not required to leave the system memory 110 for processing by the CPU 102. Rather, the IMC 140 reads the text data into the system memory 110, preferably in ASCII format, and the IMC 140 processes the text data for display output. This operation is performed under the direction of the CPU 102 through the high level graphical protocol used by the IMC 140, as described further below. Another example is a back store of window information when windows are occluded or moved to the background of the video screen. In current prior art computer system, this operation requires either extra cost for memory in the graphical subsystem, i.e., additional video memory or VRAM, or the CPU 102 is required to move the occluded information from the graphical subsystem back into the system memory for temporary storage. In the IMC architecture of the present invention, the data remains in the same location in system memory 110 and is easily recalled when required. No data movement or backstore of data within system memory is required, but rather the only change required is an update of window assembly pointers in system memory. The IMC 140 of the present invention includes a novel Window Assembler system and method which performs pointer-based window assembly for the display output during screen refresh with greater efficiency. This allows for windows to remain in their original form and location without modification or transfer of the back store data to another memory address or subsystem.

Therefore, the IMC 140 of the present invention reduces the amount of data required to be moved within the system for processing, thus reducing the overall cost while improving the performance of the computer system. First, the system bus 106 is not required to be as wide or as fast. Second, the CPU 102 spends much less time moving data between the various subsystems. This frees up the CPU 102 and allows the CPU 102 greater time to work on the application program rather than moving data around the system. Third, in a computer system incorporating the IMC 140, only a single memory subsystem is required, i.e., the system memory 110, thus eliminating the redundant video memory and associated control logic, reducing the overall cost of the system. As noted above, prior art computer systems typically include separate memory and separate video display buffer or video RAM (VRAM). Thus, a typical prior art computer system may include 8 Megabytes of system memory and 2 Megabytes of video memory. The IMC 140 of the present invention eliminates the requirement of the separate video memory subsystem and expensive VRAM memory, thus reducing system costs. Fourth, the IMC 140 of the present invention integrates data compression and decompression engines into the memory controller unit. This reduces the amount of disk storage or archive storage requirements and thus reduces overall system costs. This also reduces the required amount of system memory because, when data is compressed for storage, more off-screen or non-recently-used data can be stored in system memory 110. This allows faster memory access time since less time is required to decompress the compressed data in system memory 110 than to retrieve the data from the hard disk 120. The incorporation of data compression and decompresses engines in the memory controller unit and also offloads compression tasks from the CPU 102 and avoids use of the cache system for decompression, thereby increasing system performance. A computer system including an IMC 140 of the present invention also includes a high level graphical communication protocol between the CPU 102 and the IMC 140, thus further reducing bus traffic and increasing performance. The IMC 140 of the present invention includes many other novel logic and methods for the manipulation of data which greatly improve system performance over prior art designs.

Computer System Block Diagram

Referring now to FIG. 3, a block diagram illustrating the preferred embodiment of a computer system incorporating the IMC 140 according to the present invention is shown. It is noted that the present invention may be incorporated into any of various types of computer systems having various system architectures. As shown, the computer system includes a central processing unit (CPU) 102 which is coupled through a CPU local bus to a host/PCI/cache bridge 105. The bridge 105 incorporates the cache 104 and I/O subsystem controller 116 of FIG. 2.

The IMC 140 of the present invention couples to the bridge 105. In the preferred embodiment, the IMC 140 comprises a single chip, as shown. However, it is noted that the IMC 140 may comprise two or more separate chips or controllers, as desired. Main memory or system memory 110 couples to the IMC 140. The IMC 140 provides video outputs to video monitor 142 and audio outputs to Audio DAC 144. Speakers 145 are connected to the Audio DAC 144. A boot device 146 is preferably coupled to the IMC 140. The host/PCI/cache bridge 105 also interfaces to a peripheral component interconnect (PCI) bus 118. In the preferred embodiment, a PCI local bus is used. However, it is noted that other local buses may be used, such as the VESA (Video Electronics Standards Association) VL bus or a proprietary bus. In an alternate embodiment, the IMC 140 is coupled directly to the PCI bus 118 as a PCI device. Alternatively, the IMC 140 is adapted to the P6.0 bus, which is a high-speed interconnect for Intel P6 processors and related devices. In one embodiment, the IMC 140 includes a pin-strappable interface which can couple either to the PCI bus or to an address/data CPU bus.

Various types of devices may be connected to the PCI bus 118. It is noted that, in prior art computer systems, a video adapter and video frame buffer would be coupled to the PCI bus 118 for controlling video functions. However, in the computer system of the present invention, video functions are performed by the IMC 140. Also, video data is stored in system memory 110, and thus a separate video frame buffer is not required.

As shown in FIG. 3, a SCSI (small computer systems interface) adapter 119 is coupled to the PCI bus 118. In the embodiment shown in FIG. 3, the SCSI adapter connects to two disk drive units 120, a CD-ROM 130, and a tape drive 132. Various other devices may be connected to the PCI bus 118, such as a network interface card 134. As shown, the network interface card 134 interfaces to a local area network (LAN) 136.

In the embodiment shown, expansion bus bridge logic 150 is coupled to the PCI bus 118. The expansion bus bridge logic 150 is coupled to the PCI bus 118. The expansions bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154, a keyboard 122 and a mouse 124. The expansion bus bridge logic 150 also couples to a peripheral expansion bus referred to as the X-bus 160. The X-bus 160 is used for connecting various peripherals to the computer system, such as an interrupt system 162, a real time clock (RTC) and timers 164, a direct memory access (DMA) system 166, and ROM/Flash memory 168, among others.

Alternate Computer System Embodiments

Figure 3A:
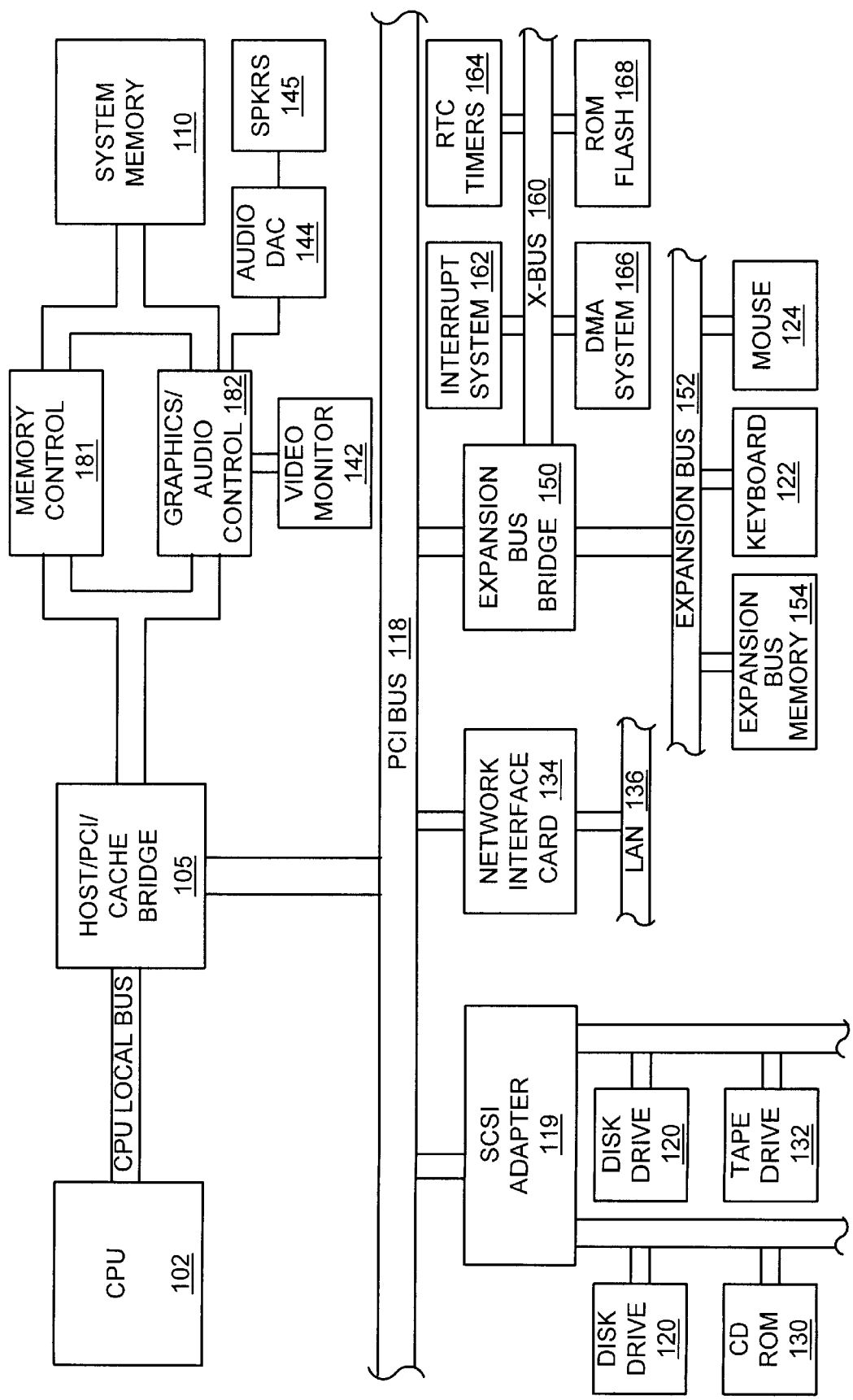
FIG. 3A illustrates an alternate embodiment of the computer system of FIG. 3 including memory control and graphics/audio blocks coupled to the system memory.

FIG. 3A illustrates an alternate embodiment of the computer system of FIG. 3 including memory control and graphics/audio blocks coupled to the system memory 110. In this embodiment, the host/PCI/cache bridge 105 couples to a memory control block 181 which couples to system memory 110. The host/PCI/cache bridge 105 also couples to a graphics/audio control block 182 which couples to system memory 110. Video monitor 142 and audio DAC 144 are coupled to the graphics/audio block 182. Speakers 145 connect to the Audio DAC 144. Thus, in this embodiment, the internal logic of the IMC 140 is split into two chips 181 and 182, one comprising the memory control logic 181 and the other comprising the graphics/audio control logic 182. This embodiment is preferably used where it is impractical to include both the memory and graphical capabilities of the IMC 140 of the present invention on a single chip.

Figure 3B:
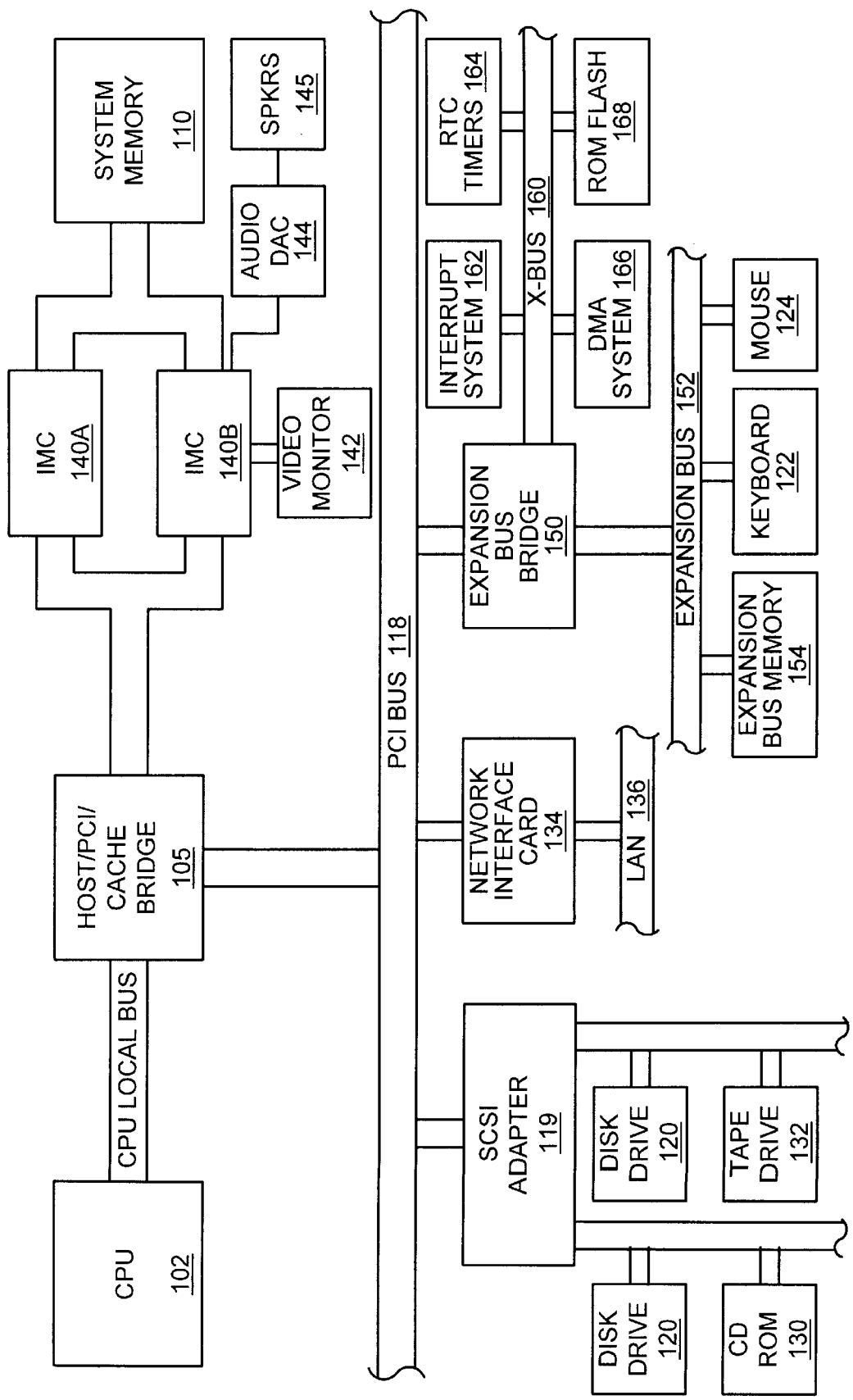
FIG. 3B illustrates an alternate embodiment of the computer system of FIG. 3 including two IMCs coupled to the system memory.

FIG. 3B illustrates an alternate embodiment of the computer system of FIG. 3 including two IMCs 140a and 140b coupled between the host/PCI/cache bridge 105 and the system memory 110. In one embodiment the IMC 140a is used solely for memory control functions and the IMC 140b is used solely for graphical and audio functions. Alternatively, the IMCs 140a and 140b each perform both memory and graphics/audio functions for increased performance. For example, the video monitor 142 may optionally be coupled to both IMCs 140a and 140b.

Figure 3C:
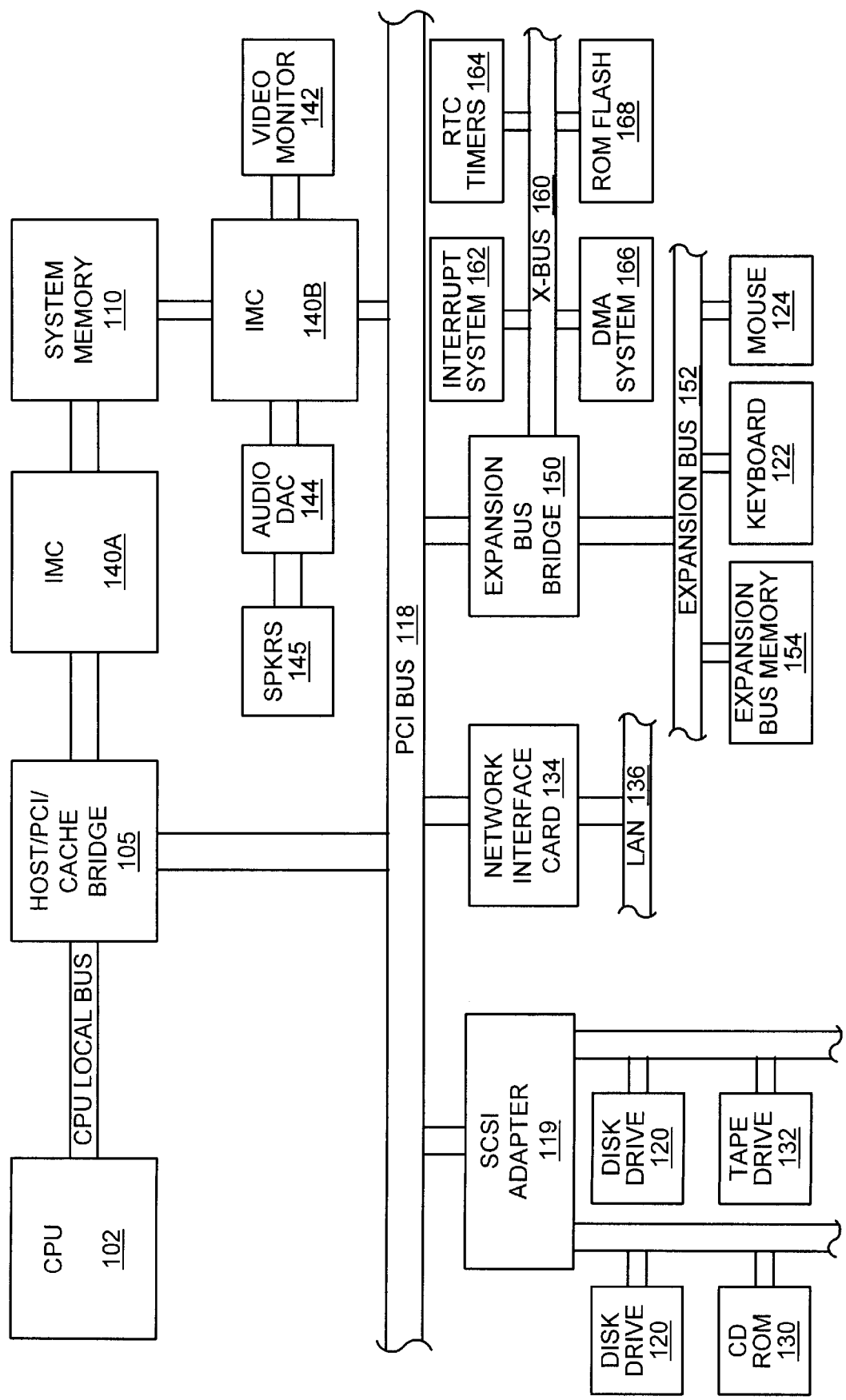
FIG. 3C illustrates an alternate embodiment of the computer system of FIG. 3 including a first IMC coupled to the cache bridge which couples to system memory and a second IMC coupled to the PCI bus which couples to system memory.

FIG. 3C illustrates an alternate embodiment of the computer system of FIG. 3 including a first IMC 140 a coupled between the host/PCI/cache bridge 105 and the system memory 110. A second IMC 140b is coupled to the PCI bus 118, and the second IMC 140b also couples to the system memory 110. Video monitor 142 and Audio DAC 144 are coupled to the IMC 140b and speakers 145 connect to the Audio DAC 145. Alternatively, the first IMC 140a can simply be a memory controller without graphical or audio capabilities.

Figure 3D:
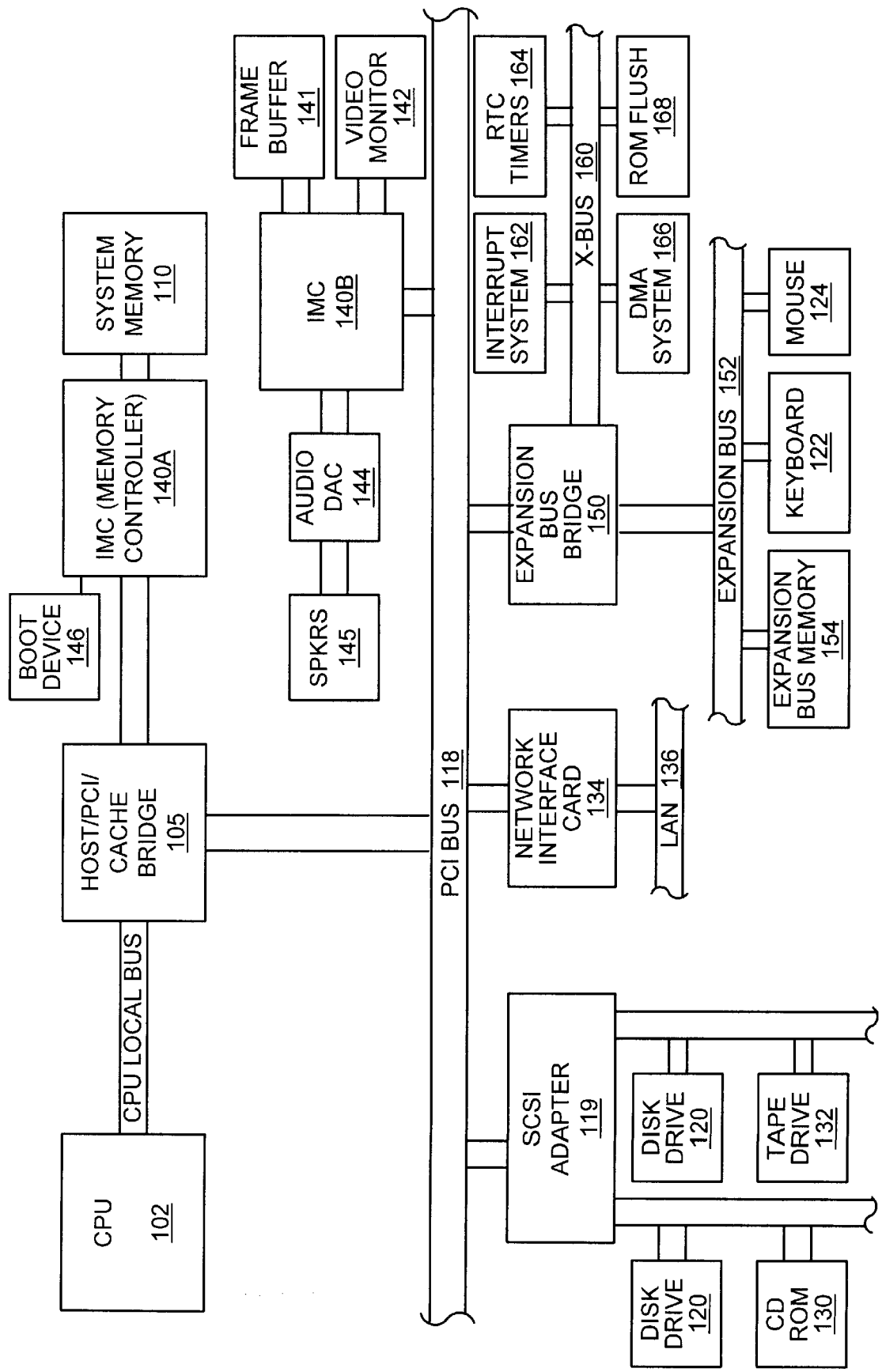
FIG. 3D illustrates a computer system including the IMC and using a prior art architecture where the IMC couples to the PCI bus and uses a separate frame buffer memory for video data.

FIG. 3D illustrates a computer system including the IMC and using a prior art architecture. A first IMC 140a or memory controller is coupled between the host/PCI/cache bridge 105 and the system memory 110. A second IMC 140b couples to the PCI bus 118. A frame buffer 141 separate from system memory 110 is coupled to the IMC 140b. Video monitor 142 and Audio DAC 144 are coupled to the IMC 140b and speakers 145 connect to the Audio DAC 145. This embodiment does not have the same advantages as the embodiments described above because a separate frame buffer 141 is used. Also, this system requires graphical data or pixel data transfers between the system memory 110 and the frame buffer 141, which are not required in the above systems.

In an alternate embodiment, the IMC 140 is included in a system having an architecture similar to that of FIG. 1. In this embodiment, the computer system includes a dedicated (non-IMC) memory controller, and the IMC 140 is used as the graphics accelerator in the graphics adapter 112. Alternatively, the computer system includes two IMCs, one as the memory controller 108 and one as the graphics controller 112.

IMC as a Bus Master

In the preferred embodiment, the IMC 140 is a system bus master, thus providing a better cost/performance ratio. In the preferred embodiment of FIG. 3, the IMC 140 can act as a master on the PCI bus 118 in a similar manner that the CPU 102 acts as a master on the PCI bus 118. In one embodiment, the PCI/cache bridge 105 includes arbitration logic, and the CPU 102 and the IMC 140 arbitrate for control of the PCI bus 118. As is well known, a PCI master is able to initiate burst mode or DMA data transfers onto or off-of the system bus, and such transfers minimize the amount of work the CPU 102 and IMC 140 must perform to move data around the system. Since the IMC 140 is a PCI master, memory acquisition or data transfers of certain data-types which are stored in permanent storage (disks) or across the network (LAN) do not consume CPU resources. It is noted that the CPU 102 must service the request to transfer, (IMC register initialization for the transfer). However, the CPU 102 is not required to actually perform the data transfer once the link has been established, and thus CPU processing time is saved. In the preferred embodiment where the IMC 140 is a bus master, once the CPU 102 has set up the data transfer, data movement is controlled by the IMC 140. In this case the IMC 140 may be tasked with decompression of data coming off of the system hard drive. Another example is an external MPEG decoder for live video. Once initialized, the IMC 140 moves and prepares the data for display without CPU intervention. With the IMC's ability to control transfer, decompression and display, the CPU 102 is not required to use processing power in order to transfer data between subsystems.

IMC Interface

Figure 4:
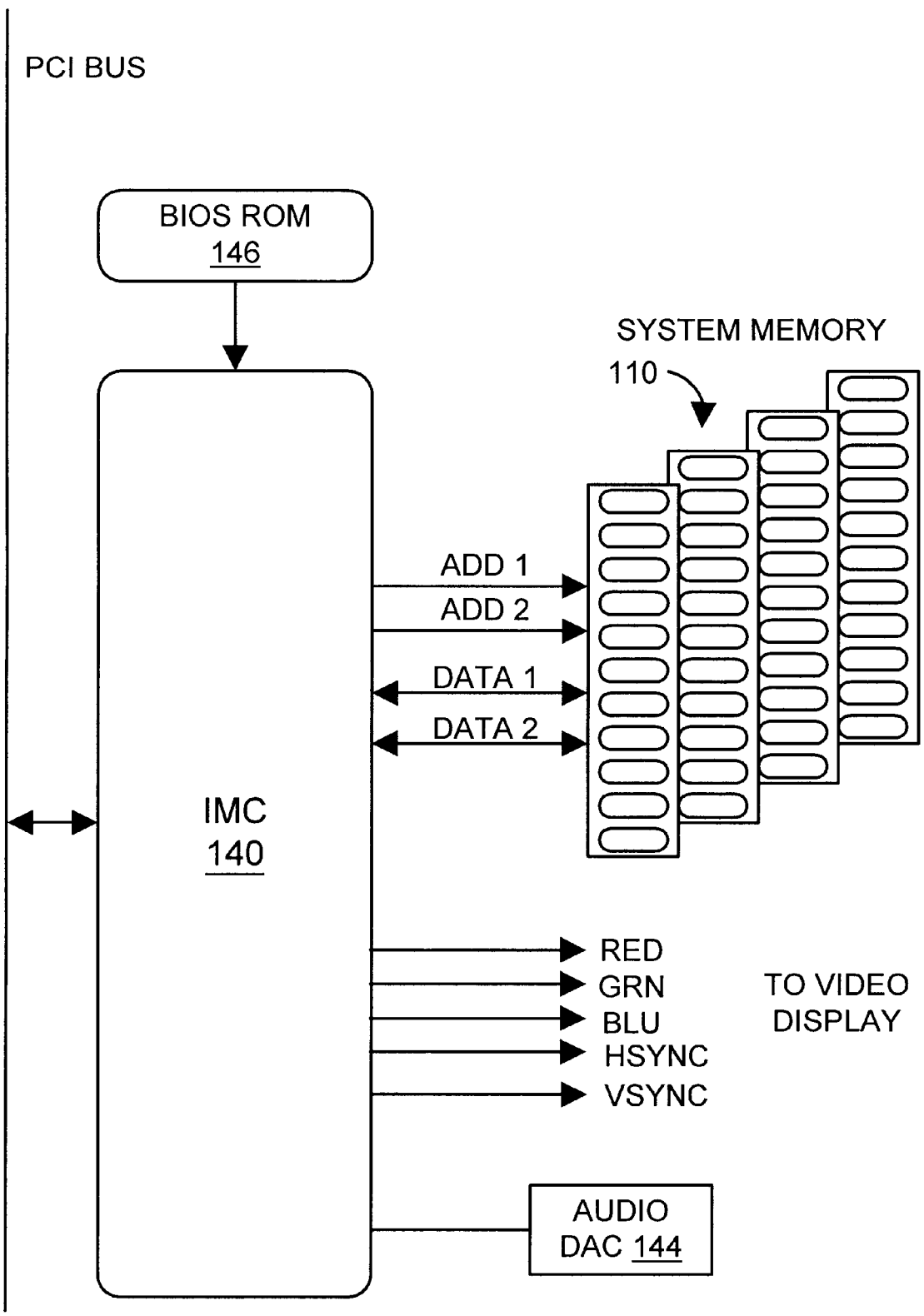
FIG. 4 is a block diagram illustrating the IMC interfacing to system memory and a video display monitor.

Referring now to FIG. 4, a block diagram illustrating how the IMC 140 interfaces to various devices is shown. In the embodiment shown in FIG. 4, the IMC 140 is coupled to a PCI bus wherein the PCI bus is the system bus 106. However, in the preferred embodiment, the IMC 140 is coupled to an expansion bus/cache bridge 105, as shown in FIG. 3. An external BIOS ROM 146 is coupled to the IMC 140 for boot and initialization of the computer system. As mentioned above, in the preferred embodiment the IMC 140 includes dual memory control units for connection of up to 512 Megabytes of system memory. Each memory control unit generates respective address and data signals as shown. For example, a first memory control unit generates address and data signals (Add1 and Data1) and a second memory control unit also generates address and data signals (Add2 and Data2). In an alternate embodiment, the IMC 140 includes a single memory control unit. The IMC 140 also generates the appropriate video signals for driving the video display monitor 142. As shown, the IMC 140 generates red, green and blue signals referred to as red, grn and blu, for driving the video display monitor 142 and generates horizontal and vertical synchronization signals referred to as HSYNC and VSYNC, respectively. The IMC 140 further generates audio signals to an Audio DAC 144, which in turn provides analog audio signals to one or more speakers (not shown).

IMC System Boot Procedure

The BIOS ROM 146 stores boot data, preferably in a compressed format. At power-up, the IMC 140 reads and decompresses the BIOS data from the BIOS ROM 146 into a normal format and loads the data into the system memory 110. In the preferred embodiment, all memory accesses are suspended until the boot code has been transferred to the system memory 110 and is ready to be read. All internal IMC mapping registers default to point to the boot code for power on operation. Once the boot code has been loaded into system memory 110, the CPU 102 traps the starting address of the boot code to begin boot operations.

The boot code is responsible for a number of configuration options of the IMC 140. When a reset input to the IMC 140 referred to as nRESET goes inactive high, configuration resistors tied to inactive signals determine the start up procedures. If the configuration is set to boot from the IMC boot code, the data is read by the IMC 140, optionally decompressed, and transferred into the system memory 110. Before this operation can take place, the IMC 140 must also be programmed. When the boot device 146 is connected to the IMC 140, the first portion of the boot code is specific to the IMC 140. This code is read from the boot device 146 into the IMC instruction register FIFO. IMC instructions such as load and store registers set up the initialization of the IMC. These operations include but are not limited to: set refresh, map PCI memory bounds, initialize display timing, and read main CPU boot code to specific system memory address. In addition, if the boot code is in a compressed format, the IMC initialization routine sets up the IMC for decompression of such code. It is noted that all boot code for the IMC is in a "non-compressed" format. Once the system boot and driver have been initialized, the IMC protocol for instruction processing can be in a compressed format.

Once the boot code is transferred to the system memory 110 by the IMC 140, an NMI or high level interrupt is generated from the IMC interrupt output pin. Optionally, the IMC can communicate a "NOT READY" status to the CPU 102 to prevent access until the boot memory 146 is in place. After the IMC 140 has set the memory bounds and configured the PCI interface configuration, set display and memory refresh timings, decompressed and/or loaded host CPU boot code into system memory, an interrupt out instruction from the IMC 140 directs the host CPU 102 to begin instruction execution for completion of system initialization.

Non-IMC System Boot Procedure

In an alternate embodiment, the computer system does not include a boot device coupled to the IMC boot device port. In this embodiment, the IMC 140 resides in the system as a coprocessor. A waiting register loads into the IMC 140 to enable access to the main memory 110. In an embodiment where the IMC 140 is coupled to the PCI bus, the IMC 140 contains the correct configuration information in order for the system to recognize the IMC 140 as a PCI peripheral device. In this architecture the host CPU 102 is responsible for register loads to initialize the IMC 140. Such initialization sets up the decode memory map for non-compressed and compressed data storage, as well as the display for output and any other set-up required to boot the operating system.

IMC Block Diagram

Figure 5:
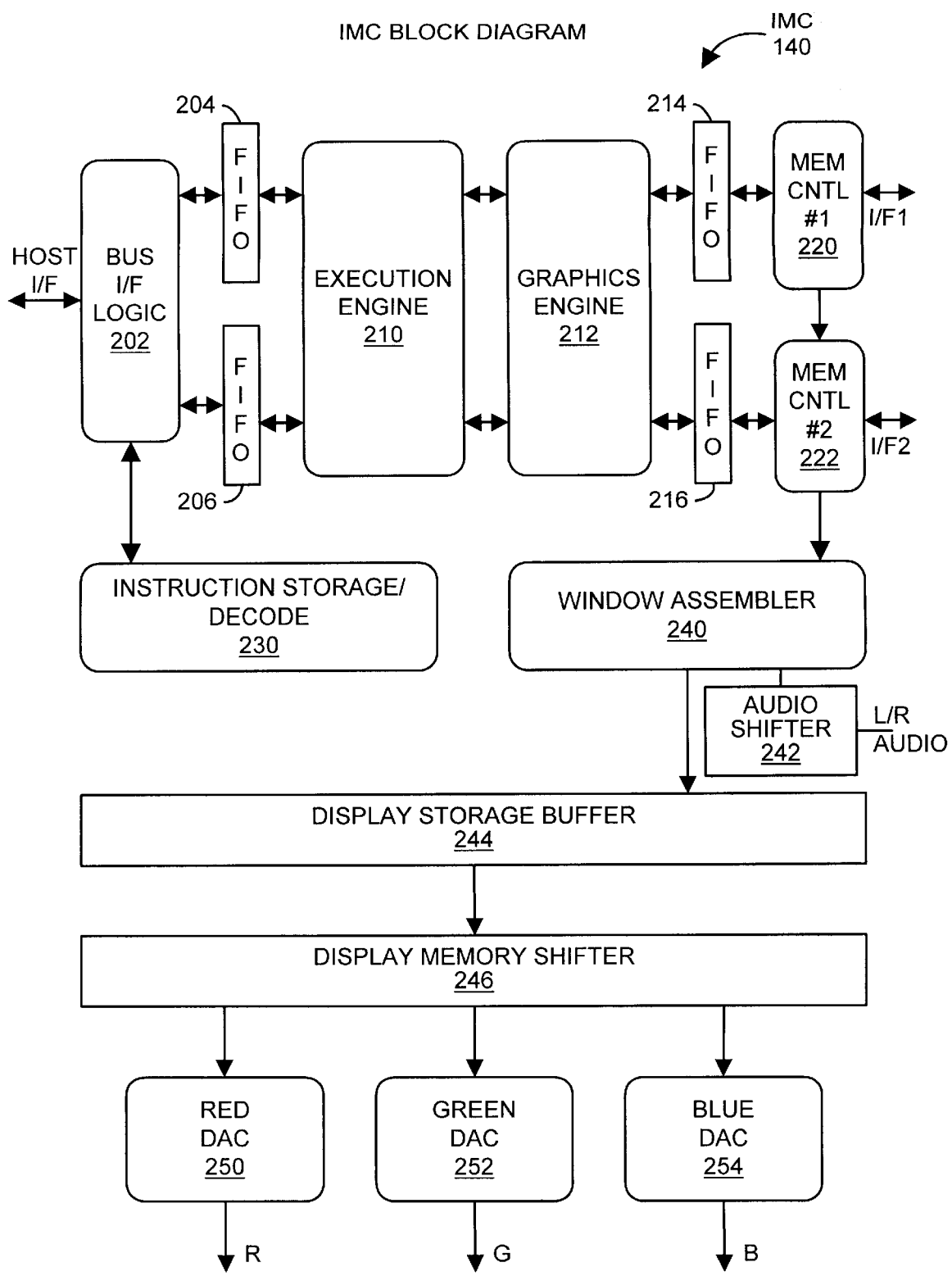
FIG. 5 is a block diagram illustrating the internal architecture of the integrated memory controller (IMC) of the present invention.

FIG. 5 illustrates a more detailed block diagram of the internal components comprising the IMC 140 of the present invention. It is noted that various of the elements in FIG. 5 are interconnected with each other, wherein many of the various interconnections are not illustrated in FIG. 5 for simplicity.

As shown, the IMC 140 includes bus interface logic 202 for coupling to the host computer system, i.e., for coupling to the system bus 106. In the preferred embodiment, the system bus 106 is the CPU bus or host bus. Alternatively, the system bus 106 is the PCI bus, and the bus interface logic 202 couples to the PCI bus. Instruction storage/decode logic 230 is coupled to the bus interface logic 202.

The bus interface logic 202 couples to an execution engine 210 through two first in first out (FIFO) buffers 204 and 206. In other words, the two FIFO buffers 204 and 206 are coupled between the bus interface logic 202 and the execution engine 210. The FIFO buffers 204 and 206 decouple data transfers between the external asynchronous computer system and the synchronous logic comprised within the IMC 140. The execution engine 210 includes data compression and decompression engines according to the present invention, as described further below. The execution engine 210 also include texture mapping logic for performing texture mapping on pixel data.

The execution engine 210 couples to a graphics engine 212. The graphics engine 212 essentially serves as the graphical adapter or graphics processor and includes various graphical control logic for manipulating graphical pixel data and rendering objects. The graphics engine 212 includes polygon rendering logic for drawing lines, triangles, etc., i.e., for interpolating objects on the display screen 142. The graphics engine 212 also includes other graphical logic, including ASCII to font conversion logic, among others. The instruction storage/decode logic 230 stores instructions for execution by the graphics engine 212.

The graphics engine 212 couples to respective memory control units referred to as memory control unit #1 220 and memory control unit #2 222 via respective FIFO buffers 214 and 216, respectively. Memory control unit #1 220 and memory control #2 222 provide interface signals to communicate with respective banks of system memory 110. In an alternate embodiment, the IMC 140 includes a single memory control unit. The graphics engine 212 reads graphical data from system memory 110, performs various graphical operations on the data, such as formatting the data to the correct x,y addressing, and writes the data back to system memory 110. The graphics engine 210 performs operations on data in the system memory 110 under CPU control using the high level graphical protocol. In many instances, the graphics engine 210 manipulates or resets pointers in the display list window workspace stored in system memory 110, rather than transferring the pixel data to a new location in system memory 110.

The two memory control units 220 and 222 can each preferably address up to 256 Megabytes of system memory 110. Each memory control unit 220 and 222 comprises a complete address and data interface for coupling to system memory 110. Each memory control unit 220 and 222 also includes internal collision logic for tracking of operations to avoid data coherency problems. The memory control units 220 and 222 are coupled internally and include a complete display list of memory operations to be performed. Multiple display lists are used for memory transfers as well as screen refresh and DRAM refresh operations. Both memory control units 220 and 222 span the entire memory interface address space and are capable of reading any data comprised within the system memory 110.

A Window Assembler 240 is coupled to each of the memory control units 220 and 222. The Window Assembler 240 includes logic according to the present invention which assembles video refresh data on a per window basis using a novel pointer-based Display Refresh List method. This considerably improves system and video performance. The Display Refresh List is stored in system memory 110 and includes pointers which reference video data for display. The Window Assembler 240 also maintains a respective window workspace located in system memory 110 for each window or object on the display screen 142. In other words, the Window Assembler 240 includes memory mapped I/O registers which point to applications-specific memory areas within the system memory 110, i.e., areas of system memory 110 which are mapped as windows workspace memory. Each window workspace contains important information pertaining to the respective window or application, including the position of the window on the display, the number of bits per pixel or color composition matrix, depth and alpha blending values, and respective address pointers for each function. Thus each window on the display screen includes an independent number of colors, depth, and alpha planes. The information in each respective window workspace is used by the Window Assembler 240 during screen refresh to draw the respective window information on the display screen 142.

Therefore, the Window Assembler 240 maintains workspace areas in the system memory 110 which specify data types, color depths, 3D depth values, screen position, etc. for each window on the screen. A Display Refresh List or queue is located in system memory 110, and the Window Assembler 240 dynamically adjusts the Display Refresh List according to the movement of data objects which appear on the video display screen 142. Thus, when an object or window is moved to a new position on the video screen, the data comprising the object does not transfer to another location in system memory 110. Rather, only the display pointer address is changed in the Refresh List. This provides the effect of moving data from a source address to a destination address, i.e., a bit block transfer (bit blit), without ever having to move data comprising the object to a new location in system memory 110. This provides greatly increased performance over conventional bit blit operations commonly used in graphical systems.

The Window Assembler 240 is coupled to a display storage buffer 244 where the screen refresh pixel data is stored. The display storage buffer 244 is coupled to a display memory shifter 246 which in turn is coupled to respective red, green and blue digital to analog converters (DACs) which provide the respective red, green and blue signals to the display unit 142. The IMC 140 also provides horizontal and vertical synchronization signals (not shown in FIG. 4). In one embodiment, the Window Assembler 240 also provides audio signal outputs to an Audio Shifter 242 which provides audio output signals, as shown.

The IMC 140 includes a bursting architecture designed to preferably burst 8 bytes or 64 bits of data during single transfers, and can also burst 32 bit (4 byte) transfers for PCI bus transfers. The IMC 140 also includes logic for single byte and multiple byte operations using either big or little endian formats. The IMC 140 transfers data between the system bus and main memory 110 and also transfers data between the system memory 110 and the internal shift registers 244 and 246 for graphical display output. All data transferred within the IMC 140 is subject to operation within the execution engine 210 and/or the graphics engine 212 as the data traverses through the data path of the IMC 140.

Compression and Decompression Engines

Figure 6:
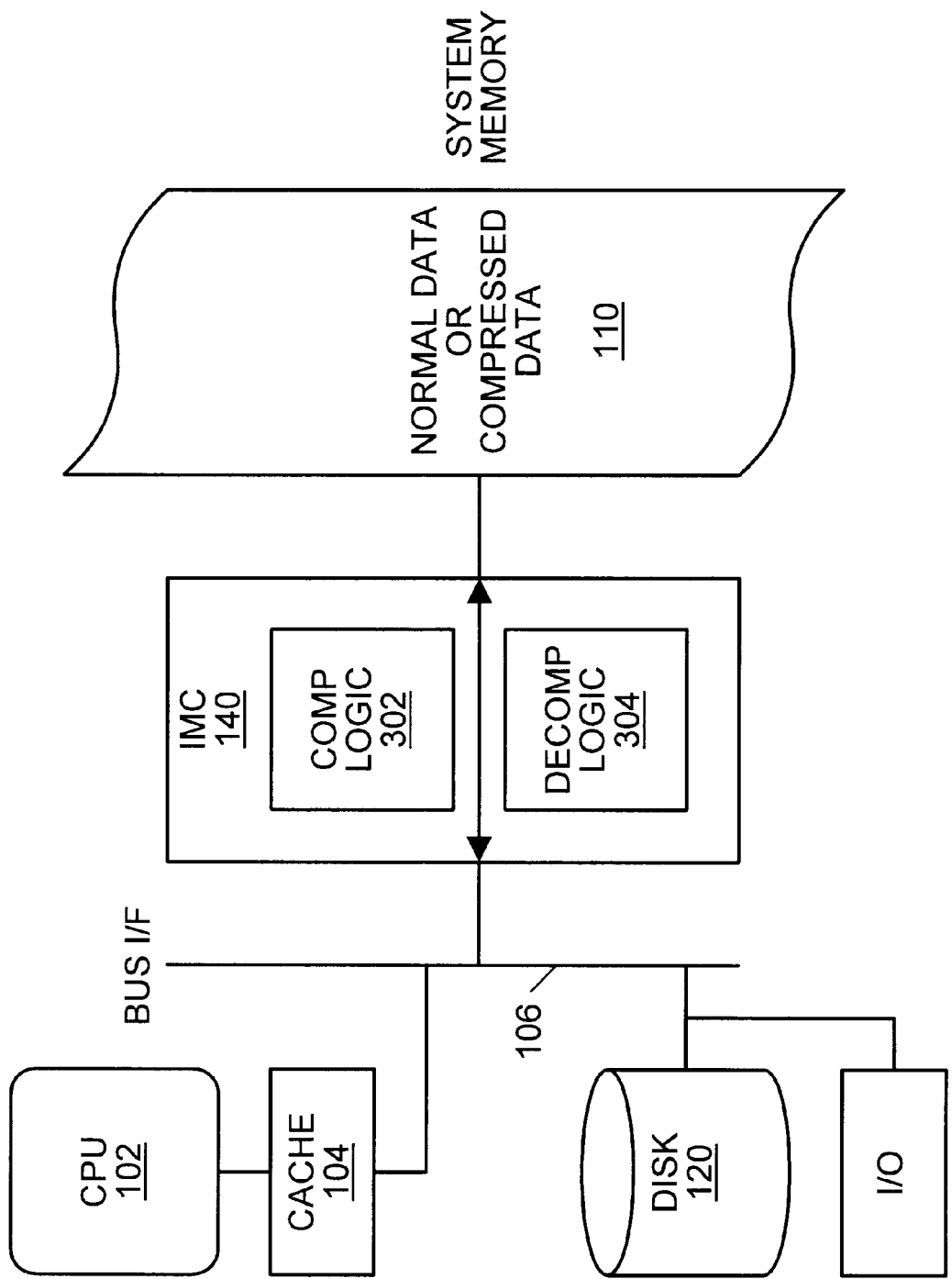
FIG. 6 illustrates the compression and decompression logic comprised in the IMC 140 according to the present invention.

Referring now to FIG. 6, the execution engine 210 in the IMC 140 preferably includes an embedded lossless data compression engine 302 and decompression engine 304 designed to compress and decompress data as data is transferred to/from system memory 110. Thus, the IMC 140 includes two data formats referred to as "compressed" data and "normal" data. The compressed data format requires less storage and thus is less expensive. The compressed format also requires less system bandwidth to transfer data between system memory 110 and I/O subsystems. Compression of normal data format to compressed data format results in a small performance penalty. However, the decompression of compressed data format to normal data format does not have an associated penalty. In one embodiment, the compression engine 302 is implemented in software by the CPU 102.

According to the present invention, a software subroutine executing on the CPU 102 directs the IMC to compress data before the data is written to system memory 110 or hard disk 120. This is preferably accomplished after the compilation period of the software and thus does not affect the performance of run time executables. During program execution, the compressed data, in the form of either executables or data files, is decompressed by the decompression engine 304 in the IMC 140 as data is retrieved from the system memory 110. Data stored in compressed format either on the hard disk 120 or on other I/O subsystems such as a LAN (local area network), serial ports, etc., is transferred to the system memory 110 and is either decompressed to normal data by the decompression engine 304 in the IMC 140 during the transfer or is stored as compressed data in the system memory 110 for later decompression.

The operation of the compression unit 302 and the decompression unit 304 in the IMC 140 are completely transparent to system level application software. According to the present invention, special directives are included in the computer's operating system software which imbed directives used in file and data transfers, where the directives are used by the IMC 140 for data manipulation. In this manner, the IMC 140 predicts the necessary data manipulation required, i.e., compression or decompression, ahead of the actual execution requirements of the software application. This system level architecture provides a mechanism for the determination of when and how data is to be transferred and the particular data format, either normal or compressed format, in which the data is to be represented. Software overrides may also be included in software applications in systems where it is desired to control decompression of data at the software application level. In this manner, an additional protocol for data compression or decompression is not required.

Data decompression is particularly important for live video system throughput. In prior art computer systems, live video is limited by the data transfer rate of the raw digital video data between the storage device, the system bus, and the system memory 110 or video subsystem. The IMC 140 of the present invention provides video acceleration with minimal CPU overhead because the IMC 140 decompresses the incoming video data. It is noted that the IMC 140 requires external video input digitization for live video. The IMC 140 also requires an external device for compression of some video formats, such as MPEG.

In addition, while incoming video input is received by the IMC 140, decompressed, and transferred to the hard disk 120 or other I/O device, the video data may also be stored in normal format in the system memory 110 for immediate display on the video monitor 142. The video data stored in the system memory 110 is displayed according to the refresh display list system and method of the present invention comprised in the Window Assembler 240. Thus, this provides the mechanism for receiving video, storing it in compressed format on the disk 120, and also displaying the live video on the display screen 142 in real time during video capture with minimal CPU involvement. Also, as discussed further below, the pointer-based display list video refresh system and method of the present invention provides greatly improved video display capabilities than that found in the prior art.

Figure 7:
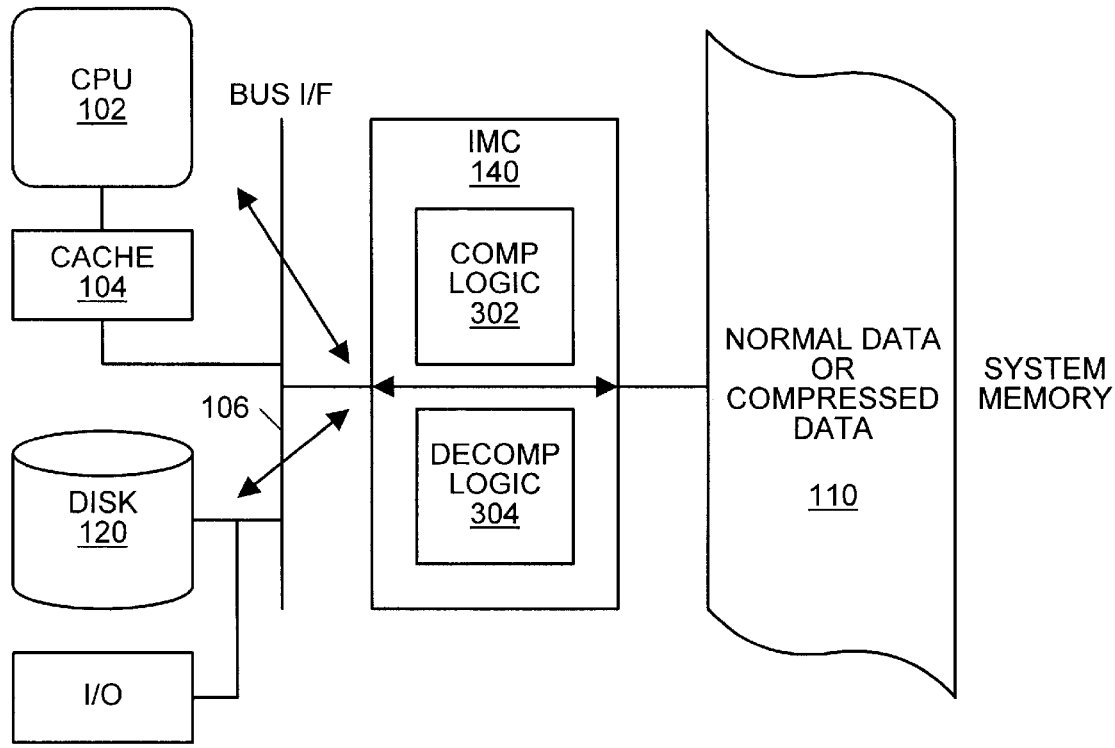
FIG. 7 illustrates normal or compressed data transfers in a computer system incorporating the IMC where the IMC does not modify data during the transfer.

FIGS. 7–15 illustrate various examples of data compression, data decompression, and data transfer within a computer system including an IMC 140 according to the present invention. FIG. 7 illustrates data transfer in either a normal format or compressed format within the computer system without modification by the IMC 140. Thus, the IMC allows data transfers by the system DMA logic or CPU without performing any type of compression or decompression operations, i.e., without any special functions or operations on the data stream. The data is stored in memory or is transferred to the disk or I/O subsystem without any modifications. It is noted prior his mode represents the standard prior art method for system data transfer where no compression or decompression operations are performed on the data by the memory controller. In this mode, the IMC 140 is unaware of the data format type and whether the data is for transfer or storage.

Figure 8:
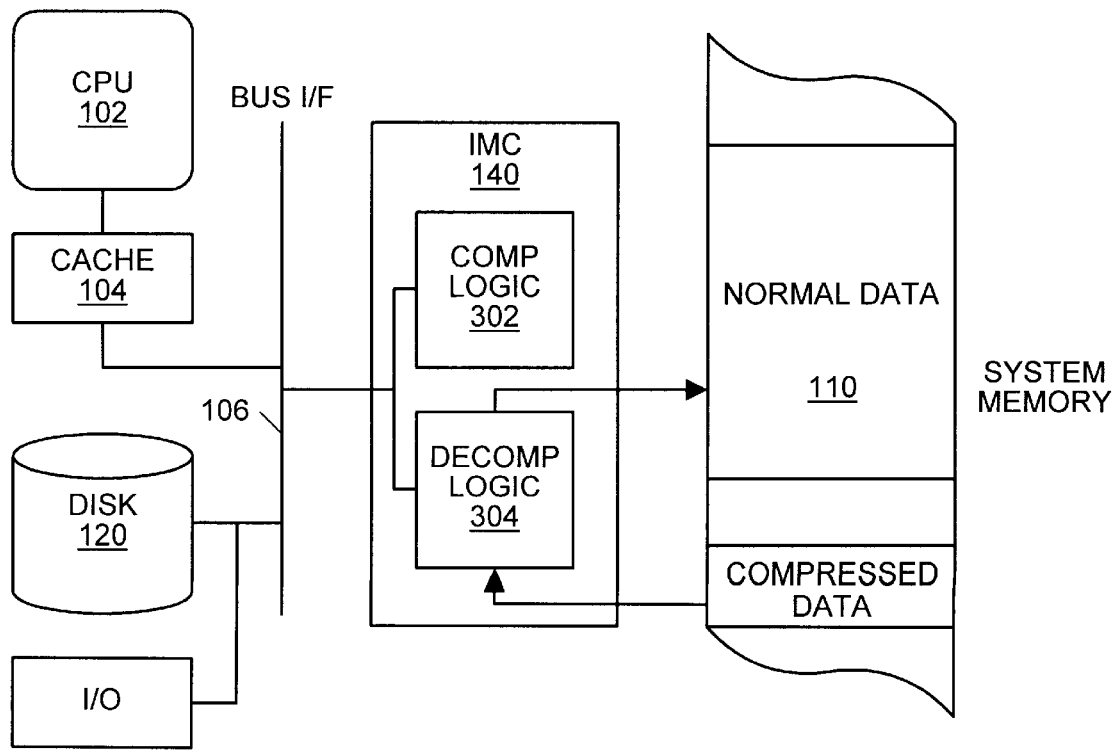
FIG. 8 illustrates a memory-to-memory decompression operation performed by the IMC according to the present invention.

FIG. 8 illustrates a memory-to-memory decompression operation implemented by the IMC 140 according to the present invention. As shown, the IMC 140 performs decompression of data within the system memory 110 without host CPU intervention, i.e., without requiring intervention of software routines executing on the host CPU 102. As shown in FIG. 8, compressed data stored in the system memory is expanded into a normal data format by passing through the decompression engine 304 in the IMC 140. This operation is necessary for preparation of executables which contain instructions and operands directly responsible for CPU program execution. The IMC 140 is directed by initialization code in the form of a malloc instruction to allocate a block for executable storage and to decompress the existing routines already present in the memory subsystem.

Figure 9:
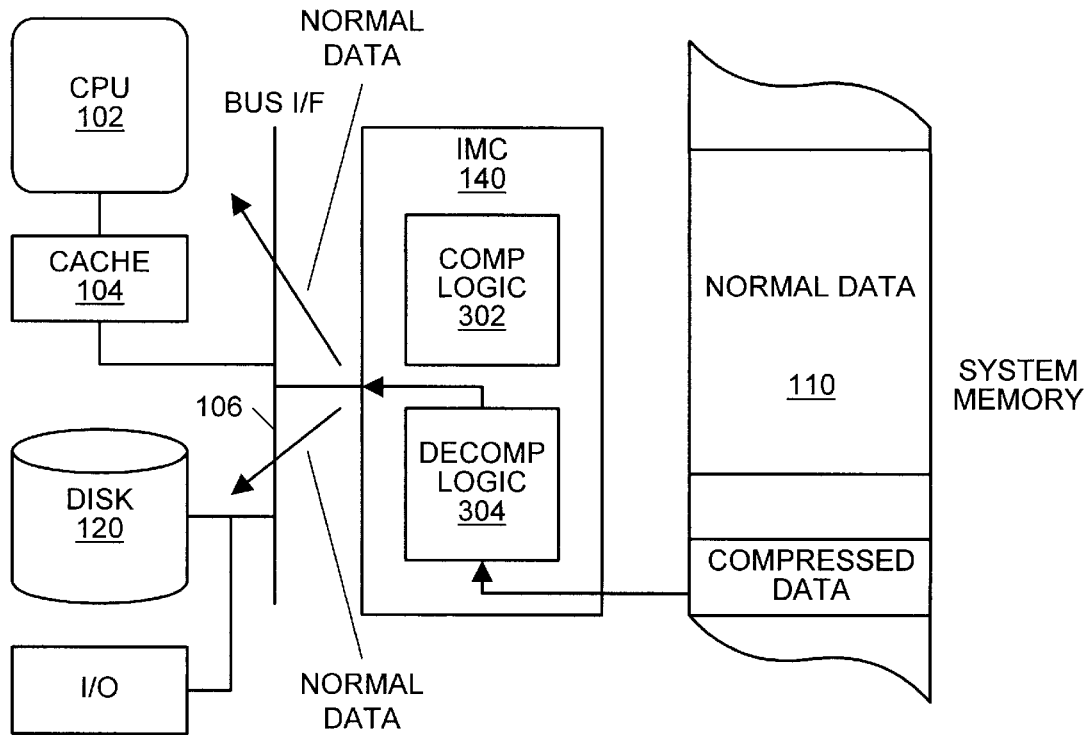
FIG. 9 illustrates a memory decompression operation performed by the IMC on data being transferred to the CPU or to a hard disk according to the present invention.

FIG. 9 illustrates operation of the decompression engine 304 in the IMC 140 obtaining compressed data from the system memory 110, decompressing the data, and transferring the data to the CPU 102 or hard disk 120. Thus, the CPU 102 or hard disk 120 or respective I/O subsystem is capable of reading normal noncompressed data for storage and/or execution from the system memory 110 even when the data stored in system memory is stored in a compressed format. The decompression engine 304 and the IMC 140 operates transparently relative to the remainder of the computer system and operates to transform compressed memory data stored in system memory 110 into noncompressed data or data in the normal format. The decompression operation is transparent and occurs during a read operation from the CPU to system memory 110. The IMC 140 also includes a look ahead architecture system which ensures that the data being read is always available. Thus, stall-out, i.e., the decompression engine 304 failing to keep up with the CPU requests, only occurs when the CPU reads blocks of nonsequential data.

Figure 10:
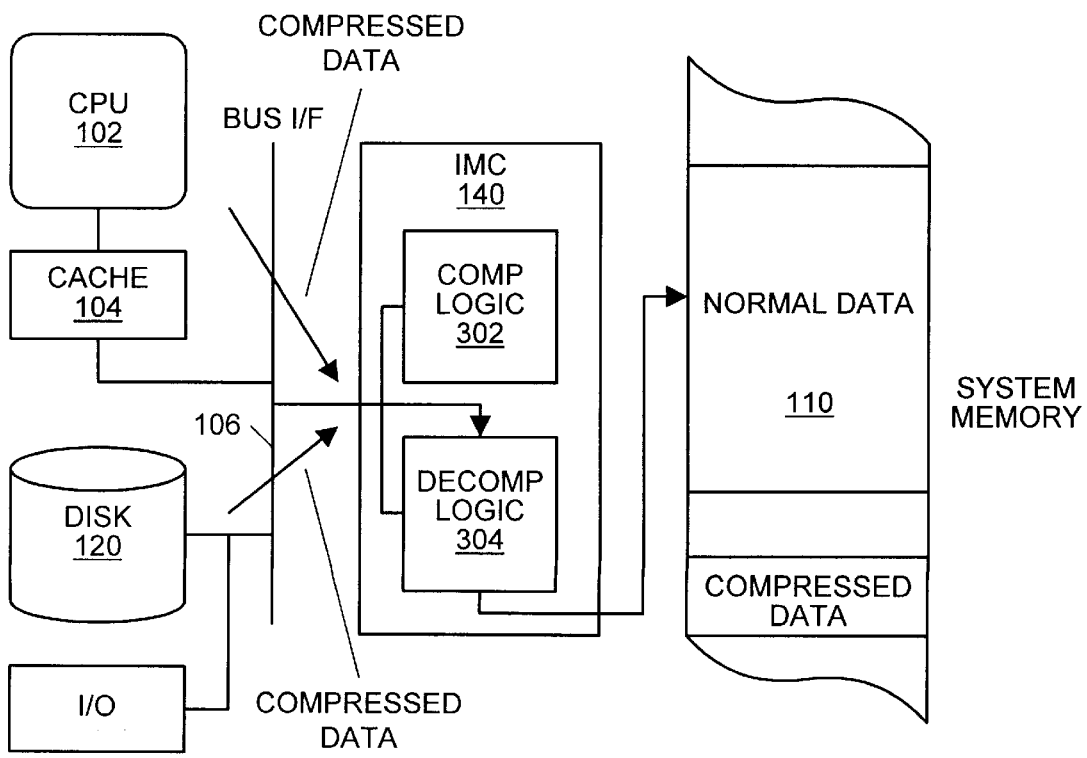
FIG. 10 illustrates decompression of data received from the hard disk or CPU that is transferred in normal format in system memory according to the present invention.

FIG. 10 illustrates operation of the IMC 140 in decompressing data from either the CPU 102 or hard disk 120 and storing the decompressed or normal data into system memory 110. Thus, data can be transferred from hard disk 120 and I/O subsystem or from the CPU 102 can be decompressed and stored in a normal format for later execution or use. This mode of operation is preferably the standard mode. This method allows smaller data files and smaller amounts of information to be transferred on the system bus as data is read from a hard disk 120 or from a local area network (LAN) via a network interface card. The CPU 102 may also obtain and/or move data from a compressed format and store the data in a normal format in the system memory 110 without the CPU 102 having to execute a decompression algorithm in software. This enables executable programs that are stored on the hard disk 120 in compressed format that are transferred by the CPU 102 in compressed format to be expanded within the IMC 140 into a normal format during memory storage.

Figure 11:
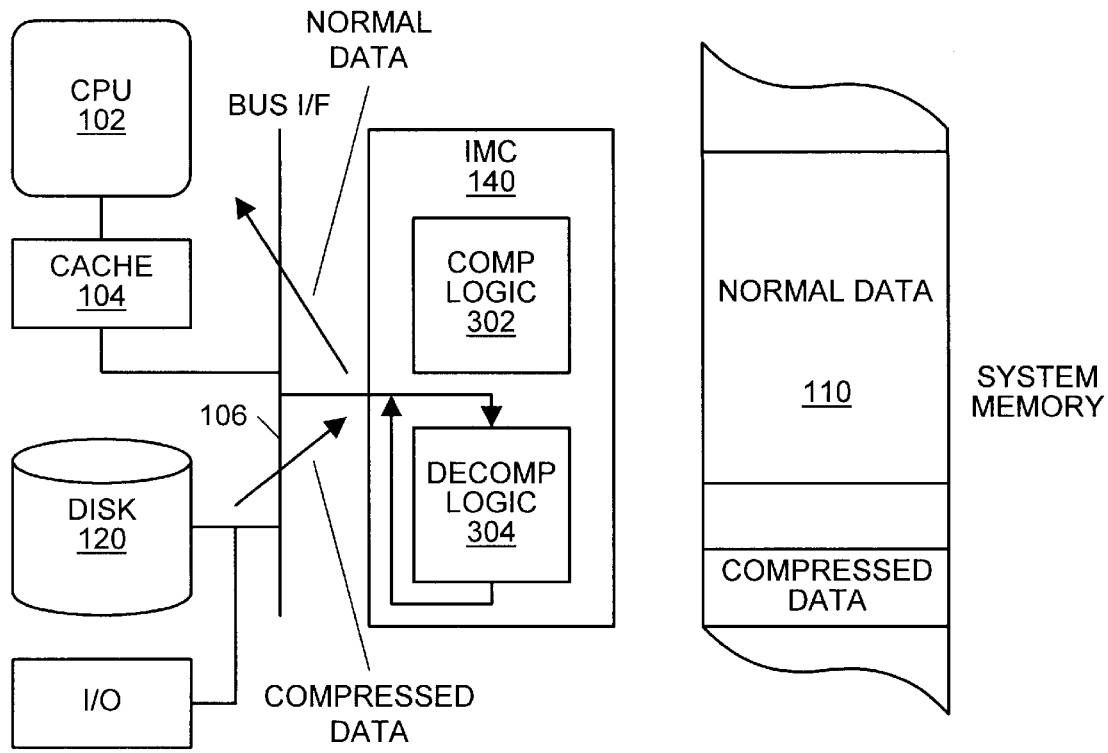
FIG. 11 illustrates operation of the IMC decompressing data retrieved from the hard disk that is provided in normal format to the CPU.

FIG. 11 illustrates compressed data transferred from the hard disk 120 decompressed within the IMC 140 and read as normal data by the CPU 102. This is for cases where it is desirable for the CPU to read data from the hard disk 120 or an I/O subsystem where the data is stored in a compressed format and CPU 102 desires to read the data in a normal format or noncompressed format. The IMC 140 includes a special transfer mode by which the data is not required to be temporarily stored in the system memory 110 in order for decompression to occur. It is noted, however, that the data transfer time may actually be increased in this mode due to the duality of the single interface bus at the interface of the IMC 140. In one embodiment of the invention, the decompression logic 304 includes a dual ported nature with FIFOs at each end wherein compressed data is read into one end and decompressed data is output from the other to increase decompression operations.

Figure 12:
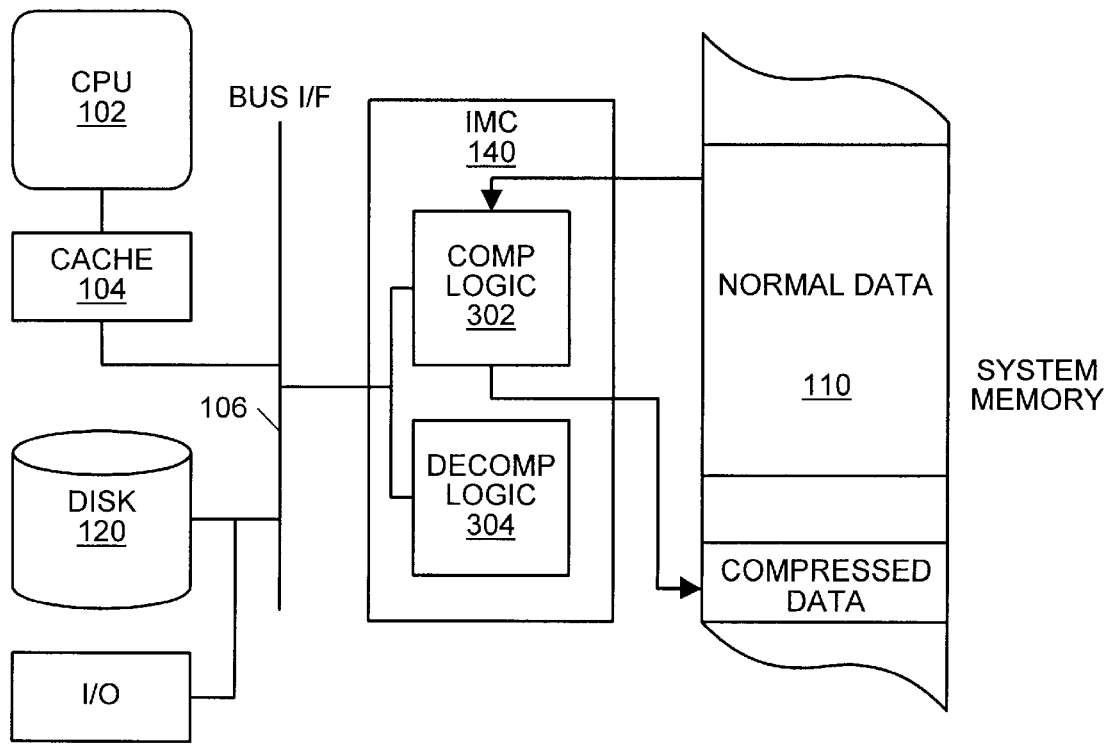
FIG. 12 illustrates a memory-to-memory compression operation performed by the IMC according to the present invention.

FIG. 12 illustrates operation of the IMC 140 in converting normal data, i.e., data in a normal format, in the system memory 110 into data stored in a compressed format within the system memory 110. The IMC 140 includes a compression engine 302 which accompanies software compression performed by the CPU 102. In some applications, it is faster and more convenient to be able to compress data off line without CPU intervention. This compression operation may generally be used for areas of "cached-out" program or operand data, i.e., data stored in the system memory 110 that is either non-cacheable or is not currently in the cache memory. Thus, the IMC 140 allows for memory compaction during a software application's memory allocation and cleanup routine. FIG. 12 illustrates how the IMC 140 can read data in its normal format from the system memory 110, compress the data, and then write the data back to system memory 110 for later decompression. This is a dynamic operation and can be imbedded into software applications as desired.

Figure 13:
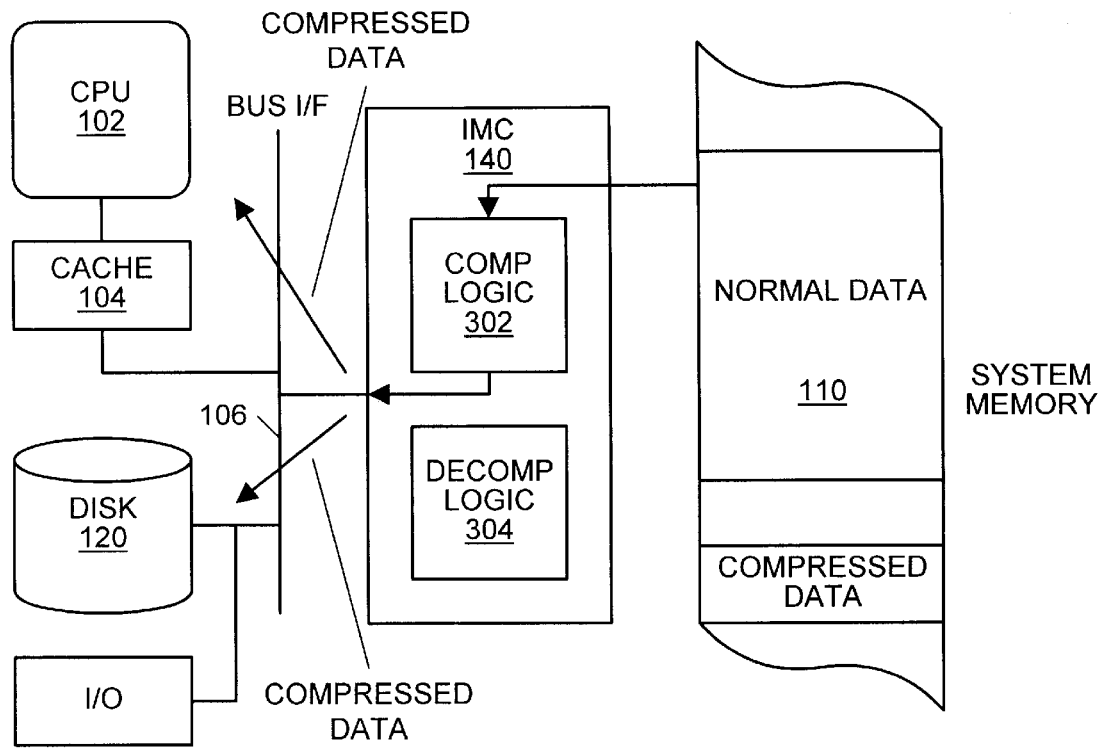
FIG. 13 illustrates operation of the IMC 140 compressing data retrieved from the system memory and providing the compressed data to either the CPU or hard disk.

FIG. 13 illustrates operation of the compression engine 302 in the IMC 140 retrieving data stored in a normal format in the system memory 110 and providing compressed data to either the CPU 102 or the hard disk 120. In a computer system incorporating the IMC 140 according to the preferred embodiment, this operation of the compression engine 302 in transferring data stored in a normal format from system memory 110 and storing the data in a compressed format on the hard disk 120 is preferably one of the most common uses for the IMC compression engine 302.

As shown, data stored in the normal format in the system memory 110 can effectively be "cached" onto the hard disk 120 or an I/O subsystem in compressed format for later use. This method is substantially faster than normal data transfers because, due to the compression, the amount of data transferred is less. When a memory miss occurs, i.e., when the CPU requests data from the system memory 110 and the data is not present in the system memory 110 because the data has been stored in a compressed format on the hard disk 120, data in the system memory 110 that has been least recently used is written in compressed format to the disk to make room for the data requested by the CPU 102. Thus, this operation is similar to a cache system where, on a cache miss, the least recently used (LRU) data is overwritten with the requested data because this data is the least likely to be requested in the future. If the CPU 102 includes an internal first level cache system and the cache system 104 is a second level cache system, the system memory 110 effectively acts as a third level cache system for data stored on the hard disk 120.

Alternatively, as shown in FIG. 12, instead of transferring the LRU data from system memory 10 to the hard disk 120, the data is not cached to disk but rather is compressed by the compression engine 302 and stored in system memory 110 in compressed format. For example, when a page miss occurs the data is conventionally transferred to the hard disk. However, according to the present invention, the data is stored in system memory 110 in compressed format. This allows faster recall of data when a page miss occurs since the requested data is still in system memory 110, albeit in compressed format.

The compression engine 302 in the IMC 140 provides that only compressed data is transferred between the hard disk 120 and the system memory 110, thus providing substantially faster transfers because of the reduced amount of data required to be transferred. This greatly increases the performance of the computer systems which implement virtual memory by swapping data from the system memory 110 to and from the hard disk 120. It is further noted that the IMC 140 compresses data stored in the normal format in system memory 110 and transfers this compressed data to the CPU if the CPU 102 desires to obtain the data in a compressed format. It is anticipated that this will not be as common as the transfer of data in a normal format in system memory 110 to a compressed format on the hard disk 120 as described above.

Figure 14:
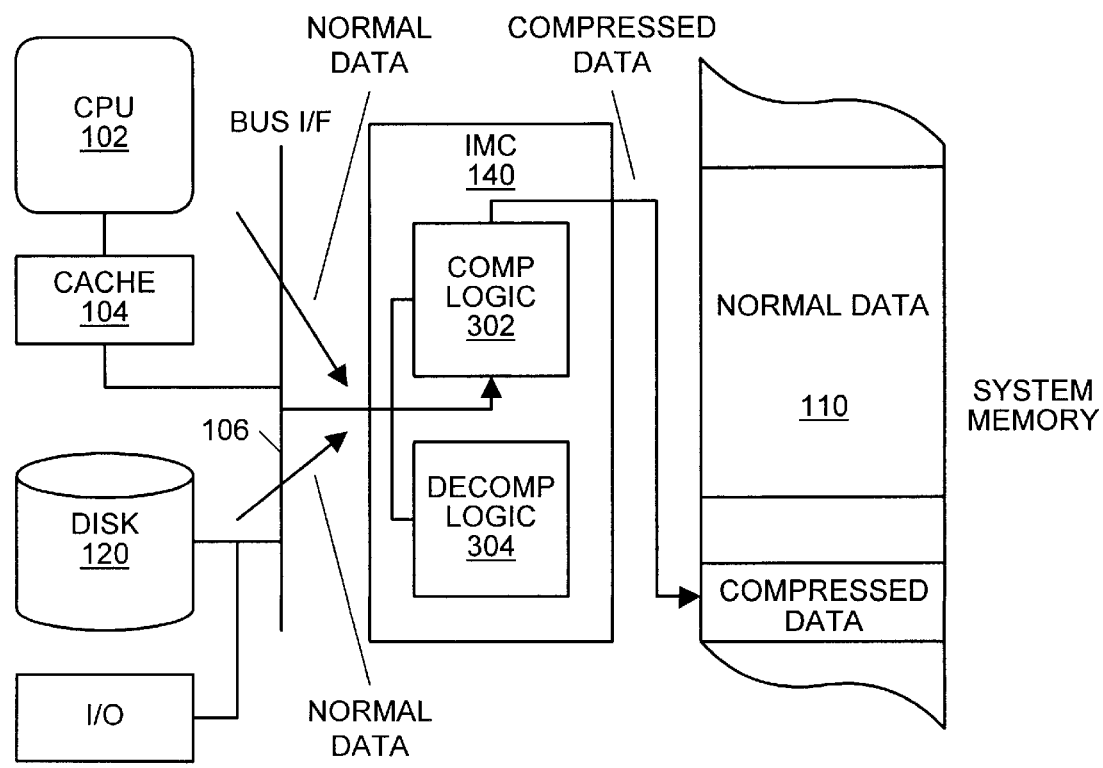
FIG. 14 illustrates compression of data in a normal format received from the CPU or hard disk that is stored in compressed form in the system memory.

FIG. 14 illustrates data in a normal noncompressed format transferred from either the hard disk 120 or CPU 102 to the IMC 140 where the compression engine 302 in the IMC 140 converts the data into compressed data and stores the compressed data in the system memory 110. It is noted that there are generally rare occasions when the hard disk 120, an I/O subsystem, or even the CPU 102 transfers data in normal format to the IMC where it is desirable to store the data in compressed format and system memory 110. This could typically occur from foreign applications programs loaded into from the floppy drive or retrieved from a local area network where it is desirable to compress this information before use or storage in the main system memory 110.

Figure 15:
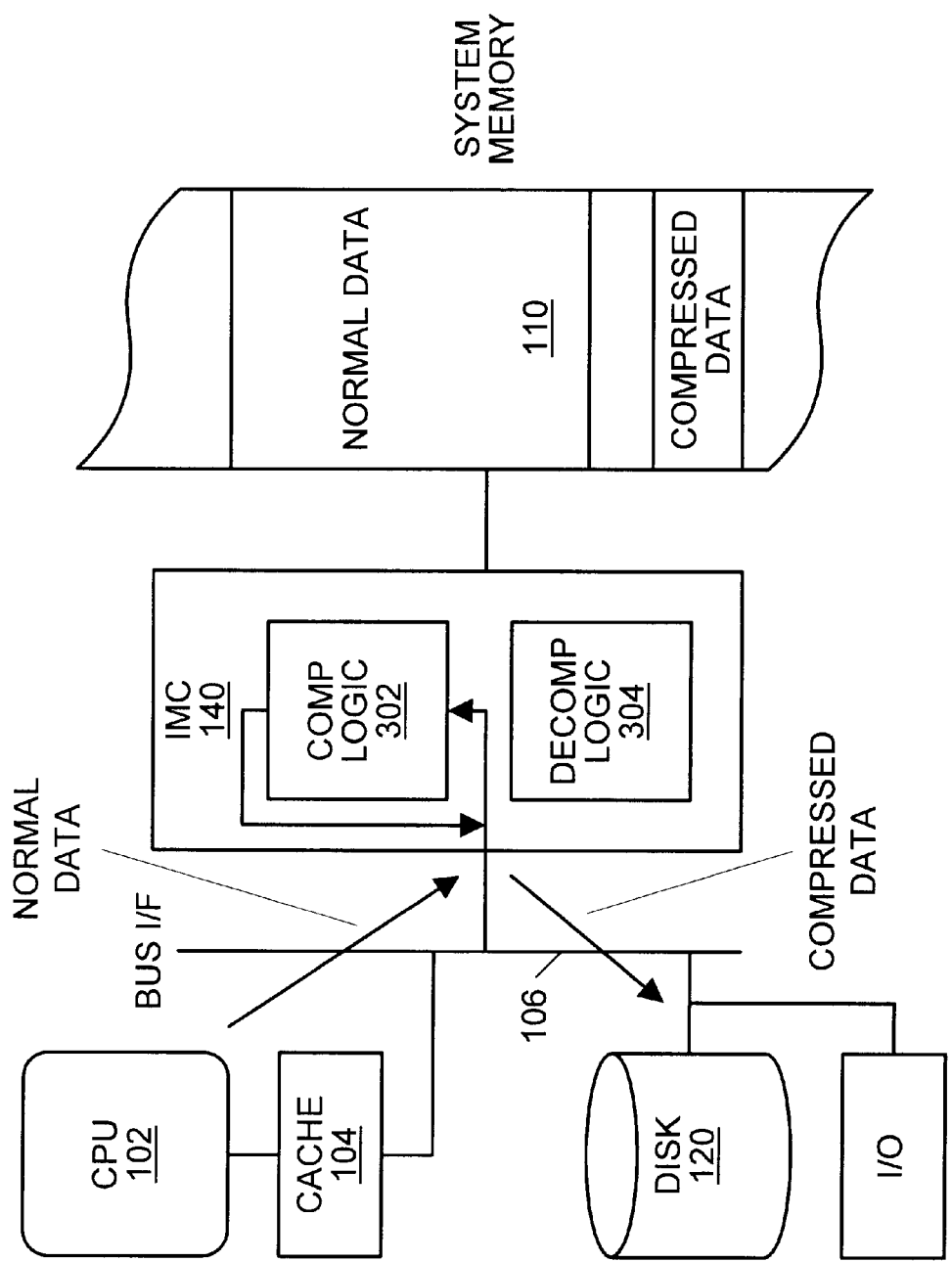
FIG. 15 illustrates operation of the IMC in compressing normal data obtained from the CPU that is stored in compressed form on the hard disk 120.

FIG. 15 illustrates compression of data from the CPU 102 and storage of the compressed data on the hard disk 120 or another I/O subsystem. Thus, another feature of the compression engine 302 of the present invention is the ability to write CPU data in normal format directly onto the system disk 120 or I/O subsystem in a compressed format. This is performed without requiring the CPU 102 to implement a special software compression algorithm, thus saving CPU resources.

Therefore, the IMC 140 of the present invention includes a compression engine 302 and decompression engine 304 which off loads work from the CPU 102 and provides increased data transfer capabilities for reducing the amount of data required to be transferred. The IMC 140 of the present invention incorporates compression and decompression in the memory subsystem and thus off loads the host CPU 102 from having to perform this function. Thus, as shown above, multiple choices are available for cost and performance enhancements.

Dual Synchronous Cross Bounds Memory Controller Architecture

The IMC 140 comprises two memory control units 220 and 224 which control IMC access to system memory 110, and each unit generates separate address control values to a common address bus. Address values are interleaved onto the common address bus and individual timing controller signals strobe the address into each memory subsystem according to the memory timing requirements. In addition to the normal memory control functions the IMC 140 also fetches displayable pixels at the screen refresh rate. This requirement, using current technology, would imply that the normal data transfers between host CPU or I/O and the system memory must suffer. This is not true when implemented by the dual "cross-bounds" memory control units of the present invention.

The term "cross-bounds" means that each memory control unit has full address read/write capability. Each memory control unit can address the entire DRAM bank and it's corresponding data can be interleaved between display refresh and memory read/write operations on adjacent cycles even when different address spaces are accessed.

The architecture requires that separate memory control signals be used for each memory bank. Memory control signals have independent timing for interleaving of the memory address and memory control signals. The present invention includes several modes of address operation to increase speed and performance, all of which are targeted to cause minimal delay in the memory access subsystem. The table below lists some of the different methods used for interleaving data on the 128-bit system memory bus.

| | | |
|---|---|---|
| Mode 0: | Interleaved access to/from different address spaces. | Used for system transfers during display refresh operation. Also used for compression/decompression to achieve high rate. Also used for raster operations which modify source data. |
| Mode 1: | Interleaved access to/from a single sequential address. | Used for high resolution display refresh or system transfers when only a single memory address is required. |
| Mode 2: | Non-Interleaved access to a single sequential address. | Used for access of data from the same physical bank of memory. |

Memory Interface Unit

The "dual synchronous cross-bounds memory interface" of the present invention allows data transfers to occur in two modes, an interleaved mode and a separate bank access mode. According to the novel architecture of the present invention, the operating system allocates memory in one of the two modes depending on the application bandwidth and memory allocation requirements. Each of the two memory units is controlled by independent memory controller units each capable of addressing the full 32-bit address range of the IMC 140. Address mapping registers are used to define memory bounds for active regions of the system memory 110. These active regions describe the type of operation the IMC 140 will perform on the data. Certain regions are allocated for compressed and decompressed data information, some regions are allocated as screen memory for display output, and other regions are allocated for CPU instruction execution. There are several methods in which the operating system can allocate the memory as described herein. One novel aspect of the dual cross-bounds memory interface is the way in which the memory select signals dynamically change function depending on the address mapping registers and types of memory access cycles required.

Memory Interface Control Signals

Each memory control unit includes the final interface which is specific to the type of system memory being used in the design. Due to the ease of description, this embodiment describes the use of common DRAM memory with enhanced page mode. The preferred embodiment uses a specialty DRAM such as SGRAM or RAMBUS. However, the IMC architecture is not constrained to any specific type of memory.

Each memory channel contains a complete 64-bit data bus, a multiplexed ROW/COL address bus, and separate memory control strobes (RAS, CAS, WE, OE). When high performance DRAMS, such as SGRAM and RAMBUS, are used, these signal names are changed. In any event, every memory type has the basic READ, WRITE, address, data, and control capability. The memory interface logic can be pin strappable to conform to different memory types. It should be noted that performance is subject to the memory subsystem type used with the IMC 140.

Memory Mapping Registers

The IMC 140 includes internal address compare registers which describe the various memory regions. Each region responds differently from one another within the IMC address space. Registers are loaded either during device initialization or under supervisory control software. Power on initialization programs the IMC 140 to the 128-bit data mode as described below. Values programmed into these memory mapping registers also describe the type of memory cycles used to read and write data into and out from different memory address spaces.

Figure 16:
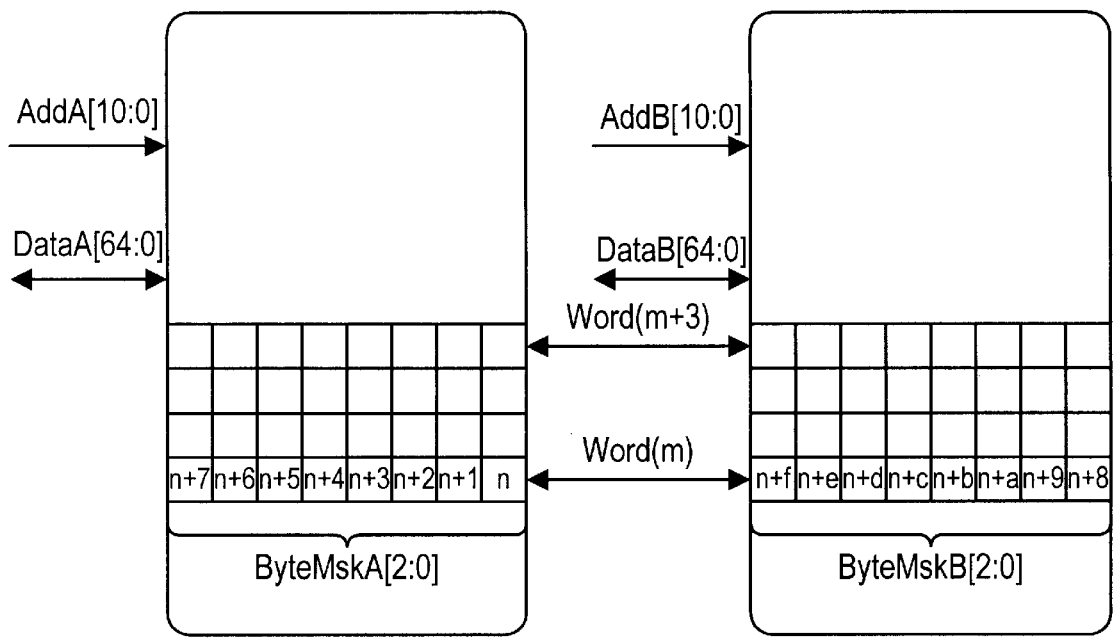
FIG. 16 illustrates memory addressing of linear memory reads and writes using interleaved memory channels.

One such address definition is linear memory reads and writes using both memory channels at the same time. In this case, the Cross Bounds memory control logic interleaves access between the two memory channels. The total effective data word contains 128 data bits. In order to support the 128-bit data interface, the least significant four address bits are encoded into sixteen separate byte enables (eight per channel). Memory addressing for this case is shown in FIG. 16. This memory addressing is useful when the display requires processing of large amounts of data in a sequential nature.

Figure 17:
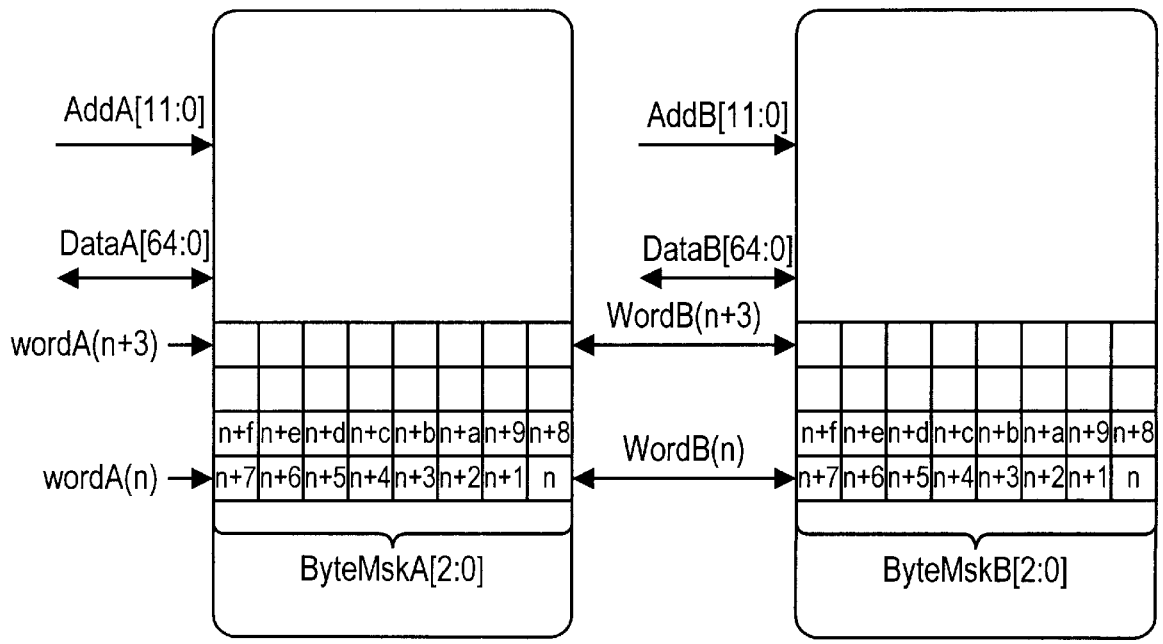
FIG. 17 illustrates memory addressing using separate channels with the same linear address per channel.

Another address mapping scheme is to create separate channels with linear addresses across both channels. In this case, internal segment registers determine which memory channel is active for different operations. Segments are software programmable flags set by the application's transport protocol code. One such operation may be the mapping of video information to one of the two channels. While another may be to service the CPU instruction and/or data fetching. For this mode, the memory is segmented into blocks of consecutive memory with sizes set by the values programmed into the IMC memory mapping registers. This mode is useful for segmentation of different types of data such as normal and compressed or possibly between Video, Audio and graphics and system memory. FIG. 17 shows how the memory control and address signals operate in this case.

Figure 18:
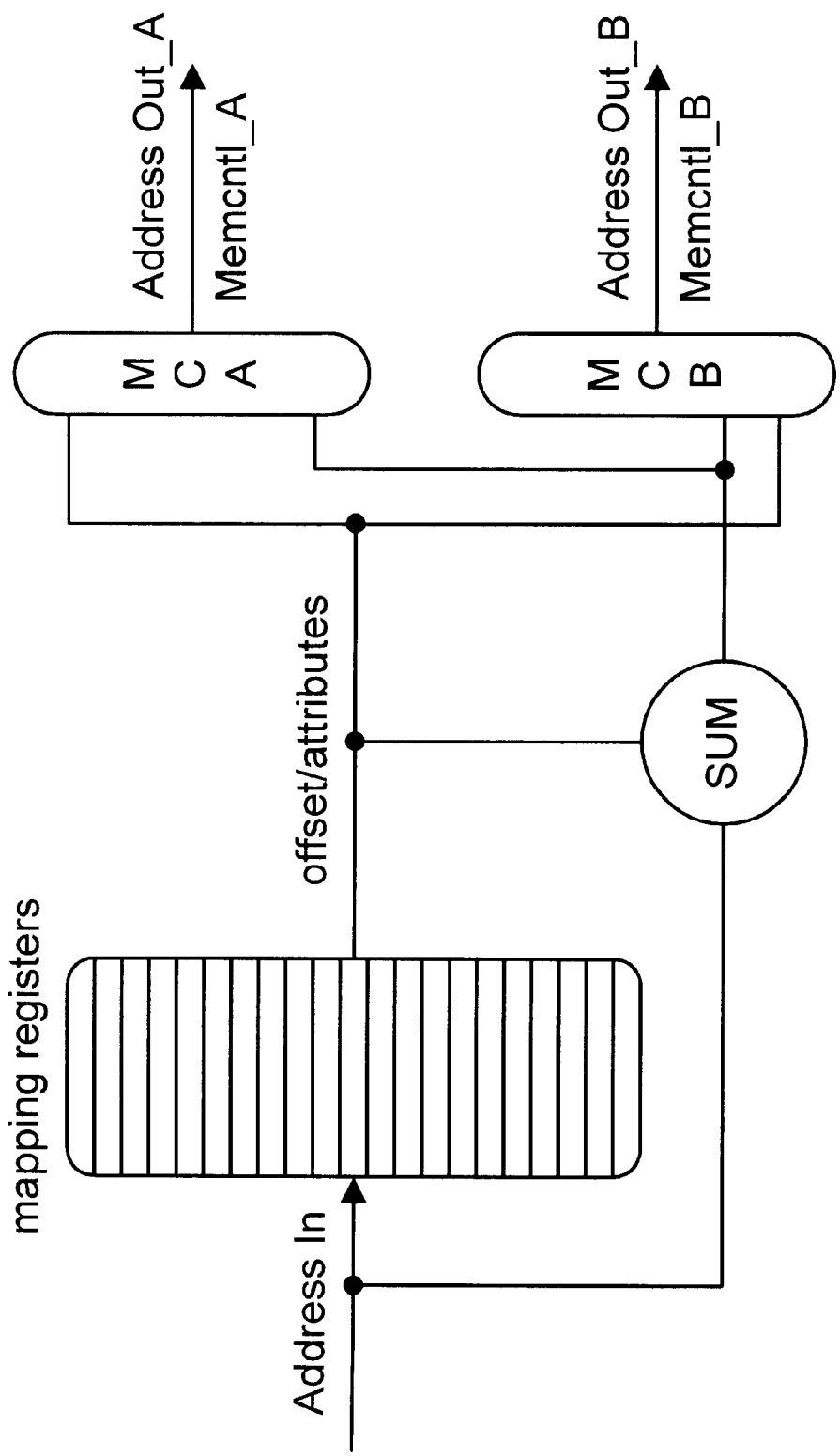
FIG. 18 illustrates address generation when address offset mapping functions are enabled.

To facilitate quick context switches for save and restore state information, each IMC mapping register is preferably tied into one of eight offset registers. These registers are available in all the modes indicated above. The offset is best described as a software programmable value added to the system address to create an effective address which in turn is used to address the memory banks connected to the IMC 140. With the use of the effective address offset registers, save and restore variable state information can be performed using a simple offset to an external IMC workspace in memory. FIG. 18 depicts the address generation when the address offset mapping functions are enabled.

An error detection scheme is used to determine if interleave operation is legal. An illegal state is encountered when an interleave operation attempts to read data from the same address for which write data is destined. In this case the read operation is stalled until the write operation has completed. This is never the case when the IMC 140 is set to single access mode.

DRAM banks are preferably configured to alternate on the lowest common address. This architecture allows for interleaving of data on a read modify write of the same address by skewing the address across "n" banks.

Figure 19:
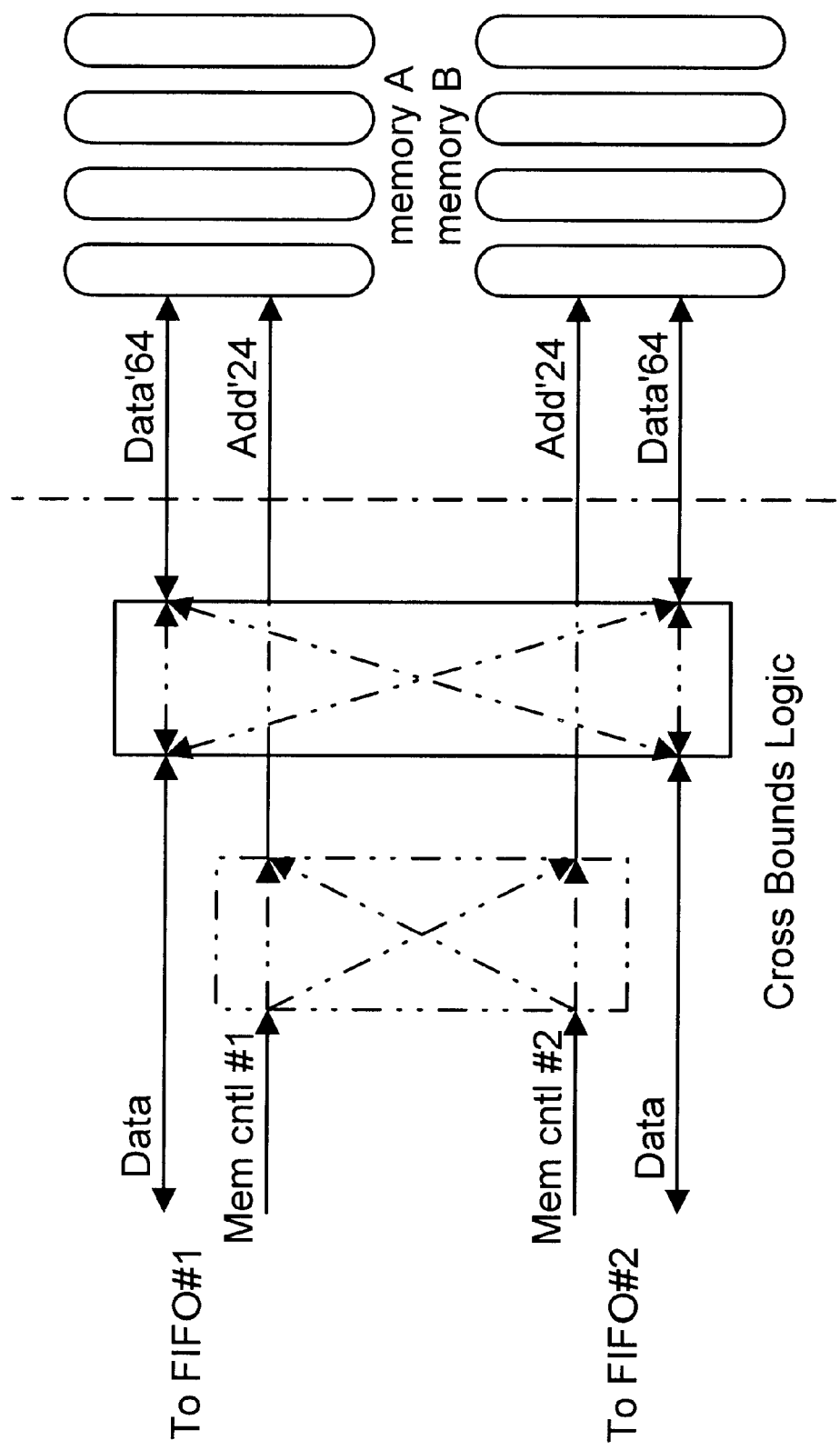
FIG. 19 illustrates the data and address portions of the cross-bounds memory logic.

FIG. 19 illustrates the cross-bounds unit including the data and address portions of the cross-bounds logic. Data can be transferred across the interface in either direction, i.e., to/from the Execution/Graphics Engines 210 and 212 or to/from the host interface FIFO's 204 and 206. The address, which is generated by the two memory controllers, can also select either bank of memory. This allows either or both of the memory control units 220 and 222 to have total access to the entire IMC memory space. By using cross-bounds memory control, the IMC's memory controllers 220 and 222 have full access to the system memory 110. According to this novel architecture, if one memory controller is busy with a full transaction queue, the other memory controller can "slip" demand cycles of higher priority in-between other transactions without reprogramming the other memory controller. The cross-bounds memory controller architecture allows the software driver to set priorities to memory access. In some cases it is more important to allow CPU access to have higher priority than graphics operations. In other cases the priorities may be reversed. The IMC 140 allows for software programmable priority for different memory accesses. In the preferred embodiment, the dual cross-bounds memory controllers are configured to optimize operation of the IMC 140. The modes of operation are selected to optimize instruction operation and instruction decode logic for internal IMC operations.

Figure 20:
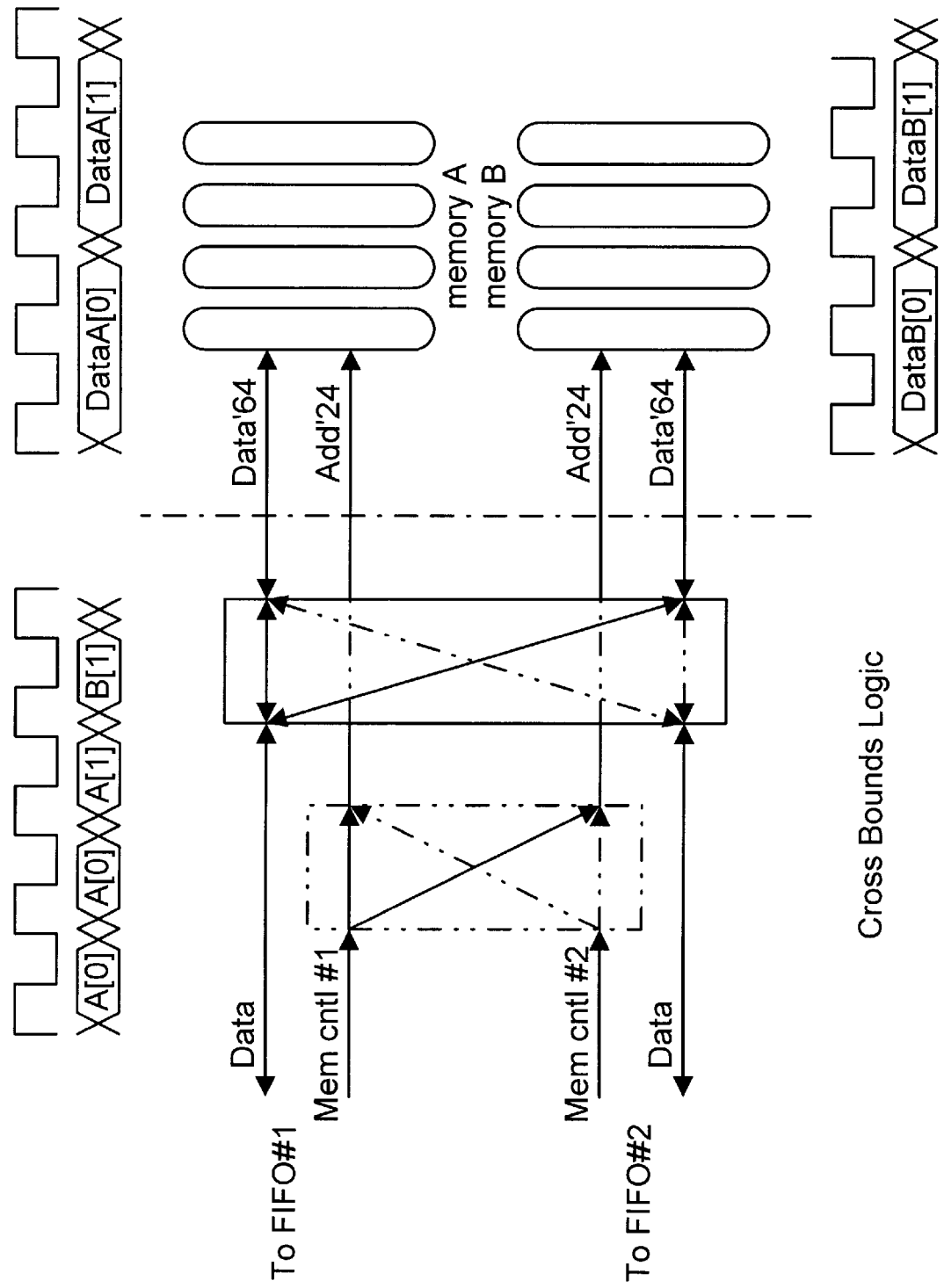
FIG. 20 illustrates Mode 0 timing showing how two data buses are interleaved into the IMC on alternating system clocks.

FIG. 20 illustrates Mode 0 timing and shows how each of two data buses is interleaved into the IMC 140 on alternating system clocks. Dark arrows depict the data and address flow, while dotted lines indicate possible other paths. Independent addresses are delivered by each memory controller 220 and 222. The data is then brought internal to the IMC 140 and immediately interleaved on the internal 64 bit buses. This doubles the internal data rate from outside the IMC 140 to the internal FIFO's located within the IMC 140. FIG. 20 shows that each memory controller 220 and 222 delivers a different address to each of the two memory banks. The data is then assembled at twice the rate through the cross-bounds data unit. This mode allows for maximum throughput when different memory functions are required for access.

Figure 21:
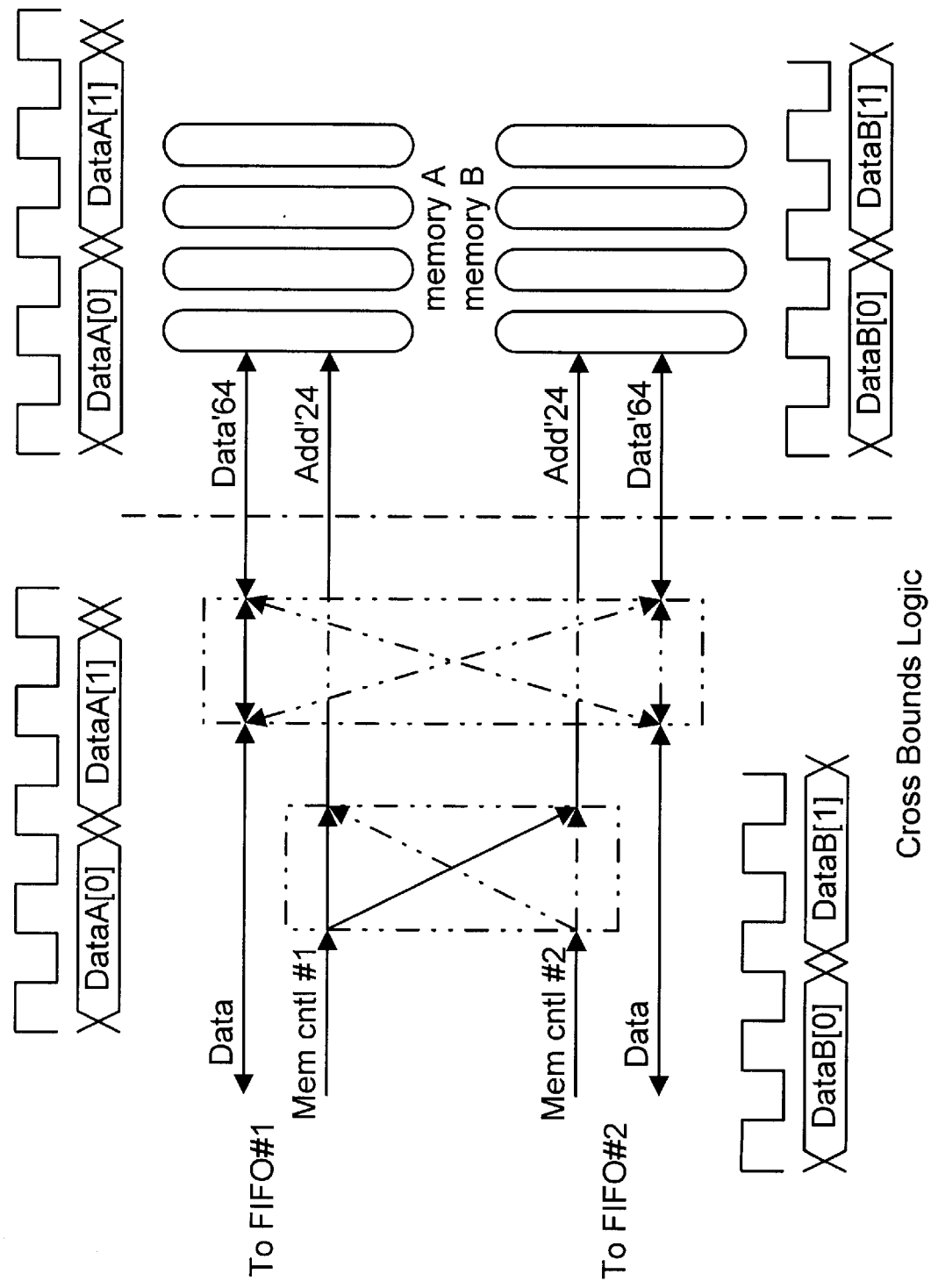
FIG. 21 illustrates Mode 1 timing whereby both memory banks are concatenated so that one address can retrieve 128 bits of data.

FIG. 21 illustrates Mode 1 timing and shows how both banks are concatenated such that one address can retrieve 128 bits of data. The data and the internal transfer rate stay constant at the memory interface and into the internal FIFO's. Because the memory interface runs at a fixed rate, the data is not multiplexed when in this mode. As an example this mode may be used to fill the internal FIFO's at twice the normal rate from one memory address. Another usage may be to fill the display refresh data FIFO for higher resolution video requirements.

Figure 22:
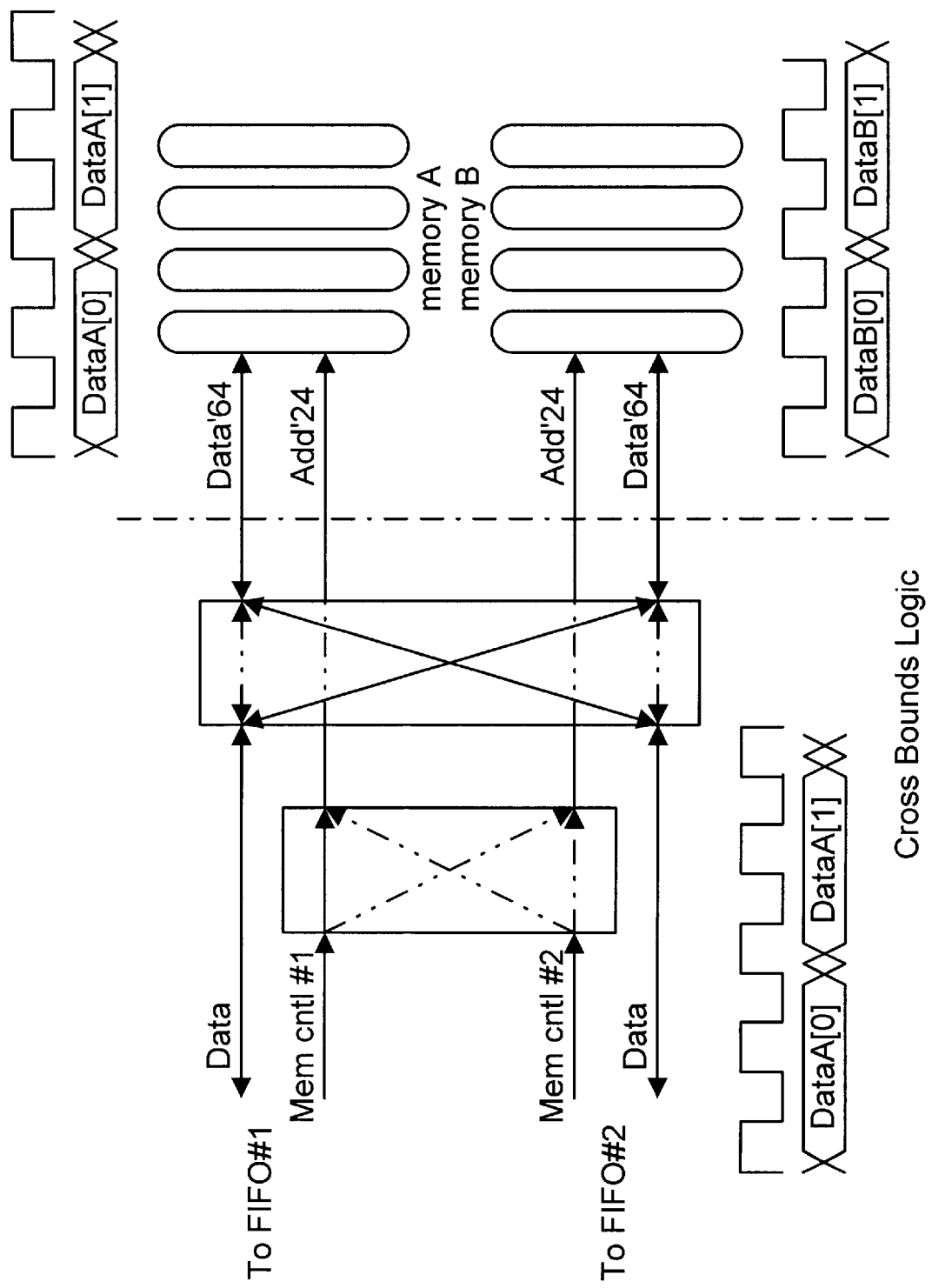
FIG. 22 illustrates Mode 2 timing where an individual address can access data in a non-interleaved mode.

FIG. 22 illustrates Mode 2 timing and shows how an individual address can access data in a non-interleaved mode. In this case, both memory controllers 220 and 222 have been directed to access the same bank of memory. The internal data access time is increased when this occurs. This configuration preferably only occurs when each memory control unit requires data from the same memory bank. Independent collision logic detects when addresses are in conflict with each other. Conflict is described as a read operation to the same area or address as stored write information within the IMC 140, i.e., the IMC 140 contains updated or dirty data that has not yet been written to system memory 110. To avoid this collision and thus a loss of performance, the IMC 140 suspends any further accessing until the write FIFO's have been written back and the memory image is current in the external memory banks.

Pointer-Based Display List Video Refresh System and Method

As mentioned above, the IMC 140 of the present invention includes a novel pointer-based display refresh system and method which assembles and displays video data on the screen on a per-window or per object basis during screen refresh. In the present disclosure, the term "window" is used to mean any type of object or window which appears on the display screen.

Figure 23:
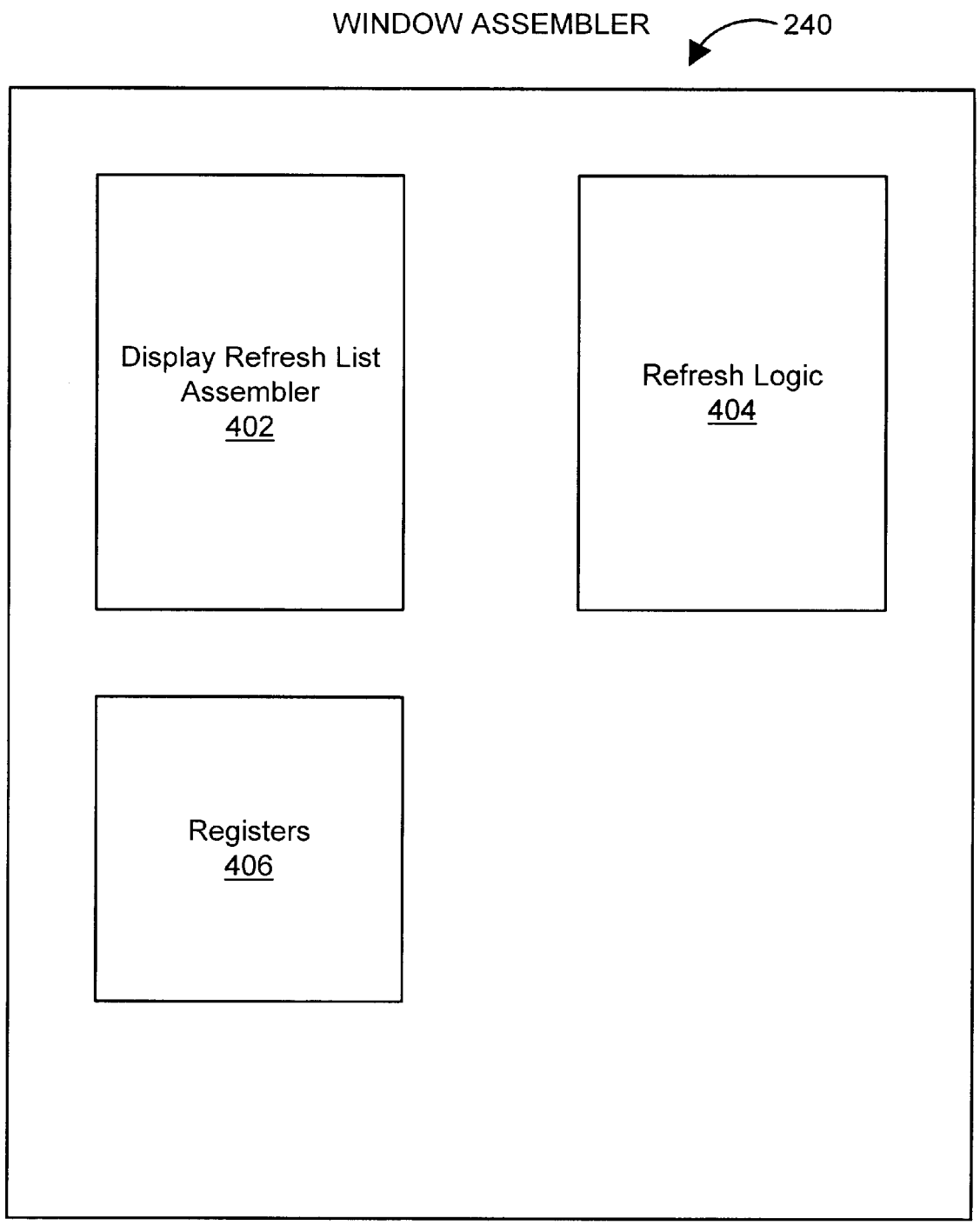
FIG. 23 is a block diagram illustrating internal components of the Window Assembler.

FIG. 23 is a block diagram illustrating the components of the Window Assembler 240 of the present invention. As shown, the Windows Assembler 240 includes a Display Refresh List Assembly block 402 and Refresh logic 404. The Window Assembler 240 also includes a number of registers 406 storing pointers and other information used by the Display Refresh List Assembly block 402 and Refresh Logic 404. The Display Refresh List Assembly block 402 assembles Display Refresh Lists in system memory 110 which indicate the video data that is to be output to the screen 142 on the next refresh. The Refresh Logic 404 comprises a Display Refresh List Execution unit which executes an assembled Display Refresh List during screen refresh to present the correct video data on the display screen 142.

The display list video refresh system and method of the present invention uses multiple registers and memory queues to perform video display operations. The IMC 140 includes two versions of each register and maintains two versions of various of the memory queues in system memory 110 to allow one Display Refresh List to be used for screen refresh while the other is being assembled to reflect recent updates to the video screen. This double buffering allows clean context switches from frame to frame.

The IMC 140 includes first and second or foreground and background versions of each register and various of the buffers. The term "foreground" is used for the registers and buffers that are for active display to display data on the screen 142 during screen refresh. The term "background" is used for the registers and buffers that are used to assemble a new Display Refresh List for a subsequent screen refresh. When one or more of the windows or objects are changed or updated and an "Assemble Display Refresh List" command has completed, then on the next VSYNC or next refresh, the background registers and buffers become the foreground registers and buffers, and vice-versa.

Window Assembler Registers

The Window Assembler 240 in the IMC 140 includes a number of registers for performing its operations. The IMC 140 includes foreground and background window count registers, foreground and background Window ID list pointer registers and foreground and background Display Refresh List Pointers. The window count registers hold a value for the total number of windows or objects to be assembled onto the display. The window ID pointer registers contain an address which points to the top of a buffer referred to as the Window ID list contained in the system memory 110. The Display Refresh List Pointers hold a pointer to a respective Display Refresh List in system memory 110.

Window Assembler Memory Buffers

Figure 24:
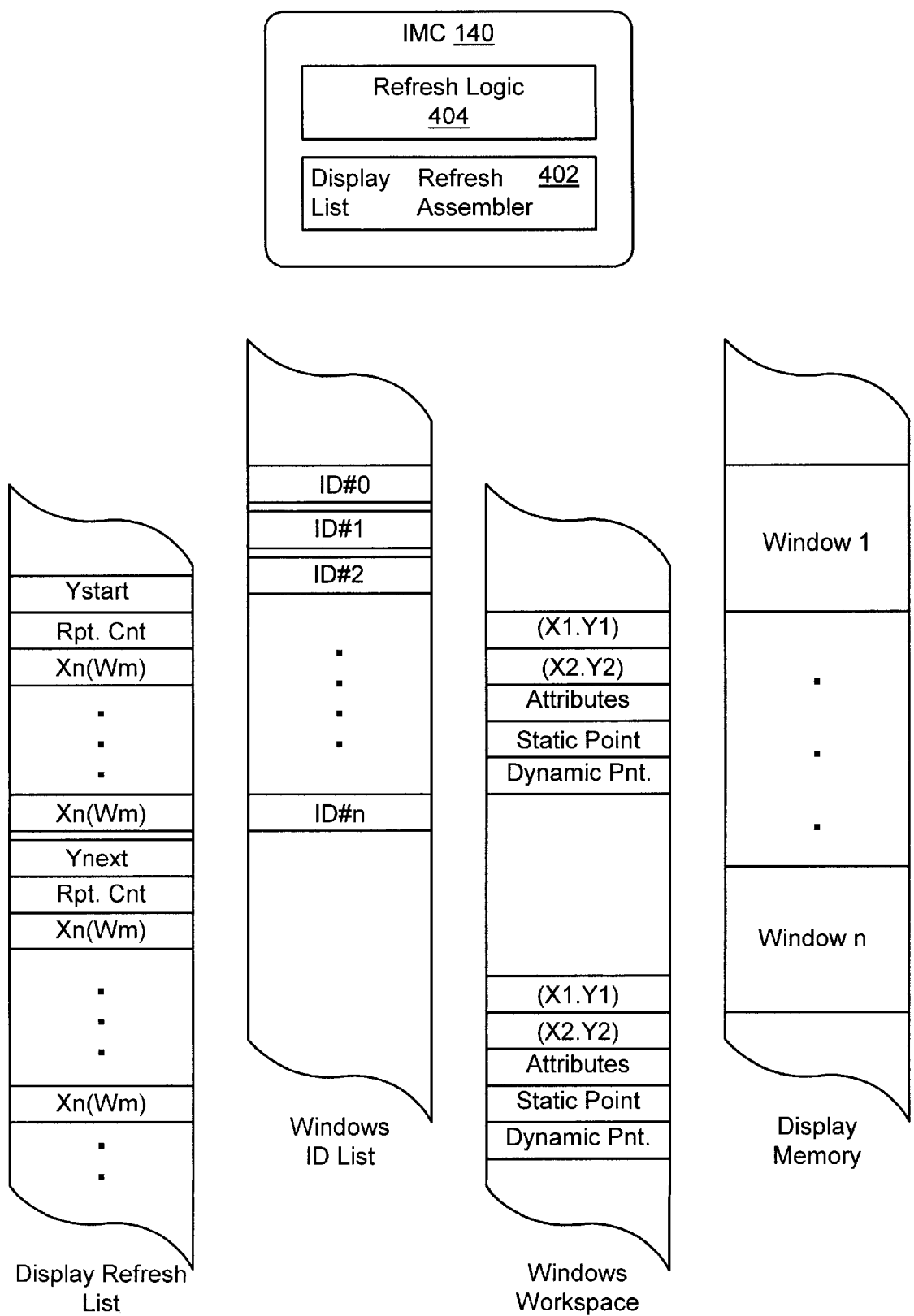
FIG. 24 illustrates the memory organization of system memory as seen by the Window Assembler, including the buffers or queues in system memory used by the Window Assembler to access, manipulate and display graphical data stored in the system memory according to the present invention.

FIG. 24 illustrates the memory organization of system memory 110 as seen by the Window Assembler 240. The Window Assembler 240 creates and manipulates various buffers or queues in system memory 110, and these buffers are used by the Window Assembler 240 to access, manipulate and display video data stored in the system memory 110 according to the present invention. As shown, the system memory 110 includes a Windows ID list, a Windows Workspace buffer, a display memory section for storing video data, and a Display Refresh List. The IMC 140 maintains two versions of the Windows ID List memory queue and the Display Refresh List memory queue. This allows one set of buffers, the foreground buffers to be used for screen refresh, while the other set of buffers, the background buffers, are used to assemble a new Display Refresh List to reflect recent screen changes. The Window Assembler 240 preferably allocates additional windows workspace areas on an as needed basis. For graphics animation applications, the system memory 110 preferably doubles buffers the video display memory where the video data is stored. In one embodiment, the present invention only requires double-buffering of the video data corresponding to the object or window being animated or changed from frame to frame. The video data corresponding to objects or frames that do not change from frame to frame do not require double-buffering.

Overview of Window Assembler Operation

The following is an overview of operation of the Window Assembler 240 in the IMC 140. First, video data or pixel data is presumed to reside in the system memory 110 which is to be output onto the screen, this portion of system memory 110 being referred to as display memory. This graphical or video data is written into the system memory 110 by the CPU 102 under the direction of a software program, such as an application program. Here it is assumed that there are multiple windows or objects comprising pixel data stored in system memory 110, such as that shown in FIG. 32. These windows are located in system memory 110 as linear data, i.e., the data has not yet been formed into XY data. It is also assumed that the foreground registers and buffers are being used to execute the current foreground Display Refresh List. If a screen update recently occurred and an Assemble Display Refresh List command has been issued, then the current background Display Refresh List is being assembled using the background registers and buffers.

Driver software executing on the host CPU 102 assembles and/or updates a Windows ID list which includes a pointer for each window or object on the screen. The driver software also determines basic information about each window, including information about each window's position, i.e., where each window is to reside on the screen, certain video or attribute information about each window, and the values of pointers to the system memory 110 where the video data for the respective window resides. The driver assembles and/or updates a Windows Workspace list or buffer in the system memory 110 through the IMC 140 which includes a windows workspace area comprising this information for each window. The information in each windows workspace area is shown in FIG. 24. The driver software assembles a new Windows ID list pointer and a new windows workspace area for new windows that appear on the screen, and the software updates either the Windows ID list or the windows workspace area to correspond to changes in existing windows, i.e., windows that have been moved and/or have changed in depth relative to other windows, etc.

In assembling a windows workspace area for a respective window, the driver software first determines the X1, Y1 position, which is the top left corner of the window, and the X2, Y2 position, which is the bottom right corner of the window, and stores this data in the windows workspace area. The windows are presented on the screen according to software control, and the windows appear on the monitor according to these X,Y addresses. The driver software also generates an attributes section for each window that is stored in the windows workspace area. The attributes section includes values for the depth of the window, the number of bits per pixel, the dither pallet, if necessary, alpha bending information, and other information. The contents of the attribute field and the manner in which the attributes are used within the engine to display video data is described further below. The driver also stores a static pointer and a dynamic pointer in the window workspace area for each window. The static pointer is a linear pointer to the actual display memory where the video data resides, i.e., to the first word of video data in the system memory 110 for that window. The dynamic pointer changes on each horizontal span line to point to the video data for the respective span line for that window. Depending on the number of windows, the Windows Workspace buffer can be fairly lengthy. However, in general, only a few words of system memory per window are required to describe the characteristics and position of the window.

Once the host software driver has assembled the Windows Workspace buffer, the Display Refresh List Assembler 402 in the Window Assembler 240 uses this information to assemble a Display Refresh List. As discussed above, the present invention utilizes a double-buffering method whereby the background Display Refresh List is assembled while the foreground Display Refresh List is being executed to display data on the screen 142. The two Display Refresh List buffers alternate as foreground and background buffers when the screen needs to be refreshed due to a change, such as a positional or attribute change.

When the software driver issues an Assemble Display Refresh List command, the Display Refresh List Assembler 402 in the Window Assembler 240 executes a method (FIG. 30) which utilizes the information in the windows workspace areas to create or update the background Display Refresh List. The Display Refresh List is created or updated automatically by the Display Refresh List Assembler 402 in the IMC 140, first by sorting the respective Y position values from top to bottom and then, for each Y position, sorting the X position values from left to right. The Display Refresh list is built with a number of pointers that point back into dynamic pointer addresses in the windows work space area for the respective window(s) being drawn for each span line. The dynamic pointers are then used during execution of the Display Refresh List to actually read the video data corresponding to the window being drawn from the system memory 110 for the respective span line into the IMC 140, where the video data is assembled for video output. As discussed further below, the data is read and assembled according to the attributes per window and the position on the screen. In one embodiment, the Assemble Display Refresh List command is issued on a per window or per object basis when less than all of the windows change on the screen.

When the current foreground Display Refresh List has completed execution, then after another screen change occurs and a new Assemble Display Refresh list command has been issued and completed, the Window Assembler 240 executes a new Display Refresh List. When a new Assemble Display Refresh list command has been issued and completed, then on the next screen refresh or VSYNC, the background Display Refresh List assembled as described above becomes the foreground Display Refresh List for execution. Likewise, the other background registers and buffers become the foreground registers and buffers for execution. Conversely, the foreground Display Refresh List which has just been executed as well as other foreground buffers and registers are switched to the background, and if new screen changes occur, the "new" background Display Refresh List is the subject of an "Assemble Display Refresh List" command and is assembled as described above, based on the recent screen changes. Thus, on screen refresh or VSYNC after an Assemble Display Refresh List command has completed, the background Display Refresh List that has been assembled becomes the "new" foreground Display Refresh List and is executed.

Figure 31:
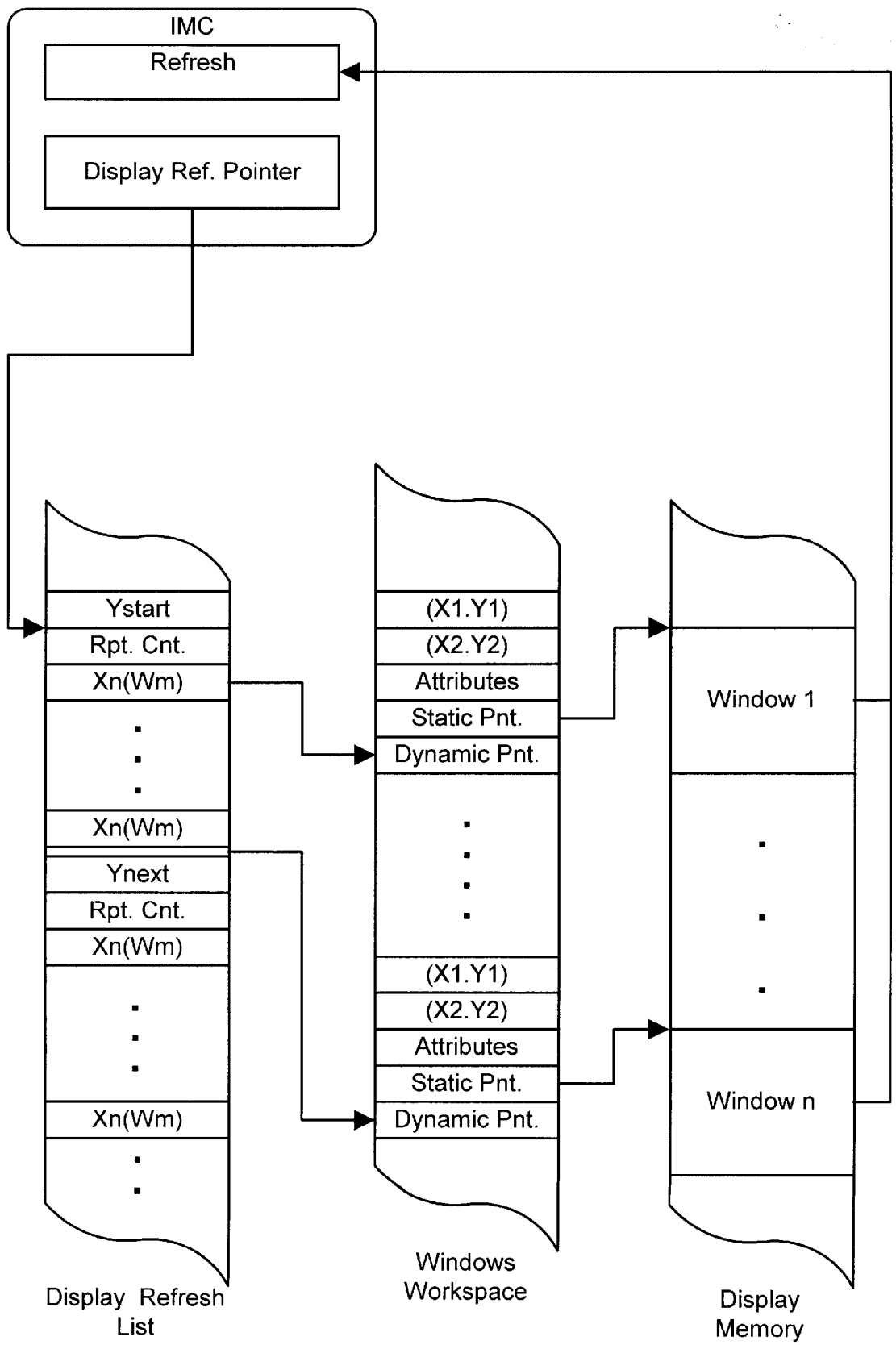
FIG. 31 illustrates how the Display Refresh List is used to reference video data for display on the display screen during screen refresh.

For each scan line or span line the IMC 140 reads the foreground Display Refresh List to determine how many windows are present on that line. As shown in FIG. 31, the Xn(Wm) value in the Display Refresh List is used to read the Windows Workspace dynamic pointer which then points to the windows display memory where the pixel data is located. The pixel data is then read for display on the video monitor 142. The Display Refresh List also includes information for dynamically adjusting the video data path according to various attributes, including the number of bits per pixel required for the object begin drawn, as well as others. At the end of each window span the IMC 140 updates the dynamic pointer value to point to the next line for the respective window. This allows the IMC 140 to read the correct display memory for the next line during the refresh. Therefore, when the IMC 140 refreshes the screen, the IMC 140 reads the video data from linear memory and displays the respective XY windows of varying order, wherein the order is determined by the relative placement or depth of the windows relative to each other.

Memory Buffer Organization

Figure 25:
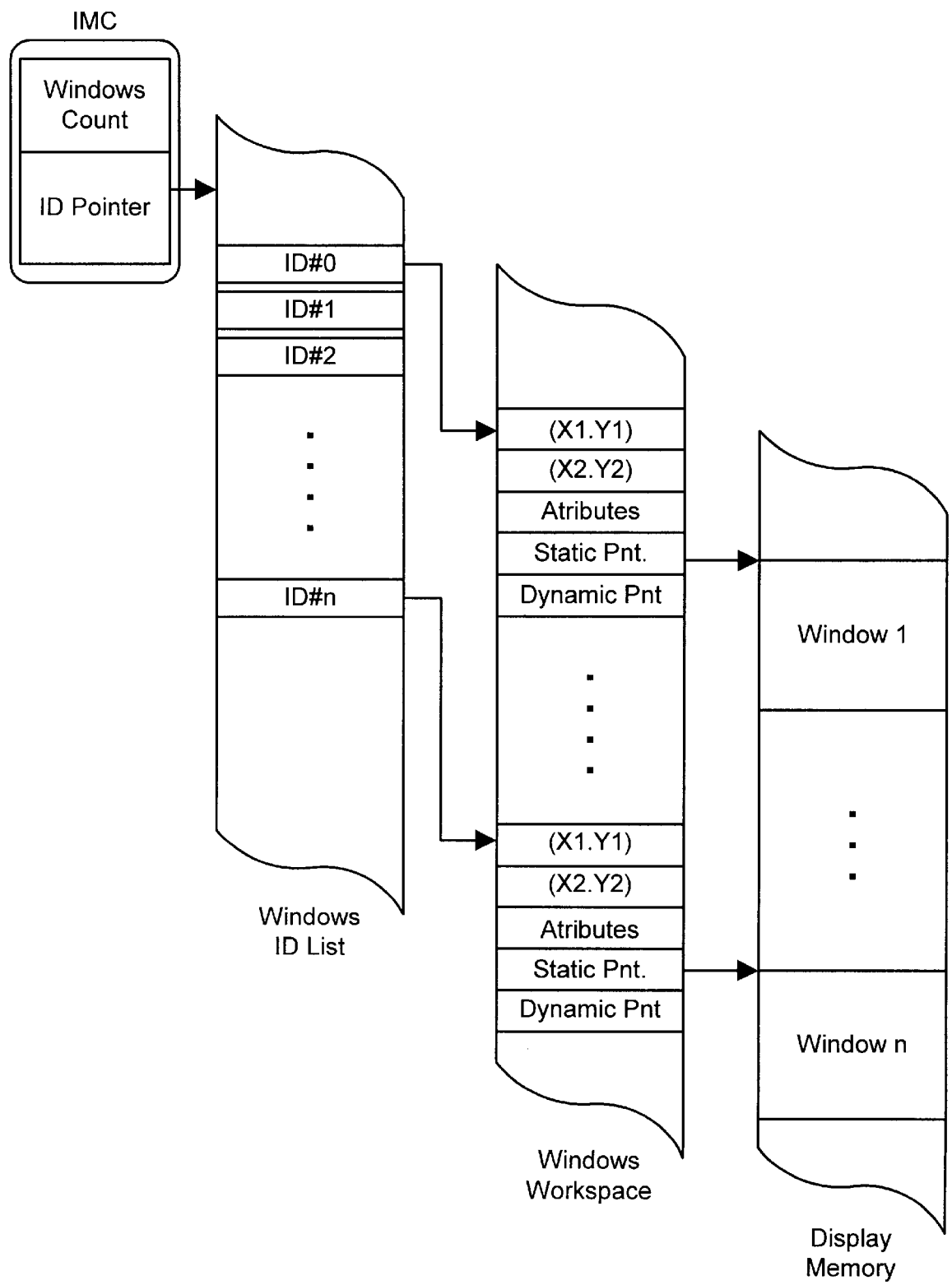
FIG. 25 illustrates the relationship of pointer values in the memory buffers or queues in system memory used by the Window Assembler to access and manipulate graphical data stored in the system memory according to the present invention.

Referring now to FIG. 25, the organization of one set of memory buffers is shown. As mentioned above, the IMC 140 includes a Windows Count register and a Window ID List Pointer register. The Windows Count register stores the number of windows or objects on the screen. The Windows ID List Pointer register includes a value which points to the top of the respective Windows ID list. The Windows ID list comprises a list of pointers wherein the list includes a pointer entry for each window or object appearing on the screen. Similarly, the Window Workspace buffer includes a window workspace area for each window or object appearing on the screen. The pointers in the Window ID list, which each correspond to a respective window, each point to a corresponding window workspace area for that window in the Window Workspace buffer also located in the system memory 110. The Windows ID list is preferably order dependent, i.e., all pointers comprised in the Windows ID list have a relative window priority or depth corresponding to the position of the respective pointer in the Windows ID list. The first pointer in the list corresponds to the background window or the window at the greatest relative Z-depth, and the last pointer corresponds to the foreground window or the window at the least relative Z-depth. The pointers in between the first and last pointer also have a relative window depth priority with respect to their position. It is noted that all windows have a depth priority, and thus a different ID number or pointer in the Windows ID List, even if multiple whole windows appear on the screen at the same time. During the assembly of the Display Refresh List, the pointer position within the Windows ID list allows the IMC 140 to determine which windows are on top and which are obscured by other windows.

It is noted that, in an alternate embodiment, the Windows ID list includes two values or entries for each window, one being the address pointer to the respective window workspace area and the other a depth value for a relative position of the window from background to foreground. In this embodiment, the entries in the Windows ID list are no longer required to be organized in position relative to their respective depth, but rather the depth value stores the relative position of the window. This results in less work for the software video driver when windows are popped or pushed relative to each other, i.e., when the window display or depth priority is changed.

Each window workspace area contains important information pertaining to the window position on the display, the number of bits per pixel, a color composition matrix, the number of depth and alpha blending bits, and static and dynamic linear address pointers for each function. Thus, each window on the screen has a separate and independent number of colors, depth and alpha planes. In addition, each window includes a separate dither decode matrix for optimal color density dispersion using a minimum number of memory bits. For non-rectangular objects, the Windows Workspace area also includes slope information for each boundary of the object as well as interpolation flags used to enable slope interpolation. This enables the IMC 140 to draw objects such as polygons, for example, triangles, using the Display Refresh List.

All refresh address values which point to the actual video data are contained within the static and dynamic address pointers within the windows workspace memory. The static linear address pointer contains the memory address for the "top" of the respective window for each of the color, depth and alpha values. The dynamic linear address pointer is updated on a scan line basis to hold the current pointer information for each window being displayed, i.e., to point to the pixel data for the respective window being displayed for the respective span line. The dynamic address pointer, once read by the Refresh Logic 404, is updated for the next line of data to be displayed. Thus, the video refresh fetch for the next span line is pointed to by the updated dynamic refresh pointer. The static linear address pointer is used to initialize the dynamic linear address pointer during the vertical retrace period for each window. In other words, at the end of each frame, the IMC 140 reloads the dynamic address pointers with the static pointer values so that, after the vertical sync pulse, the static pointer is equal to the dynamic pointer and thus the dynamic pointer again points to the top of the window or object. Therefore, the dynamic pointer is exactly equal to the static pointer at the time that the frame is on line zero.

Video driver software executing on the CPU 102 keeps track of the window priority, the window placement and the window attributes for each window on the display. It is noted that each window may be generated by a separate application program which requires a different color space and depth. The video driver directs the IMC 140 to update pointer values based on screen changes that occur.

As noted above, the IMC 140 actually maintains both foreground and background memory queues, including foreground and background Windows ID Lists and foreground and background Display Refresh Lists. In the preferred embodiment, additional workspace areas are constructed as needed. Since the addressing of the windows workspace areas are relative, based on pointer entries in the Windows ID list, the software driver preferably adjusts new entries in the background Windows ID list to point to newly created windows workspace areas.

Window Position Change

Figure 26:
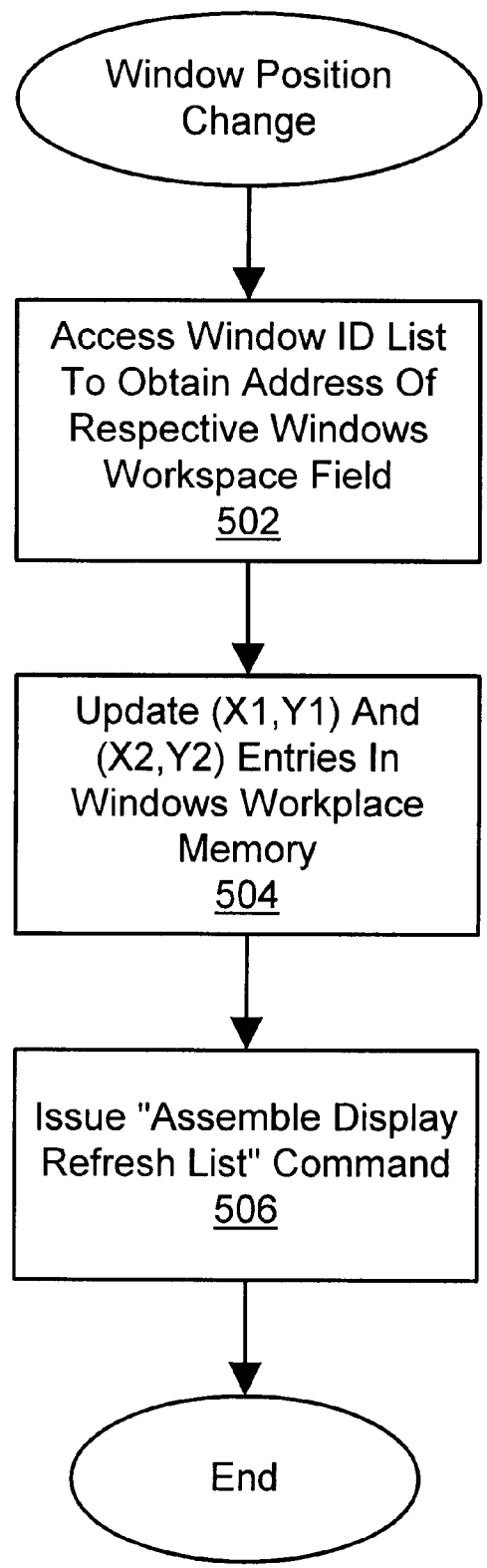
FIG. 26 is a flowchart diagram illustrating operations performed by video driver software when a window position change occurs.

FIG. 26 is a flowchart diagram illustrating operations performed by video driver software when a window position change occurs. Here, assume that the IMC 140 is currently drawing a frame using the foreground Display Refresh List and other foreground buffers and registers and that, in response to software executing on the CPU 102, the driver informs the IMC 140 to move one of the windows on the screen shown in FIG. 32 to a new position. First, in step 502 the driver accesses the background Windows ID list to obtain the address of the respective windows workspace field of the window that has been moved. In step 504, the driver updates the windows workspace area or creates a new windows workspace area for the respective window with the new X,Y coordinates, i.e., the new X1, Y1 and X2, Y2 coordinates, to indicate the new position. In step 506, the driver then directs the IMC 140 to update the Display Refresh List by writing an "Assemble Display Refresh List" command into a command register. When the "Assemble" command is received, the background Display Refresh List is rebuilt or updated using the updated entries in the Windows Workspace memory. Once the background Display Refresh List has been assembled, on the next vertical retrace, the background Display Refresh List becomes the foreground Display Refresh List, and the IMC 140 reads the new foreground Display Refresh List which now references the updated window position. Thus, the new foreground Display Refresh List is used during the next screen refresh to draw the screen with the window moved to the new position. It is noted that, since the window has only been moved in position, the Windows ID list is not changed or adjusted.

An alternate method for processing a window position change comprises the driver copying the windows workspace area for the window to the bottom of the Windows Workspace buffer and then change the XY coordinates in the new windows workspace area appropriately. The driver also changes the Windows ID list pointer for this window to point to the new windows workspace area, and the "old" windows workspace area is marked invalid.

Window Display Priority Charge

Figure 27:
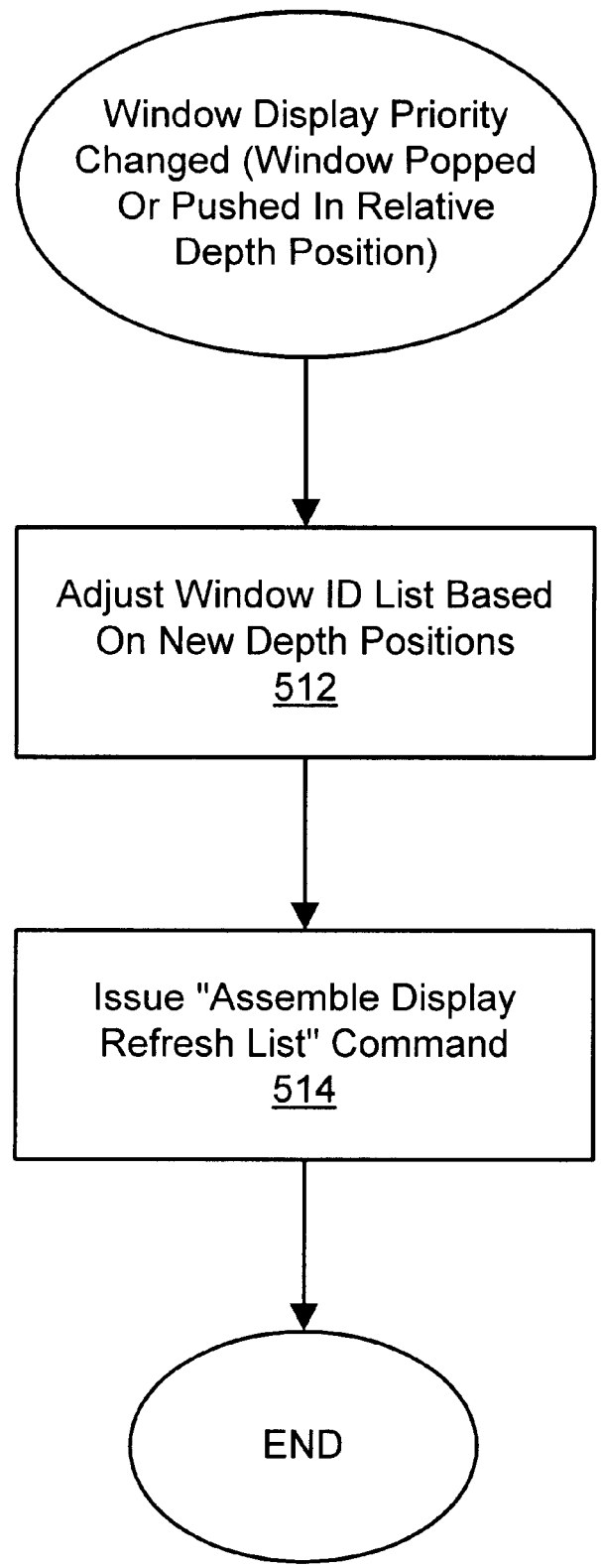
FIG. 27 is a flowchart diagram illustrating operations performed by video driver software when a change in window display priority occurs.

FIG. 27 is a flowchart diagram illustrating operations performed by video driver software when a change in window display priority occurs. Here, assume that the IMC 140 is currently drawing a frame and, in response to software executing on the CPU 102, the driver informs the IMC 140 to pop or push one of the windows on the screen shown in FIG. 32, i.e., to change the relative depth priority of a window relative to other windows. First, in step 512 the driver adjusts the background Windows ID list based on the new depth priorities. This involves reordering the contents of the background Windows ID list so that the window that has been popped or pushed is placed in a new, correct position in the background Windows ID list relative to its changed depth priority. In an embodiment where the Windows ID list includes two values, a window workspace pointer value and a depth priority value, the driver simply updates the depth priority values of the respective windows to reflect the new priority. In step 514, the driver then directs the IMC 140 to update the background Display Refresh List by writing an "Assemble Display Refresh List" command into a command register. On the next vertical retrace period, the background Display Refresh List becomes the new foreground Display Refresh List, and the IMC 140 executes the new foreground Display Refresh List starting at that new display refresh pointer. When the new foreground Display Refresh List is used to refresh the screen, the respective window is popped or pushed. For example, if the user clicked on a window to pop the window to the foreground, on the subsequent screen refresh the respective window is popped to the top of the screen.

It is noted that if a user changes the position of a window wherein this change in position also results in a change in depth priority among the various windows on the screen, both the flowcharts in FIGS. 26 and 27 are performed. Accordingly, the Windows ID list would be reorganized to reflect the new depth priority in the XY coordinates and the respective window workspace area for the window that was moved would be changed or updated according to the new position of the window.

Therefore, the Window Assembler 240 dynamically adjusts the Display Refresh List for movement of objects and changes in relative depth priority which appear on the display. Thus, when an object or window is moved to a new position in the screen, or is popped or pushed relative to another window, the data comprising the object is not transferred to another location in memory, but rather only pointer values are changed in the respective Display Refresh List. This provides the effect of moving data from a source to a destination, i.e., a bit block transfer or bit blit, without ever moving the object in memory. This provides a tremendous performance increase over conventional bit blit operations commonly used in graphical subsystems.

Window Scrolling

The present invention also provides a simplified method for scrolling text or data in windows. Instead of copying new data to the frame buffer as in the prior art, when data in a window is scrolled upward or downward, the driver simply changes the static pointers in the respective windows workspace area to point to the data that should be presented in the window.

Memory Buffer Operation Sequence

Figure 28:
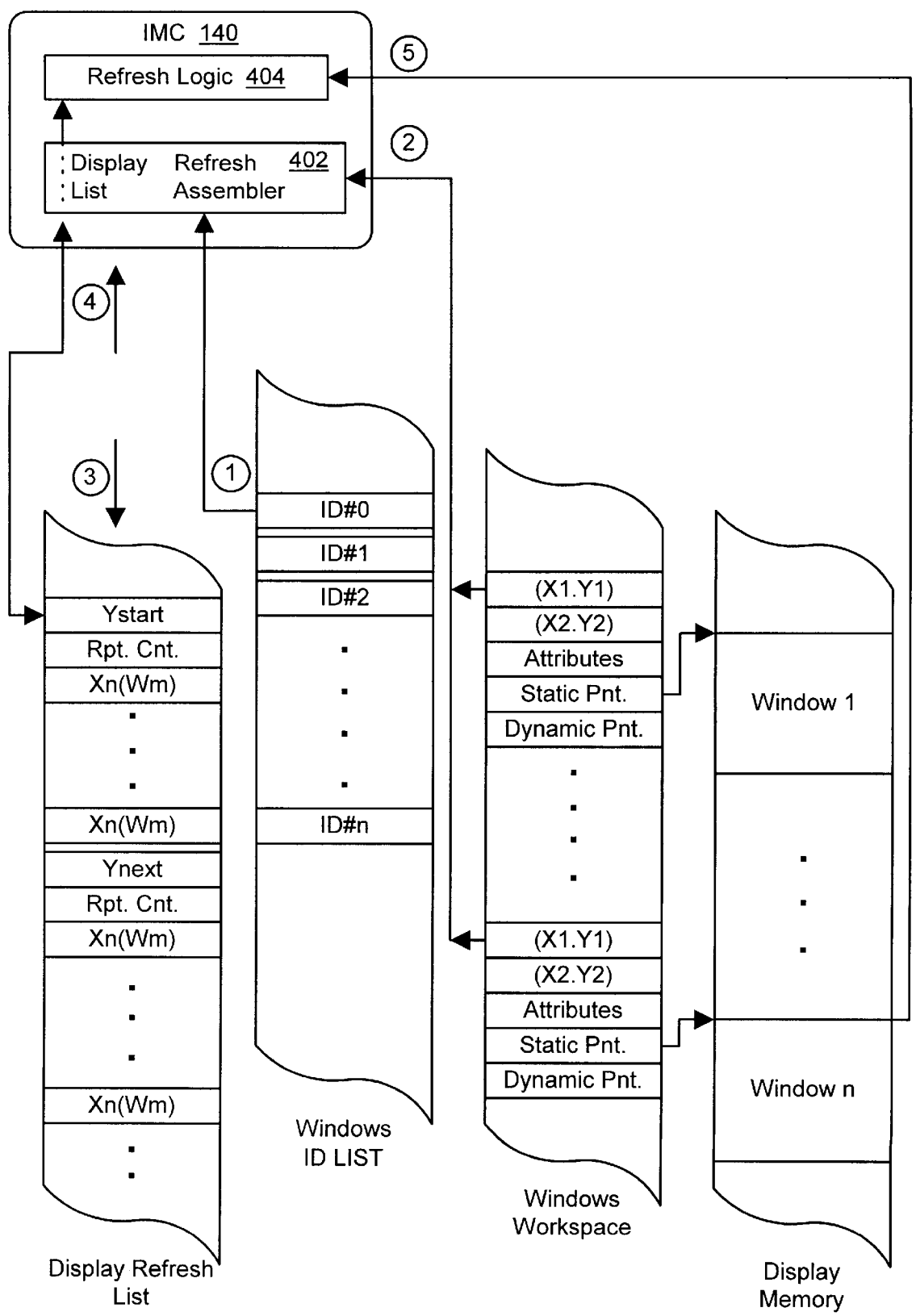
FIG. 28 illustrates the sequence of operations performed by the Window Assembler on the respective memory queues to display video data during screen refresh.
Figure 29:
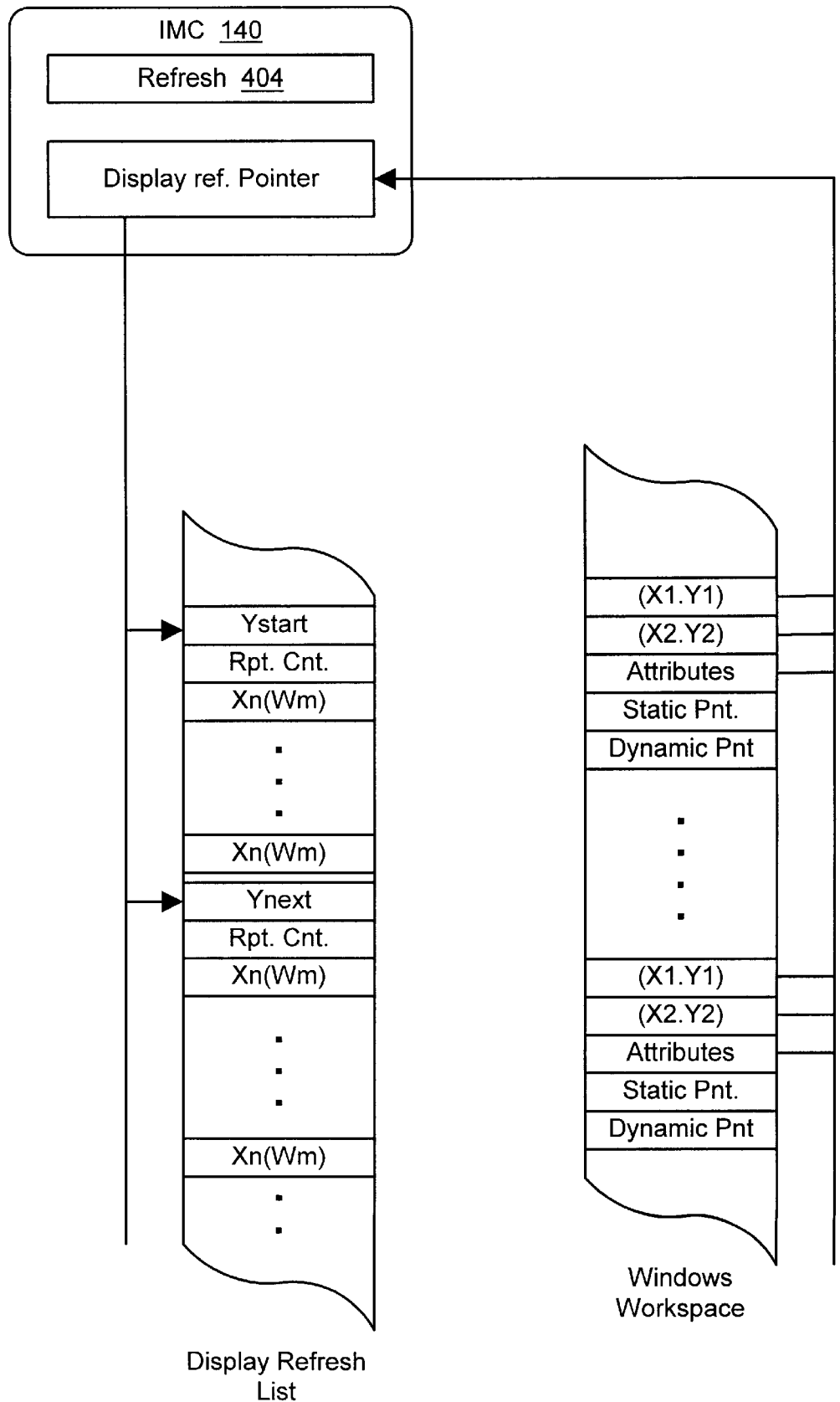
FIG. 29 illustrates how the Windows Workspace queue is used to build the Display Refresh List for display of video data.

FIG. 28 illustrates the memory organization of system memory 110 as seen by the Window Assembler 240, including arrows and numbers indicating the sequence of operations performed by the Window Assembler 240 on the respective memory buffers or queues to assemble a Display Refresh List and display video data during a screen refresh. As shown at 1, the first step involves the Display Refresh List Assembler 402 in the Window Assembler 240 accessing the Windows ID list to determine the address of the respective windows workspace areas in the Windows Workspace buffer. FIG. 25 illustrates how the pointers in the Windows ID list point to the respective windows workspace areas. At time 2, the Display Refresh List Assembler 402 uses the data in each respective windows workspace area in constructing the Display Refresh List at time 3. FIG. 29 illustrates the IMC 140 accessing data in the windows workspace areas to construct the Display Refresh List. The manner in which the Display Refresh List is constructed from information in the windows workspace areas is described in the flowchart of FIG. 30. Once the Display Refresh List has been constructed at time 3, the Refresh Logic 404 reads the pointer values in the Display Refresh List at time 4 to transfer the correct pixel or video data at time 5 in the display memory into the IMC 140 for display on the video screen. FIG. 31 illustrates how pointer values in the Display Refresh List are used to access dynamic pointers in the windows workspace areas which in turn point to the respective areas in the system memory 110 where the pixel data for each window is located.

Steps 1, 2, and 3 in FIG. 28 involve assembling or updating a Display Refresh List, ie., the background Display Refresh List. Steps 4 and 5 involve executing the assembled Display Refresh List, which begins on the VSYNC or screen refresh when the assembled background Display Refresh List becomes the foreground Display Refresh List for execution.

Display Refresh List Assembly

Figure 30:
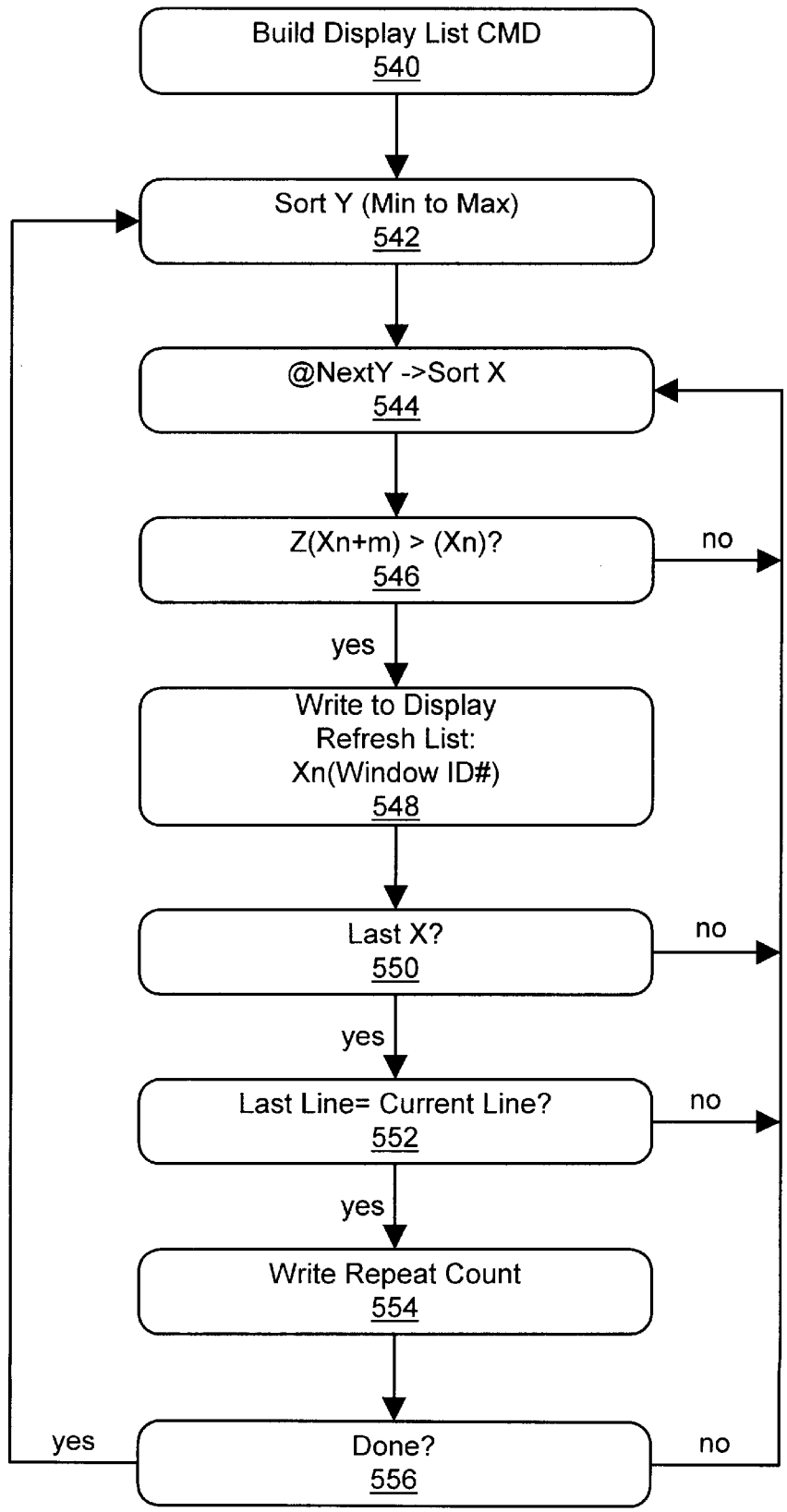
FIG. 30 is a flowchart diagram illustrating operations performed by the Window Assembler in building a Display Refresh List.

FIG. 30 is a flowchart diagram illustrating operations performed by the Display Refresh List Assembler 402 in the Window Assembler 240 in assembling a Display Refresh List in main memory 110. When an Assemble Display Refresh List command is received in step 540, the method is performed. In the preferred embodiment, the Assemble Display Refresh List command is only executed once for each frame when a screen change has occurred. In an alternate embodiment, the Assemble Display Refresh List command may be executed a plurality of times before the start of the subsequent screen refresh for respective windows or objects that are updated or changed. The background Display Refresh List is required to be completely assembled by the start of VSYNC or the screen refresh where the respective Display Refresh List is to be executed. If the background Display Refresh List is not completed by the start of VSYNC, the IMC 140 waits until the next VSYNC to execute the Display Refresh List. It is noted that an Assemble Display Refresh List command is issued and a new Display Refresh List is assembled only after a screen change occurs, which generally will not occur on every frame.

The IMC 140 first reads the Windows Workspace X,Y pointers in each of the windows workspace areas and in step 542 sorts through the Y values to determine the starting and ending Y values in the Windows Workspace pointers, i.e., to determine the minimum Y and maximum Y positions of the respective windows. In one embodiment of the invention, the Assemble Display Refresh List command can be issued on a per object or per window basis where the command specifies and minimum and maximum Y bounds corresponding to the object that has changed on the screen. In this event, the method only sorts the Y values between the minimum and maximum Y bounds.

After the Y values have been sorted, the IMC 140 then uses the minimum Y value, referred to as @nextY, and in step 544 begins sorting through the X values for the respective span line. The Windows Assembler 240 begins with the first or top span line. The X values are read from the Windows Workspace buffer and sorted to determine the minimum X, ie., to determine the position of the leftmost window on that respective span line.

In addition to the sort performed in step 544, the Z or depth information of the windows, i.e., the position relative to the other windows, is also read from the windows workspace memory area for the window whose X value is determined to be the minimum X. In step 546, if the Z depth value for the next X is less than the Z depth value for the last X, then the sort of X values continues in step 544. In this instance, the next window encountered on this span line is "underneath" or "behind" the window already being drawn, and thus there is no need to obtain video data for this window on this span line. If the Z depth value for the next X is greater than the Z depth for the last X, then there is a window context switch, i.e., the new window encountered is over or in front of the window that was being drawn on the respective span line.

In step 548, an entry comprising various information for the new window is then written to the Display Refresh List. The information written to the Display Refresh List in step 548 includes the X start address of the window, the pitch count or width of the window on the span line, a binary field referencing a microcode instruction for the number of bits per pixel, alpha blending and other attributes, and a pointer to the dynamic pointer which references the video data of the window. During execution of the Display Refresh List, the microcode instruction or opcode reconfigures the IMC's video data serializer according to the Attributes field of the windows workspace area for the window being drawn. It is noted that the binary field is included only if one or more attributes change for the new window. Each entry in the Display Refresh List is preferably a 32-bit or 64 bit value.

It is noted that, for the minimum X which is the leftmost X value on the respective span line, this X will by default have a lesser depth than any prior X value, and the information for this X value is written to the Display Refresh List in step 548. If two windows are aligned on the same X boundary for a span line, then the depth compare in step 546 determines which should be drawn.

Once data has been written to the Display Refresh List in step 548, in step 550 the Window Assembler 240 determines if this is the last X in the sort, i.e., if the sort performed in step 544 has reached the rightmost part of the screen for the respective span line. If the current X is not the last X in the line, i.e., if there is another window present on that particular scan line, then the method returns to step 544 and repeats steps 544–550.

As shown in FIG. 31, the pointers written to the Display Refresh List in step 548 actually point to the dynamic pointer values in the Windows Workspace areas. Thus for each span line starting at the top of the screen, the X values are sorted left to right to determine which window's pixel data should be drawn on the respective horizontal span line.

When the method reaches the last X on the span line in step 550, in step 552 the method determines whether the last line of data assembled in the Display Refresh List is equal to the current line. In other words, in step 552 the method performs a memory comparison of the last assembled line in the Display Refresh List with the current line. If the current line is not equal to the last assembled line in step 552, then operation returns to step 544, and the data written to the Display Refresh List for the current line remains. If the current line is equal to the last assembled line, then in step 554 a Repeat Count value is written into the last assembled line. The Repeat Count value overwrites the entries written to the Display Refresh List in step 548 for that line. The Repeat Count value indicates that the same entries should be used in the Display Refresh List for the respective span line as the line before. Thus the Repeat Count value minimizes the amount of data contained in the Display Refresh List, and therefore allows for less memory to be used for the Display Refresh List. For each line assembled by the IMC 140 in the Display Refresh List that is the same as the last assembled line, the Repeat Count is incremented. When the IMC 140 assembles a line which has different parameters or a new object, the new entries are written to the Display Refresh List instead of incrementing the Repeat Count. The assembly process is complete when the last Y line and last X position within that line have been processed.

If more lines are required to be processed as determined in step 556, then the method returns to step 544 to sort the X values for the next line, pointed to by @nextY. In steps 544–550 the sort of X values is performed on that line to determine respective pointer values that are written into the Display Refresh List as before. This method repeats until the number of lines is complete according to a counter register inside the IMC 140. When all lines have been processed, operation returns to step 542, and method is performed again to assemble a new Display Refresh List when a screen change occurs.

Therefore the Display Refresh List Assembler 402 reads the window positions located in the windows workspace and sorts these positions according to the method of FIG. 30. First, the windows workspace areas are read for minimum Y address values. A sort continues for the minimum X values within the identified minimum Y value. All X values are sorted with respect to the depth value which is identified by the address position of the particular window within the Windows ID list. This operation continues, and the IMC 140 builds a Display Refresh List in system memory 110 based on the results of the sorting and comparisons.

The Display Refresh List Assembly method eliminates conventional prior art window clipping. Graphical data need not be separately processed to clip to X/Y regions.

Video Refresh Method—Display Refresh List Execution

FIG. 31 illustrates how the Display Refresh List is used to reference video data for display on the display screen during screen refresh. Here it is assumed that the Display Refresh List has been assembled into system memory 110 as described above in FIG. 30. As discussed above, the IMC 140 includes foreground and background display refresh pointer registers each storing a display refresh pointer which points to the top of the respective Display Refresh List. An assembled Display Refresh List includes a plurality of entries which indicate how video data is to be presented on the screen during screen refresh. Each entry includes the X start address of the window, the pitch count or width of the window on the span line, and possibly a binary field which references a microcode instruction for dynamic configuration of the Refresh logic 404 depending on the object being drawn.

Each entry in the Display Refresh List also includes pointers to the respective windows workspace area dynamic pointers corresponding to the window pixel data being drawn for each respective span line. As discussed above, the dynamic pointers then select the actual display data in system memory 110, i.e., the actual video data in system memory that will be seen on the monitor. As discussed above, the dynamic pointer for each window in each workspace area is updated for each new span line to point to the new pixel data for the respective span line. The data from the display is then read into the IMC Refresh Logic 404 in the Window Assembler 240 at the proper time in order to be output to the monitor 142.

Display refresh is preferably performed in advance of the actual display output to compensate for the delay caused by the mode and refresh context switching delays. The Display Refresh List enables the software window managers or drivers to have independent control of each application's color, positional depth, and blending functions as well as individual control of indexed color.

At the first vertical retrace period, the IMC 140 copies the static address pointers into the dynamic address pointers.

The IMC 140 then reads the first value of the Display Refresh List. This value includes an X start address, a pitch count value, and possible a binary field referencing a microcode instruction or opcode for the various attributes of the object or window. The microcode instruction is preferably configured during an Assemble Display Refresh command and is executed here to configure the IMC 140 for the correct number of bits per pixel, alpha blending, and other attributes for the object or window being rendered. The Display Refresh List value also contains the address pointer to the dynamic address pointers within the windows workspace area. The address is then read from the dynamic address pointer which allows the IMC 140 to begin fetching the actual video data for the respective object on that particular line. The Display Refresh List contains the pitch value (i.e., width of X2–X1) such that the IMC 140 can determine when to context switch to the next dynamic pointer within the windows workspace area for the next window or object on the respective span line.

As mentioned above, during refresh context switch (i.e., a new window boundary on a span line during screen refresh), the IMC 140 dynamically re-configures the display output data path to compensate for the type of data which is transferred through the video pipeline. This reconfiguration of the video display path allows the dynamic reconfiguration of the color depth on a per window or object basis. The Refresh Unit 404 uses the information from the windows workspace areas to dynamically adjust the number of bits per pixel depending on what is being drawn for that window. The Refresh unit 404 also uses other information, such as alpha-blending information and slope information, from the windows workspace area during screen refresh. In one embodiment of the invention, one or more of the windows workspace areas include pointers to a color composition matrix or color table for dynamic reloading of indexed color.

When a new window is to be displayed on the screen, the Window Assembler uses the Display Refresh List to determine where in the linear or xy memory space the data resides as well as how many bits per pixel the window requires, how to map the color space, and the necessary xy rectangle extents and window priority. This information is used during the screen refresh to display the window on the screen very quickly and efficiently. Thus, the video display can be updated with new video data without requiring any system bus data transfers, which were required in prior art computer system architectures.

Figure 32:
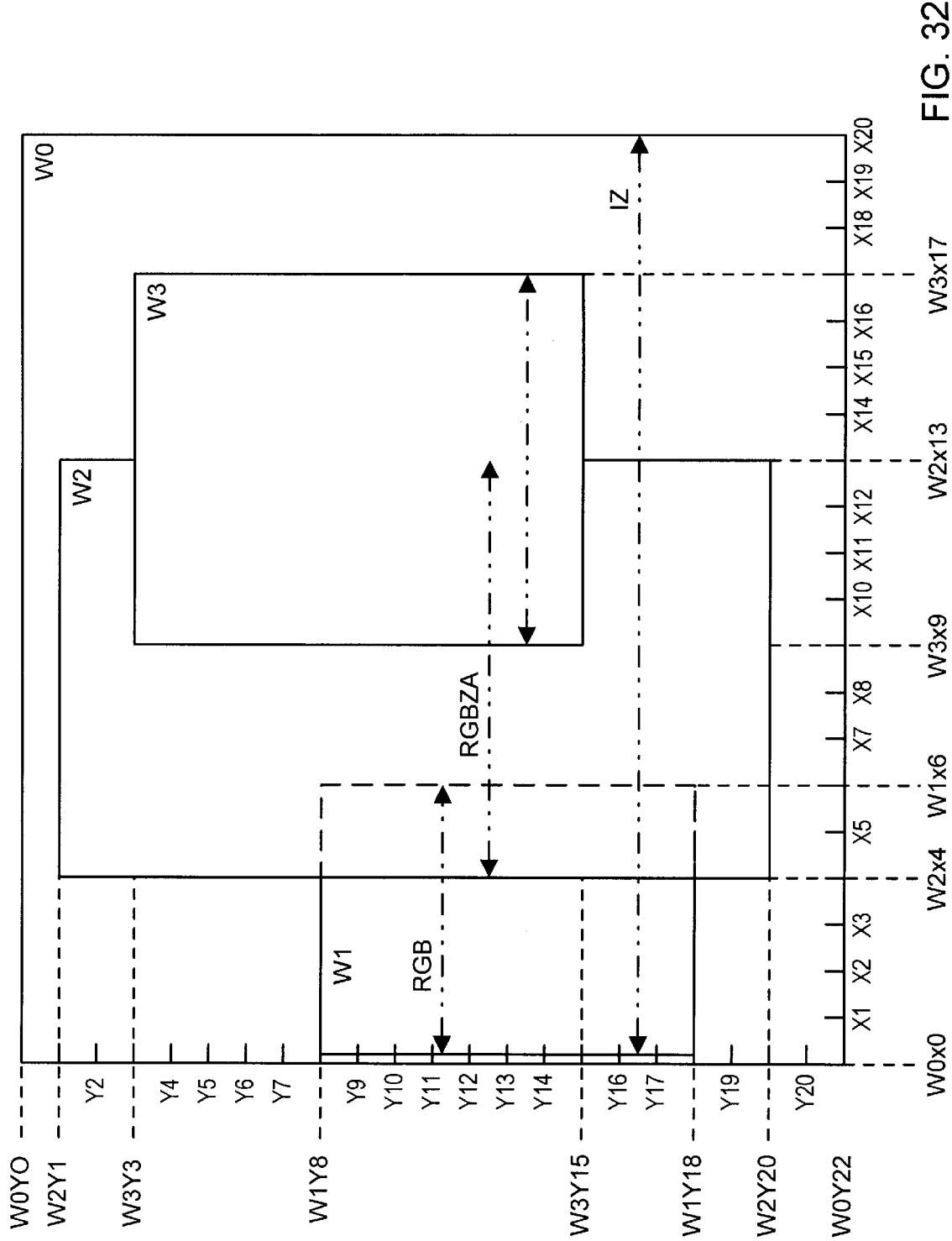
FIG. 32 illustrates a display screen including multiple windows and their relative positions and color depths.

FIG. 32 illustrates the display screen 142 including multiple windows and their relative positions. In this example, W0 or window 0, is the matt or the background window, and W1, W2 and W3 are windows which overlap each other within the base window W0. The corners of the windows are indicated by the positions. W0Y0, for example, is the first line of W0 and W2Y20 at the bottom is the last line of window W2, which is at Y position 20. The same positions are true with the X coordinates. This information is programmed by the driver software into the Windows Workspace area of the system memory 110.

Figure 33:
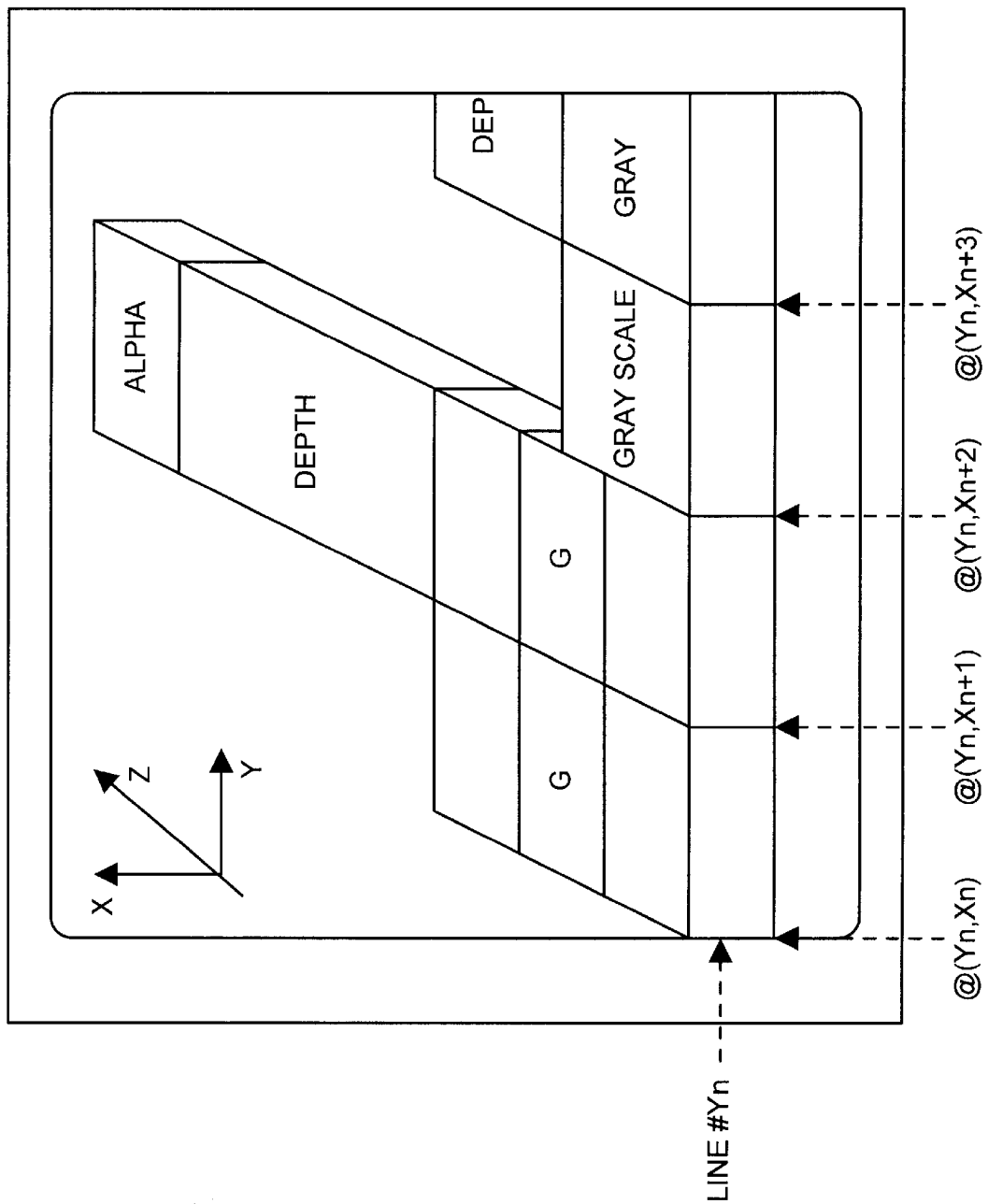
FIG. 33 illustrates a single raster scan line of the display screen of FIG. 32 in a system including a Window Assembler and using the display list refresh method of the present invention.

FIG. 33 illustrates a single raster scan line roughly corresponding to the display screen 142 of FIG. 32 and the result when the Display Refresh List method is used. The Display Refresh List method of the present invention allows the software window managers or drivers to have independent control of each application's color, position depth, and blending functions as well as individual control of indexed color. FIG. 33 presumes that there are four different process windows pointed to by Xn through Xn+3. Each of the four window workspaces contains the starting X/Y position of the window, the color depth, the Z depth, and the alpha value pointers. As shown, the first window is a single RGB direct color. The second window shows direct RGB color along with a depth buffer and an alpha buffer. The third window shows only a simple gray scale window while the fourth buffer shows gray scale with a depth buffer.

Display Refresh List Execution Example

The operation of the Refresh Unit in executing a Display Refresh List is described below. Here it is assumed that a Display Refresh List has been assembled to present video data on the screen as shown in FIG. 32. The Refresh Unit 404 preferably reads in the entries in the Display Refresh List for an entire span line for execution. The Refresh Unit 404 reads all of the entries for a span line and examines the entries to determine where windows or objects begin and end on that span line.

Execution of the first entry in the Display Refresh List configures the Refresh Unit 404 according to the attributes of window W0. Thus if window W0 has a color depth of 8 bits per pixel, the data path of the Refresh Unit 404 is configured to draw 8 bits per pixel. The X start address indicates that the video data should begin at X0, and the pitch count in the first entry indicates that window WO occupies an entire span line. The pointer value in the first entry references the dynamic pointer in the window workspace area of window W0, which in turn references the video data for the top span line of window W0. The video data is obtained from system memory 110 and passes through the Refresh logic 404 in the Window Assembler 240 as well as the Display Storage Buffer 244 and Display Memory Shifter 246 to the DACs 250, 252, and 254. The video data is converted to analog video signals for output on the display monitor 142. Upon completion of the top span line, the dynamic pointer in the window workspace area of window W0 is incremented to point to the video data for the next span line.

Having completed assembly of the top span line into the internal display memory shifter 246 and as output to the external display monitor begins, the Refresh Unit 404 reads the entries in the Display Refresh List for the next span line. As noted above, the Refresh Unit 404 examines these entries to determine where windows or objects begin and end on the respective span line. The next entry in the Display Refresh List corresponds to drawing window W0 on the second span line. This second entry does not reference a microcode instruction for reconfiguration of the Refresh Unit 404 since the same window is being drawn as before. The X start address indicates that the video data should start at x0, and the pitch count value indicates that the video data for window W0 occupies the entire span line. The pointer value in this entry references the dynamic pointer in the window workspace area of window W0, which in turn references the video data for the second span line of window W0. The video data is obtained from system memory 110 and converted to analog video signals for display as described above.

When the video data corresponding to window W0 at pixel locations x0y1 to x3y1 has been retrieved for display, the next entry in the Display Refresh List is read for execution. This entry signifies a window context change, i.e., a new window, window W2, appears on the span line. If this entry in the Display Refresh List, which corresponds to window W2, references a microcode instruction for an attribute change, then the Refresh Unit 404 is reconfigured according to the attributes of window W2. Thus if window W2 has a color depth of 4 bits per pixel, the data path of the Refresh Unit 404 is configured for 4 bits per pixel. The X start address indicates that the video data should begin at x4, and the pitch count in this entry indicates that the video data for window W2 should occupy the next 9 pixels, or up to x12. The pointer value in this entry references the dynamic pointer in the window workspace area of window W2, which in turn references the video data for the top of window W2. The video data for window W2 is obtained from system memory 110 and converted to analog video signals for display as described above.

When a window context change occurs and the pitch count for the prior window, in this case W0, indicates that the entire window has not been drawn on that span line, then the Refresh Unit 404 reads the prior x start address (in this case $(x_4 y_1)$) and adds the pitch value for W2 to indicate the start address to continue the W0 pitch count. Alternatively, the Refresh Unit 404 begins a counter referred to as a pitch counter to count the remaining pitch count of window W0. This is used to determine if any of the window remains to be drawn on the span line. This count also provides an indication of where to begin redrawing the window on that span line after other window(s) have been drawn. Also, in the preferred embodiment, the dynamic pointer is updated in the window workspace area when either the entire window has been drawn or the pitch counter indicates that the window has ended on the span line. Thus the dynamic pointer is updated in the window workspace of window W2 after the video data for window W2 has been retrieved.

After the video data corresponding to window W2 at pixel locations x4y1 to x12y1 has been retrieved for display, and the dynamic pointer for window W2 has been updated, the next entry in the Display Refresh List is read for execution. This entry again signifies a window context change, i.e., a change from window W2 to window W0. If the entry in the Display Refresh List references a microcode instruction for an attribute change, then the Refresh Unit 404 is reconfigured according to the attributes of window W0. This will only be required if window W0 and window W2 have different attributes and thus an attribute change was required in the change from window W0 to window W2 earlier in the span line. The X start address of this entry indicates that the video data should begin at x13. In addition, the pitch counter indicates where the video data for window W0 resumes on the span line. As noted above, the pitch count for window W0 indicates that the video data for window W0 occupies all of the pixels on this span line. The pointer value in this entry references the dynamic pointer in the window workspace area of window W0, and either the value of the pitch counter or the X start address is used as an offset to reference the video data for window W0, beginning at x13. The video data for window W0 is obtained from system memory 110 and converted to analog video signals for display as described above. Upon completion of this span line, the dynamic pointer in the window workspace area of window W0 is incremented to point to the video data for the next span line.

For the next span line at y2, the Display Refresh List includes a Repeat Count value directing that the entries for the prior span line should be used for this span line. As shown in FIG. 32, the second and third span lines corresponding to y1 and y2 have identical window arrangements. The same Display Refresh List entries are used for the span line even if the video data differs for the various windows from one window to the next. If the subsequent span line has the same window arrangement but requires different video data, the updated dynamic pointers for each window references the correct video data for the span line. In other words, since the entries in the Display Refresh List reference dynamic pointers which in turn reference the video data, the entries in the Display Refresh List are independent of the video data and thus can be re-executed for a subsequent span line while referencing different video data. Execution of the remaining span lines is similar to that described above.

For non-rectangular objects, the entry in the Display Refresh List for the object includes a slope value which is used to adjust the dynamic pointer for the object on each span line. This provides an efficient mechanism for drawing non-rectangular objects.

Multi-Buffering

The prior art for graphics animation uses the concept of "double buffering" where there are two memory buffers in graphical display memory. Double buffering allows for smooth animation of moving objects on the screen. Prior art also uses software drivers to offset the write address between both buffers for each object written into the display buffer. While one buffer is being written to for the next frame to display, the second buffer is used to output to the monitor via the DAC. This technique adds additional computation time to the application software. In addition, the display adapter must support a buffer switch mechanism which switches between buffers during the vertical sync time. As discussed above, the Window Assembler 240 in the IMC 140 performs double buffering or even multiple buffering using a novel method.

The IMC 140 continuously reads data for the display in a manner somewhat similar to a conventional television. The IMC 140 reads the video display data in system memory 110 continuously as the beam sweeps across the screen. When a change in window position or depth occurs, the IMC 140 switches in the new Display Refresh List without interruption of the beam at "VSYNC" or the beginning of a frame. The new Display Refresh List is required to be completely assembled before execution to draw a new frame. Also, the Assemble Display Refresh List command is "asynchronous" to the beam. Therefore, the IMC 140 includes foreground and background memory lists, i e., foreground and background Display Refresh Lists and foreground and background Window ID Lists, as well as foreground and background Window ID Pointer registers, Windows Count registers, and Display Refresh List Pointer registers. The driver sets up foreground and background queues in memory at initialization. While the Refresh Logic 404 in the IMC 140 is executing the foreground Display Refresh List, the Display Refresh List Assembler 402 may be building the background Display Refresh List queue. Once the Display Refresh List Assembler 402 finishes building the new background Display Refresh List and the next vertical blank or VSYNC occurs, the IMC 140 switches the foreground and background registers and buffers such that the next active line is read indirectly with use of the new foreground Display Refresh List. This same technique is used for position changes and depth adjustments. When a position change or change in depth occurs, the modification is made in the background Windows ID list or background Windows Workspace area. On VSYNC after the Assemble Display Refresh command has completed, the switch between background and foreground registers and buffers occurs. As part of this switch, the address at the top of Window ID list is programmed into the IMC's background Window ID list pointer.

Therefore, double buffering is performed by maintaining two copies of the registers and buffers used for assembling and executing Display Refresh Lists. The windows workspace is copied to a secondary workspace location in the system memory 110 and only the values of the static address pointers are changed to point to the second display memory buffer in system memory 110. A secondary Windows ID list is also copied into system memory 110, and the values of the secondary Windows ID list are changed to point to the new updated values in the windows workspace. As discussed above, the IMC 140 contains secondary registers for the window count register, the Windows ID List pointer registers, and the Display Refresh Pointer register. When the IMC command "switch buffers" is executed at each vertical sync period, the ID pointer registers are switched. This allows dynamic reordering of window parameters and priorities.

In addition to double buffering, the Window Assembler has benefits for other animation techniques. Graphical data can be moved on the display monitor as objects which are attached to IDs in the Windows ID list. In this manner, multiple frames of an object are stored as display memory and the Window Assembler assembles on a span line basis. In effect, the Window Assembler 240 provides multiple buffering capability which in turn provides higher overall performance. This mechanism allows for animation sequences by multiple distributions of different window workspace pointers. It is noted that, unlike the prior art, a bit map image or graphical data is not required to be transferred from system memory 110 to the graphics adapter. Rather, the animation is performed by adjusting pointers to the data that is already in system memory 110.

Thus the Display Refresh List of pointers allows for dynamic movement of data across the screen, which eliminates costly double-buffer techniques. A timed sequence of events or animation is based on the updates of pointers to different memory addresses in the system memory 110. Therefore, double buffering is performed by changing only the values of the static linear address pointers. The display memory buffer pixel data is read from each address location as indicated by the respective static pointers.

Prior art computer systems required all data on the video screen to have the same color depth and hence all video data stored in video memory to have the same number of bits per pixel. According to the video Display Refresh List system and method of the present invention, only the memory required per user application is required to be allocated to store graphical data. This eliminates display memory waste. Some applications may only require two colors (monochrome) while other may require full color, etc. The windows workspace areas contain flags for enabling and disabling of various graphics operations. The depth, dither, alpha and index color load enable bits are located in the attribute field of the windows workspace and are also used to adjust for application specific windows. Therefore, unlike the prior art, the system of the present invention does not have color resolution limitations because of insufficient graphics adapter memory. Also, the system of the present invention provides color resolution on a per window or per object basis, thus requiring the minimum amount of memory for pixel color data.

2D and 3D Object Assembly

As mentioned above, the present invention further includes a novel method for assembling 2D and 3D objects. According to the invention, the update of the Display Refresh List is performed continuously with slopes on the bounds of the object. Thus, execution of the Display Refresh List renders triangles of texture without moving the texture maps.

In an embodiment where the Window Assembler Display Refresh List method is used for the manipulation of rectangular windows, the X boundary of the window or object remains constant since the window is rectangular and thus always begins at the same X coordinate for each span line. However, in one embodiment of the present invention as mentioned above, the Window Assembler 240 manipulates objects of various shapes. For example, in one embodiment, the Graphics Engine 212 includes logic which enables it to draw numbers of triangles very quickly in order to quickly render objects of any shape and size on the screen. For more information on this triangle rendering graphics engine, please see Foley et al. *Introduction to Computer Graphics* Addison-Wesley, 1994, which is hereby incorporated by reference.

In an embodiment where the Windows Assembler 240 is used for rendering triangles and other non-rectangular objects, each Windows Workspace area includes a field which contains one or more slopes for the edges of the object being rendered. In one embodiment, each Windows Workspace area includes a $\Delta X$ value, a $\Delta Y$ value, and an attribute indicating whether an interpolation refresh mode should be enabled. When the interpolation mode is enabled, then each time the Display Refresh List is used to fetch a new span line of data for the object with the dynamic pointer, the $\Delta X$ and $\Delta Y$ values are used to manipulate the dynamic pointer for each new line using a slope calculator. Thus, the $\Delta X$ term is used to adjust the dynamic pointer according to the slope of the object to draw the non-rectangular object. Therefore, for non-rectangular windows or objects, the update of the dynamic pointer address preferably occurs using an interpolated slope. The previous dynamic address pointer value which is contained in the windows workspace memory is used in conjunction with the interpolated slope in the Windows Workspace area to derive the new dynamic address pointer for the next span line.

Object-Based Display Refresh List Assembly

In one embodiment of the present invention, the Window Assembler 240 comprises an object-oriented nature wherein each of the windows workspace areas are manipulated as objects. Further, the Display Refresh List comprises a plurality of Display Refresh List objects, each corresponding to the respective windows or objects on the display screen 142. In this manner, when one window or object on the screen changes from one frame to the next, only the Display Refresh List object(s) corresponding to the object(s) which changed on the screen are required to be updated. The Display Refresh List lists for those windows and objects that have not changed on the display screen 142 are not required to be updated, and thus these Display Refresh List objects remain the same. This allows an object oriented assembly where only objects and windows that have changed from one screen refresh to the next require updating. Thus, the Assemble Display Refresh Command only assembles the objects that have changed. This considerably reduces the workload of the window assembly.

In one embodiment, the master Display Refresh List comprises a plurality of sub-Display Refresh List objects which are linked together. Only the sub-Display Refresh Lists corresponding to objects that have changed need to be updated. For example, if a plurality of windows or objects are on the display screen and one object is being animated, the assemble command is not necessary for the objects or windows that have not changed, but is only necessary for the object being animated. Accordingly, the Assemble Display Refresh List command is directed to only assemble span lines between certain X and Y bounds. In addition, only the areas of the screen which have animation require two buffers, and thus the present invention uses less memory than the prior art. In the prior art, the entire screen is required to have a secondary buffer even if only a small part of the screen is displaying animation.

Screen Refresh Rate Edge Antialiasing and Filter Algorithm

Data is read from the main memory according to the Display Refresh List requirements described above. As the data traverses the internal IMC 140 serial shift FIFO, the edge antialiasing method of the present invention occurs. This method is enabled by the attribute bits located for each window in the window workspace flags located in system memory 110. Each window workspace contains an enable flag for smoothing. If the flag is enabled, filtering is accomplished by the edge antialiasing and filter method of the present invention.

Figure 34:
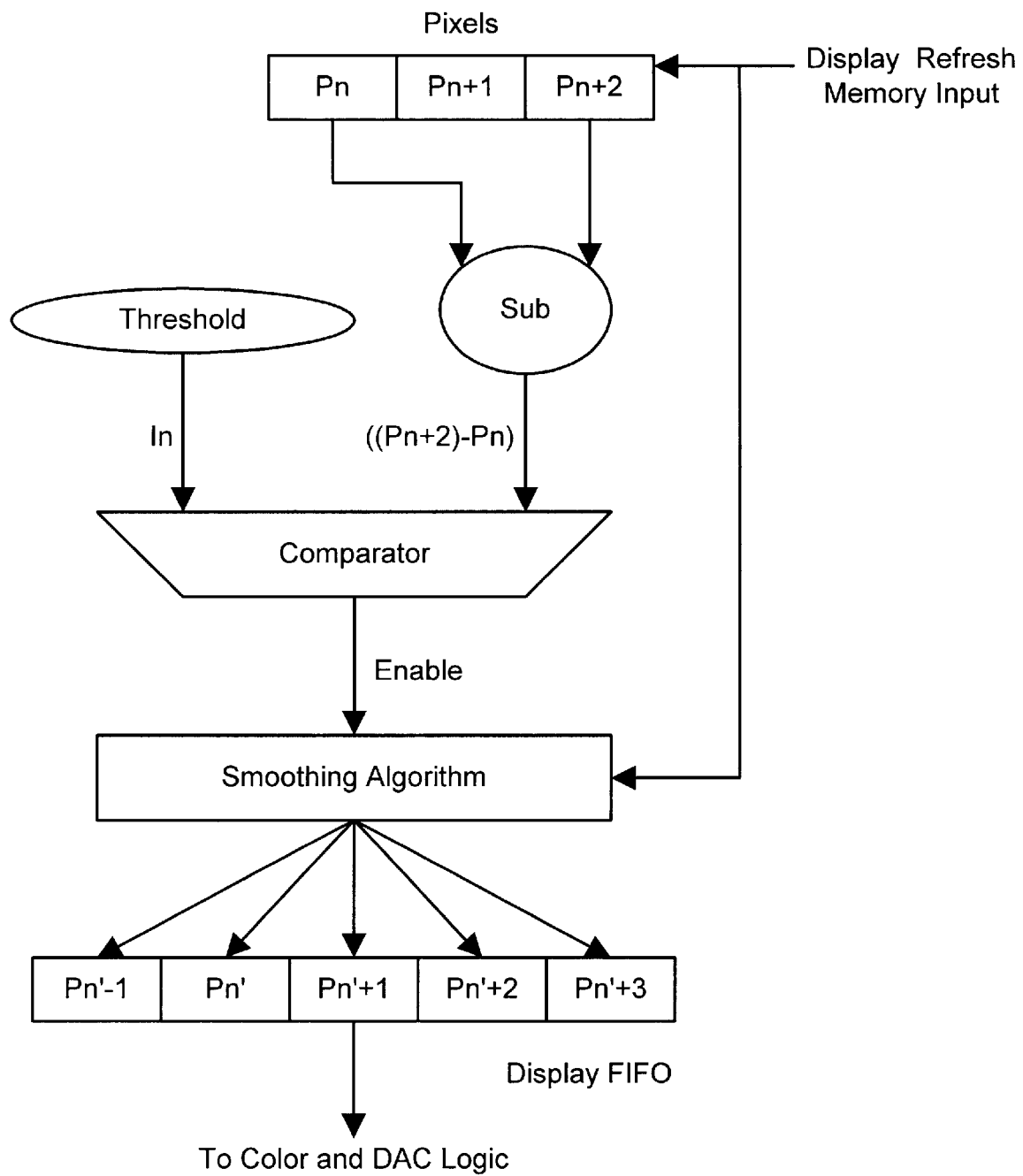
FIG. 34 illustrates a screen refresh rate edge antialiasing and filtering method according to the present invention.

The screen refresh display input data which is targeted to the display FIFO is compared against predetermined threshold values. Threshold values represent the delta change in intensity or color. It is noted that, since the eye recognizes abrupt changes in intensity more than color, the effect only blends areas where the eye is more sensitive. The result of such a detection is the automatic blending and smoothing of the area around the abrupt change in intensity. This technique provides continuous filtering of image data for all graphical information displayed. FIG. 34 shows the data path for edge detection and antialiasing logic.

In the preferred embodiment, two modes of operation are available. The first is a continuous smoothing method where the intensities are set to always compare. This implies that each old pixel is blended with the last new pixel in both the X and Y dimensions. Another method is to weight the blending depending on the degree of change of intensity.

As shown in FIG. 34, data enters the IMC 140 for assembly into the display refresh output FIFO. Before such assembly occurs, the data is continuously monitored on a per window basis for a large delta change of intensity between a group of neighboring pixels. Each pixel is sampled and subtracted for a comparison to the threshold level stored as a constant value in an IMC register. If the threshold values are surpassed, then the smoothing method of the present invention begins. As data is moved from the input latches to the display FIFO an averaging of the intensities occurs. The method uses variables to adjust the degree of smoothing the area in which smoothing is to be done. Smoothing follows a Gaussian distribution curve around the area of highest threshold changes.

X, Y, Z Compare Registers and Relative Z Addressing

The present invention includes a novel system and method which uses X, Y, Z compare registers and relative Z addressing to reduce the amount of Z-buffer memory required. The X, Y, Z space of an object is referred to as a bounding box. Thus, when two objects collide, collision detection is valuable, because most applications are required to know when two objects hit each other. For example, consider kinematics where two rubber balls come together. Here the application must reprogram the interface so that the two objects bounce away from each other, or have some elasticity. When the collision occurs, the host CPU is interrupted to inform the application. The present invention only compares the X, Y, Z space of a first object with the X, Y, Z space of a second object if the Z components of the two objects intersect. When the present invention compares the X, Y, Z space of a first object or window with the X, Y, Z space of a second object or window, if a collision occurs, then the Z comparator operates using a relative address to only a new X, Y, Z space encompassing both objects. In other words, the application only allocates enough depth memory equal to the depth memory required for both bounding boxes rather than requiring an entire Z-buffer corresponding to an entire frame buffer or screen. This reduces the amount of Z-buffer memory required. Thus, the Z-buffer compare is only required for the union of the bounding boxes not the entire frame. The Z-buffer memory is dynamically allocated and the addresses are relocated based on where the union of the bounding boxes occurs. In one embodiment, this feature is extended to "N" XYZ registers for multiple bounding boxes.

Thus, the IMC 140 maintains an absolute Z-buffer origin address and relative screen addresses. When two objects or two bounding boxes collide, the Z-buffer compare is performed using a relative Z address that is offset from the X, Y position of the objects on the screen. The IMC 140 then allocates enough depth buffer for the totality of one larger bounding box encompassing both objects. The address is relative and offset to the X, Y address, and is used while the two bounding boxes intersect or have common X, Y, Z space.

Figure 35:
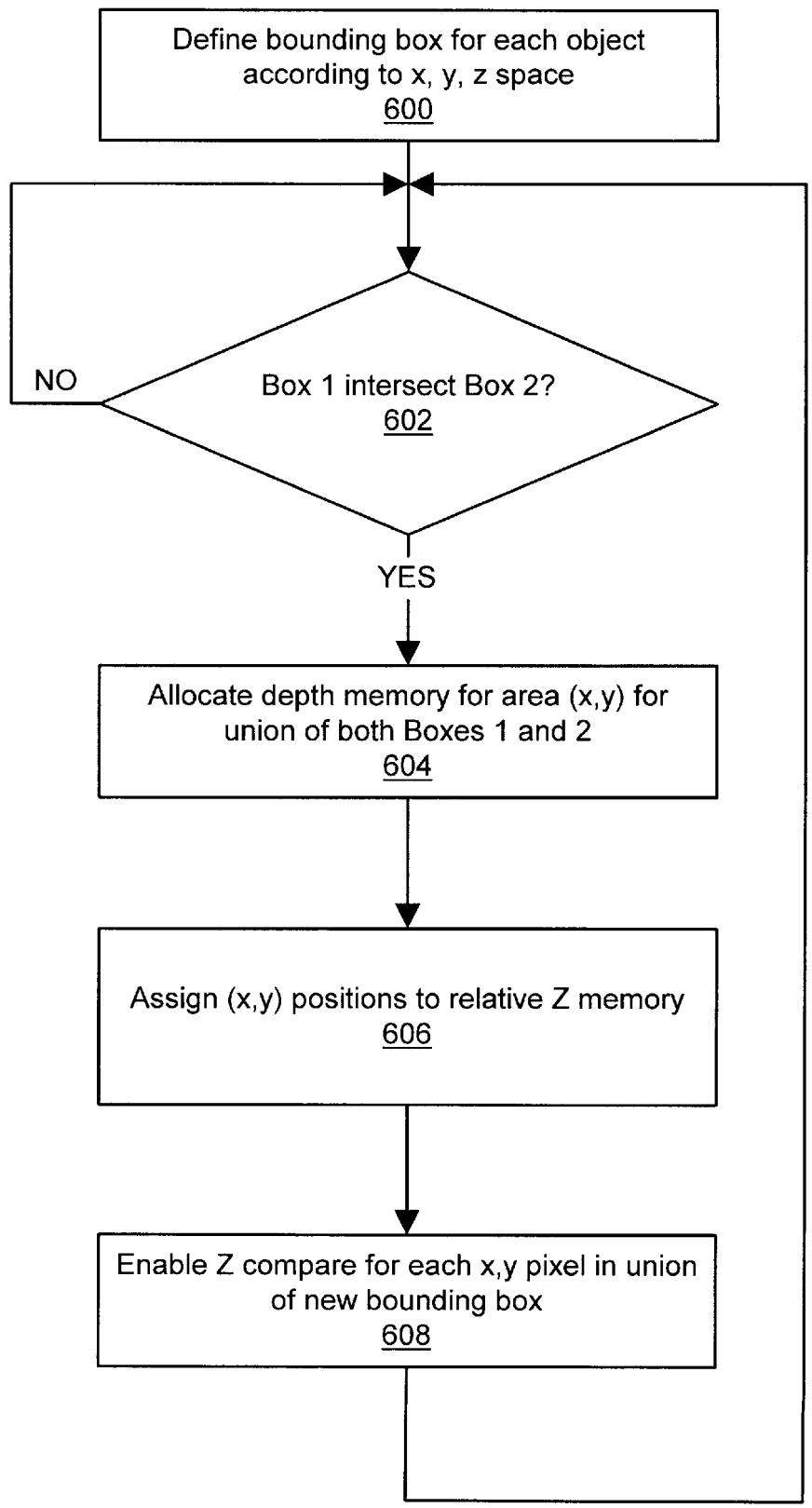
FIG. 35 is a flowchart diagram illustrating allocation of depth memory according to the present invention.

FIG. 35 shows a flowchart diagram illustrating Z-buffer use and allocation. In step 600 a bounding box is defined for each object in X, Y, Z space identifying the outer bounds of the object. In step 602 all of the boxes are compared for determining intersection, although the flowchart diagram illustrates intersection for two boxes, referred to as Box 1 and Box 2. The present invention compares X, Y, Z space of Box 1 with the X, Y, Z space of Box 2 to determine if Box 1 intersects Box 2. If not, intersection has not occurred and memory is not allocated for Z values. However, if intersection occurs, operation proceeds to step 604 where memory is allocated for the Z values for the X, Y area of a new larger box encompassing the areas of Box 1 and Box 2 combined. Only enough Z memory or depth memory is allocated for determining the union of bounding boxes, rather than the entire frame. The X, Y positions are then assigned relative to the Z memory in step 606, and in step 608 Z compare is enabled for each X, Y pixel in the union of the bounding boxes.

CONCLUSION

Therefore, an integrated memory and graphics controller is shown and described. The IMC of the present invention provides numerous advances over the prior art. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system including a memory controller which performs memory control and video functions, comprising:

a CPU;

a memory controller coupled to said CPU which performs system memory control and video functions, wherein the memory controller includes one or more video ports for providing video signals;

system memory coupled to said memory controller, wherein said system memory stores video data and non-video data; and a display device coupled to said one or more video ports of said memory controller, wherein said memory controller accesses said video data in said system memory and provides video signals through said one or more video ports to said display device;

wherein said memory controller receives non-video data from said CPU and stores said non-video data in said system memory and wherein said memory controller transfers said non-video data from said system memory to said CPU on CPU request;

wherein said memory controller includes a compression/decompression engine, wherein said compression/decompression engine is operable to compress received data and store said compressed data in said system memory, and wherein said compression/decompression engine is operable to receive data from said system memory and decompress said data received from said system memory; and wherein said compression/decompression engine is operable to compress/decompress both said video data and said non-video data being transferred to/from said system memory.

2. The computer system of claim 1, wherein said memory controller includes one or more video ports for providing video signals directly to said display device.

3. The computer system of claim 2, wherein said system memory comprises a plurality of memory locations, wherein said system memory is operable to store said video data in any of said memory locations.

4. The computer system of claim 3, wherein said system memory comprises a single type of memory, wherein said single type of memory stores said video data and said non-video data.

5. The computer system of claim 1, wherein said memory controller includes an interface to the system memory, wherein the memory controller is operable to access both said video data and non-video data from said system memory.

6. The computer system of claim 1, wherein said CPU provides video instructions to said memory controller;

wherein in response to said video instructions said memory controller reads portions of said video data and provides said video signals to said display device.

7. The computer system of claim 1, wherein said non-video data includes code and data used by said CPU for executing one or more applications.

8. The computer system of claim 1, wherein said memory controller performs audio functions and generates audio signals, the computer system further comprising:

one or more speakers coupled to said memory controller which receives said audio signals and generates sound in response to said audio signals.

9. The computer system of claim 8, further comprising:

an audio digital to analog converter coupled between said memory controller and said one or more speakers which receives said audio signals from said memory controller and generates signals to said one or more speakers.

10. The computer system of claim 1, wherein said computer system includes a bus coupled between said CPU and said memory controller; wherein said memory controller comprises:

a bus interface coupled to said bus;

a graphics engine coupled to said bus interface;

one or more memory control units coupled to said graphics engine and also coupled to said system memory;

a window assembler coupled to said one or more memory control units;

a display storage buffer coupled to said video assembly unit for storing video data; and one or more video output ports coupled to said window assembler for transferring said video data to said display device.

11. The computer system of claim 10, wherein said memory controller further includes:

one or more digital to analog converters coupled between said display storage buffer and said one or more video outputs for converting said video data to analog signals, wherein said analog signals are provided as outputs on said one or more video output ports.

12. The computer system of claim 11, wherein said CPU provides video instructions to said memory controller, wherein said memory controller further includes:

an execution engine coupled between said bus interface logic and said graphics engine, wherein said execution engine processes instructions from said CPU for manipulation of data in said system memory.

13. The computer system of claim 1, wherein said compression/decompression engine is further operable to receive data from said system memory and compress said data received from said system memory, and wherein said compression/decompression engine is further operable to decompress received data and store said decompressed data in said system memory.

14. The computer system of claim 1, further comprising:

a non-volatile storage subsystem coupled to said memory controller, wherein said memory controller transfers data between said non-volatile storage subsystem and said system memory.

15. The computer system of claim 14, wherein said compression/decompression engine is further operable to compress/decompress data transferred between said non-volatile storage subsystem and said system memory.

16. A memory controller for performing memory control and video functions, comprising:

one or more memory control units adapted for coupling to a system memory for controlling functions of the system memory;

a graphics engine coupled to the one or more memory control units for performing graphics operations on data; and one or more video ports coupled to the graphics engine and coupled to the one or more memory control units for providing video signals to a display device; and a compression/decompression engine, wherein said compression/decompression engine is operable to compress received data and store said compressed data in said system memory, and wherein said compression/decompression engine is operable to receive data from said system memory and decompress said data received from said system memory; and wherein said compression/decompression engine is operable to compress/decompress both said video data and said non-video data being transferred to/from said system memory.

17. The memory controller of claim 16, wherein the one or more memory control units are adapted for accessing video data to/from the system memory, and wherein the one or more memory control units are operable to receive video data and non-video data from a CPU and store the video data and non-video data from the CPU in the system memory.

18. The memory controller of claim 16, wherein said one or more video ports are adapted for providing the video signals directly to the display device.

19. The computer system of claim 16, wherein the system memory comprises a plurality of memory locations, wherein said system memory is operable to store said video data in any of said memory locations;

wherein said one or more memory control units are adapted for accessing video data from any location in the system memory.

20. The computer system of claim 16, wherein said one or more memory control units are adapted for accessing a single type of memory, wherein said single type of memory stores said video data and said non-video data.

21. The memory controller of claim 16, wherein the memory controller is adapted to receive video instructions from the CPU;

wherein in response to said video instructions said memory controller is operable to read video data from the system memory and provide the video signals to the display device.

22. The memory controller of claim 16, wherein the system memory stores code and data useable by a CPU for executing one or more applications; and wherein the memory controller is operable to transfer non-video data from the system memory to the CPU on CPU request.

23. The memory controller of claim 16, wherein said memory controller further comprises:

a bus interface for coupling to a bus;

wherein said graphics engine is coupled to said bus interface;

a window assembler coupled to said one or more memory control units;

a display storage buffer coupled to said window assembler for storing video data; and wherein said one or more video ports are coupled to said window assembler for transferring said video data to the display device.

24. The memory controller of claim 23, wherein said memory controller further includes:

one or more digital to analog converters coupled between said display storage buffer and said one or more video ports for converting said video data to analog signals, wherein said analog signals are provided as outputs on said one or more video ports.

25. The memory controller of claim 23, wherein the memory controller is adapted to receive video instructions from the CPU; wherein said memory controller further includes:

an execution engine coupled between said bus interface logic and said graphics engine, wherein said execution engine processes instructions received from the CPU for manipulation of data in the system memory.

26. The memory controller of claim 16, wherein said compression/decompression engine is further operable to receive data from said system memory and compress said data received from said system memory, and wherein said compression/decompression engine is further operable to decompress received data and store said decompressed data in said system memory.

* * * * *

UNITED STATES PATENT AND TRADEMARK OFFICE
CERTIFICATE OF CORRECTION

PATENT NO. : 6,002,411

DATED : December 14, 1999

INVENTOR(S) : Thomas A. Dye

It is certified that error appears in the above-identified patent and that said Letters Patent is hereby corrected as shown below:

Claim 3, col. 43, line 19, please delete "claim 2" and substitute -- claim 1--.

Signed and Sealed this

Twenty-fifth Day of July, 2000

Attest:

Q. TODD DICKINSON

Attesting Officer

Director of Patents and Trademarks